US012573781B2

(12) United States Patent
Natter et al.

(10) Patent No.: US 12,573,781 B2
(45) Date of Patent: Mar. 10, 2026

(54) ELECTRICAL CONNECTOR SYSTEM WITH HIGH AMPACITY PERFORMANCE

(71) Applicant: EATON INTELLIGENT POWER LIMITED, Dublin (IE)

(72) Inventors: Brantley Natter, Carol Stream, IL (US); James Dawson, Carol Stream, IL (US); Slobodan Pavlovic, Carol Stream, IL (US); Mohamad Zeidan, Carol Stream, IL (US)

(73) Assignee: EATON INTELLIGENT POWER LIMITED, Dublin (IE)

( * ) Notice: Subject to any disclaimer, the term of this patent is extended or adjusted under 35 U.S.C. 154(b) by 434 days.

(21) Appl. No.: 18/111,183

(22) Filed: Feb. 17, 2023

(65) Prior Publication Data

US 2023/0208063 A1 Jun. 29, 2023

Related U.S. Application Data

(63) Continuation of application No. PCT/US2021/047180, filed on Aug. 23, 2021.

(Continued)

(51) Int. Cl.

*H01R 13/17* (2006.01)
*H01R 13/53* (2006.01)

(52) U.S. Cl.

CPC ............. *H01R 13/17* (2013.01); *H01R 13/53* (2013.01); *H01R 2201/26* (2013.01)

(58) Field of Classification Search

CPC ........ H01R 13/17; H01R 13/15; H01R 13/53; H01R 2201/26

(Continued)

(56) References Cited

U.S. PATENT DOCUMENTS 7,955,143 B2 * 6/2011 Zhang .................... H01R 13/17 439/825
9,905,953 B1 * 2/2018 Pavlovic .............. H01R 13/187

(Continued)

FOREIGN PATENT DOCUMENTS

WO 2019164536 8/2019
WO 2019236976 12/2019

(Continued)

OTHER PUBLICATIONS

English translation of Decision of Refusal For Japanese Application No. 2023-512737 dated Jan. 15, 2025.

(Continued)

*Primary Examiner* — Gary F Paumen
(74) *Attorney, Agent, or Firm* — Meunier Carlin & Curfman LLC

(57) ABSTRACT

A connector system for use in a power distribution system includes a male terminal assembly, a female terminal assembly and an internal spring. The male terminal assembly includes a male terminal body formed with a spring receiver, a base wall, and a plurality of contact arms extending forward from the base wall and arranged along a curvilinear contact arm path. The contact arms are spatially arranged such that a contact arm opening resides between a pair of contact arms in the plurality of contact arms and no intervening structure of the male terminal body resides between a pair of contact arms in the plurality of contact arms. The internal spring is dimensioned to reside within the spring receiver, and includes a plurality of spring arms arranged along a curvilinear spring arm path. The female connector assembly has a female terminal with a female receptacle. An insertion force of less than 45 Newtons is applied on the male terminal assembly to position an extent of it within the female receptacle to arrive at a fully connected state where the connector system enjoys high ampacity to transfer over (Continued)

500 amps between the male terminal assembly and the female terminal with less than a 55° C. rise over the ambient temperature in which the connector system is operating.

21 Claims, 51 Drawing Sheets

Related U.S. Application Data

(60) Provisional application No. 63/068,622, filed on Aug. 21, 2020.

(58) Field of Classification Search
USPC ........................................ 439/843, 825, 827
See application file for complete search history.

(56) References Cited

U.S. PATENT DOCUMENTS

| | | | | |
|---|---|---|---|---|
| 10,135,168 | B2 * | 11/2018 | Pavlovic | H01R 4/48 |
| 11,488,742 | B2 | 11/2022 | Dawson et al. | |
| 2023/0021468 | A1 | 1/2023 | Iannaccone et al. | |

FOREIGN PATENT DOCUMENTS

| | | |
|---|---|---|
| WO | 2019237046 | 12/2019 |
| WO | 2020150399 | 7/2020 |
| WO | 2020154330 | 7/2020 |
| WO | 2020247592 | 12/2020 |
| WO | 2021050499 | 3/2021 |
| WO | 2021050609 | 3/2021 |
| WO | 2022026695 | 2/2022 |
| WO | 2022026766 | 2/2022 |
| WO | 2022055568 | 3/2022 |
| WO | 2022098799 | 5/2022 |
| WO | 2023288138 | 1/2023 |

OTHER PUBLICATIONS

International Search Report and Written Opinion for International Application PCT/US2021/047180 dated Feb. 24, 2022.
International Preliminary Report on Patentability for International Application PCT/US2021/047180 dated Mar. 2, 2023.
English translation of Office Action for Japanese Application No. 2023512737 dated May 1, 2024.
English translation of the Notice of Preliminary Rejection dated Aug. 1, 2024, for Korean Application No. 2023-7008864.

* cited by examiner

ELECTRICAL CONNECTOR SYSTEM WITH HIGH AMPACITY PERFORMANCE

RELATED APPLICATIONS

This application claims the benefit from PCT patent application PCT/US2021/047180, filed Aug. 23, 2021 and U.S. provisional patent application 63/068,622, filed Aug. 21, 2020, the disclosure of which are incorporated herein by this reference.

FIELD OF DISCLOSURE

The present disclosure relates to electrical connectors, and, in particular, a connector system with a male terminal assembly with an internal spring member. The male terminal assembly has a shape that includes a curvilinear extent and meets strict industry performance standards and production requirements. The connector system also includes a female terminal assembly with a receiver that is configured to receive an extent of the male terminal assembly. The male and female terminal assemblies provide the connector system with high ampacity performance in a variety of installations and applications.

BACKGROUND

Over the past several decades, the number of electrical components used in automobiles, and other on-road and off-road vehicles such as pick-up trucks, commercial trucks, semi-trucks, motorcycles, all-terrain vehicles, and sports utility vehicles (collectively "motor vehicles") has increased dramatically. Electrical components are used in motor vehicles for a variety of reasons, including but not limited to, monitoring, improving and/or controlling vehicle performance, emissions, safety and creature comforts to the occupants of the motor vehicles. These electrical components are mechanically and electrically connected within the motor vehicle by conventional connector assemblies, which consist of an eyelet and a threaded fastener. Considerable time, resources, and energy have been expended to develop connector assemblies that meet the varied needs and complexities of the motor vehicles market, however, conventional connector assemblies suffer from a variety of shortcomings.

Motor vehicles are challenging electrical environments for both the electrical components and the connector assemblies due to a number of conditions, including but not limited to, space constraints that make initial installation difficult, harsh weather conditions, vibration, heat loads, and longevity, all of which can lead to component and/or connector failure. For example, incorrectly installed connectors, which typically occur in the assembly plant, and dislodged connectors, which typically occur in the field, are two significant failure modes for the electrical components and motor vehicles. Each of these failure modes lead to significant repair and warranty costs. For example, the combined annual accrual for warranty by all of the automotive manufacturers and their direct suppliers is estimated at between $50 billion and $150 billion, worldwide.

A more appropriate, a robust connector system must be impervious to harsh operating conditions, prolonged vibration and excessive heat, especially heat loads that accumulate "under the hood" of the vehicle. In order to create a robust solution, many companies have designed variations of spring-loaded connectors, which have a feature that retains the connector in place. Such spring-actuated connectors typically have some indication to show that they are fully inserted. Sometimes, the spring-actuated feature on the connector is made from plastic. Other times, the spring-actuated feature on the connector is fabricated from spring steel. Unfortunately, although the more recent connectors are an improvement over dated connectors using an eyelet and threaded connector, there are still far too many failures.

Part of the reason that conventional spring-actuated connector assemblies a prone to failing in motor vehicle applications is because of the design of the assembly—namely that the spring element, such as a tab, is located on the periphery of the connector. By placing the spring tab on the exterior surface of the connector, manufacturers attempt to make engagement of the assembly's components obvious to the worker assembling the part in the factory. Unfortunately, for both plastic and metal, the increased temperatures of an automotive environment make a peripheral spring prone to premature failure. It is not uncommon for the engine compartment of a motor vehicle to reach or exceed 100° C., with individual components of a motor vehicle engine reaching or exceeding 180° C. At 100° C., most plastics start to plasticize, reducing the retention force of the peripheral spring-actuated element. At 100° C., the thermal expansion of the spring steel will reduce the retention force of a peripheral spring-actuated connector. Also, with respect to spring-actuated features formed from spring steel is the effect of residual material memory inherent in the spring steel as the spring steel is thermally cycled on a repeated basis between high and low temperatures. After many temperature cycles, the spring steel will begin to return to its original, pre-formed shape, which reduces the spring-actuated element's retention force with other components of the connector system. This behavior makes the conventional connector system susceptible to vibration and failure, each of which significantly reduce the performance and reliability of conventional connectors. For these and many other reasons, the motor vehicle industry needs a more reliable connector system that is low-cost, vibration-resistant, temperature-resistant, and better overall electrical and mechanical performance.

There is clearly a market demand for a mechanically simple, lightweight, inexpensive, vibration-resistant, temperature-resistant, and robust electrical connector system with high ampacity for use in a power distribution system, such as those found in motor vehicles. The description provided in the background section should not be assumed to be prior art merely because it is mentioned in or associated with the background section. The background section may include information that describes one or more aspects of the subject technology.

SUMMARY

According to an aspect of the present disclosure, the connector system features high ampacity performance and includes a male connector assembly and a female connector assembly. Both the male and female connector assemblies have a housing and a terminal. The male terminal assembly is designed and configured to fit within the female terminal, which forms both a mechanical and electrical connection between these terminals. Specifically, the male terminal assembly includes an internal spring member, which is designed to interact with an extent of the male terminal to ensure that a proper connection is created between the male terminal and female terminal. The female terminal assembly includes a receiver that is configured to receive an extent of the male terminal assembly.

The male terminal assembly has a rearmost extent male terminal body, which includes a plurality of contact arms. A spring member is nested inside the male terminal body. The spring member resists inward deflection and applies outwardly directed force on the contact arms thereby creating a positive connection and retention force with the male terminal against and within the female terminal. Unlike other prior art connection systems, the connection between the male terminal and the female terminal become stronger when the connector system experiences elevated temperatures, thermal cycling and the application of electrical power, especially high current loads.

Other aspects and advantages of the present disclosure will become apparent upon consideration of the following detailed description and the attached drawings wherein like numerals designate like structures throughout the specification.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings.

DETAILED DESCRIPTION

Figure 1:
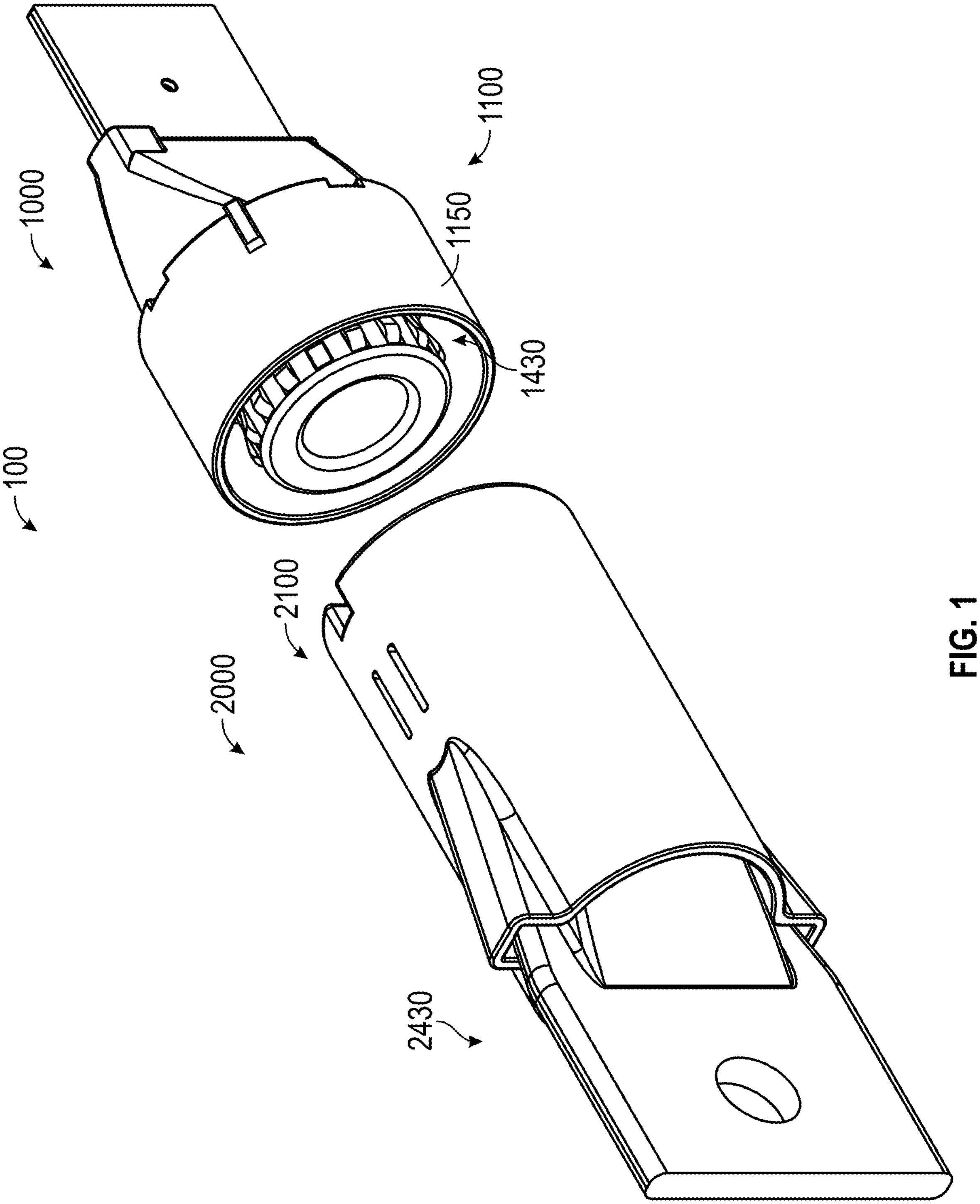
FIG. 1 is a perspective view of a first embodiment of a connector system featuring high ampacity performance and having a male connector assembly and a female connector assembly, showing the connector system in a disconnected state ($S_{DCON}$)
Figure 2:
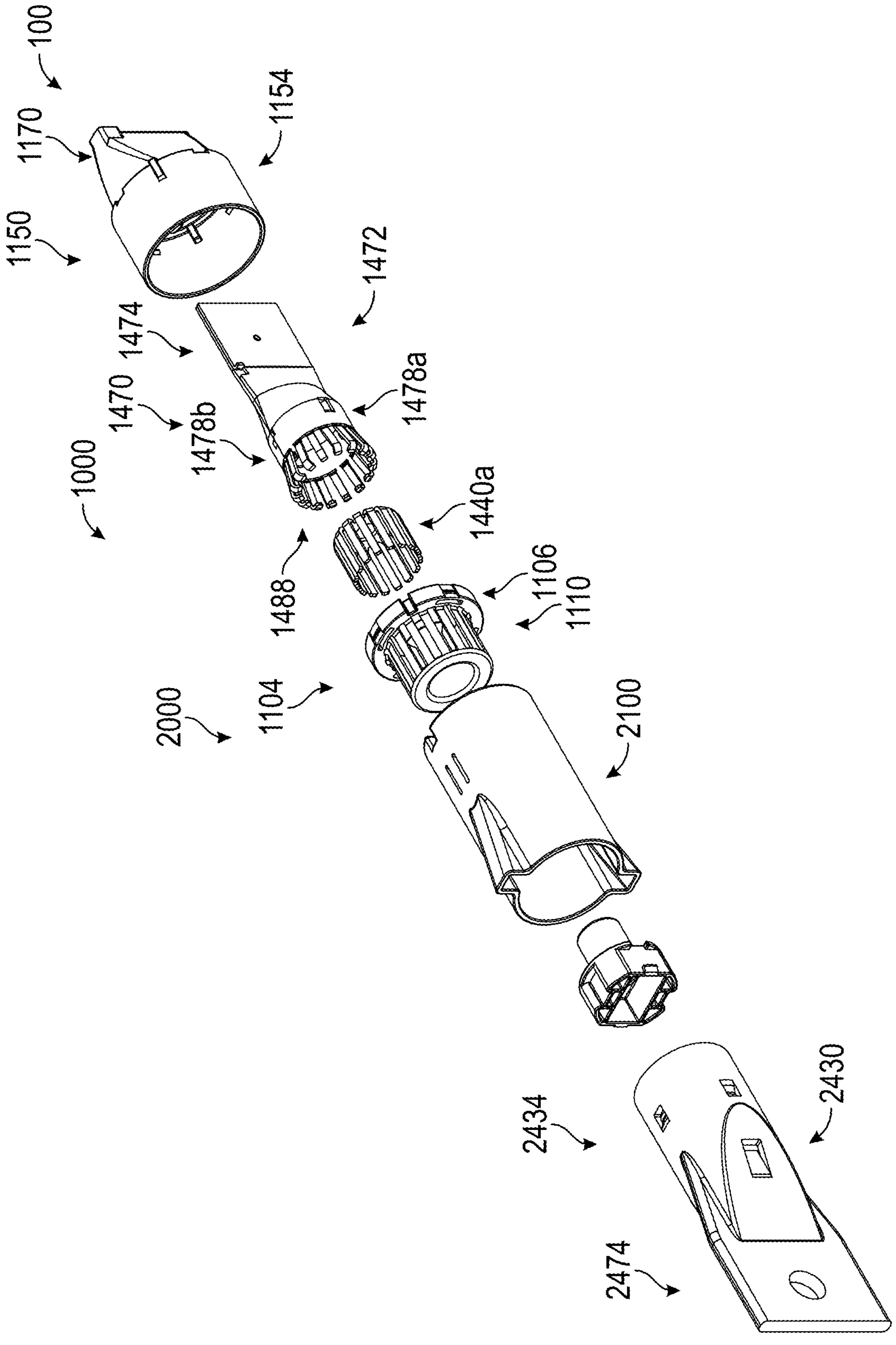
FIG. 2 is an exploded view of the connector system of FIG. 1.
Figure 3:
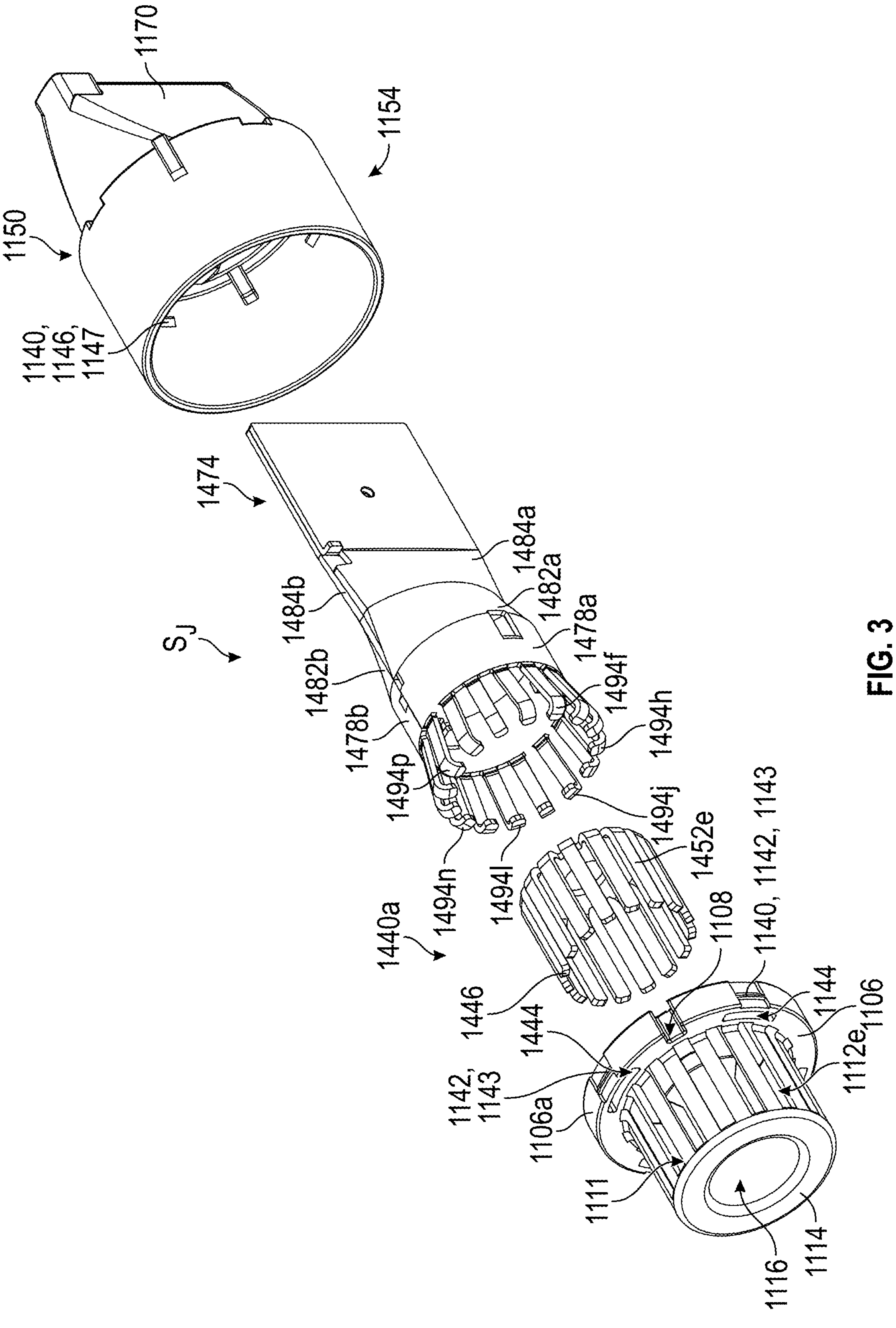
FIG. 3 is an exploded view of the male connector assembly of FIG. 1 in a decoupled state ($S_{DC}$), the male connector assembly having a housing and a male terminal assembly that includes a male terminal body and a spring member.
Figure 4:
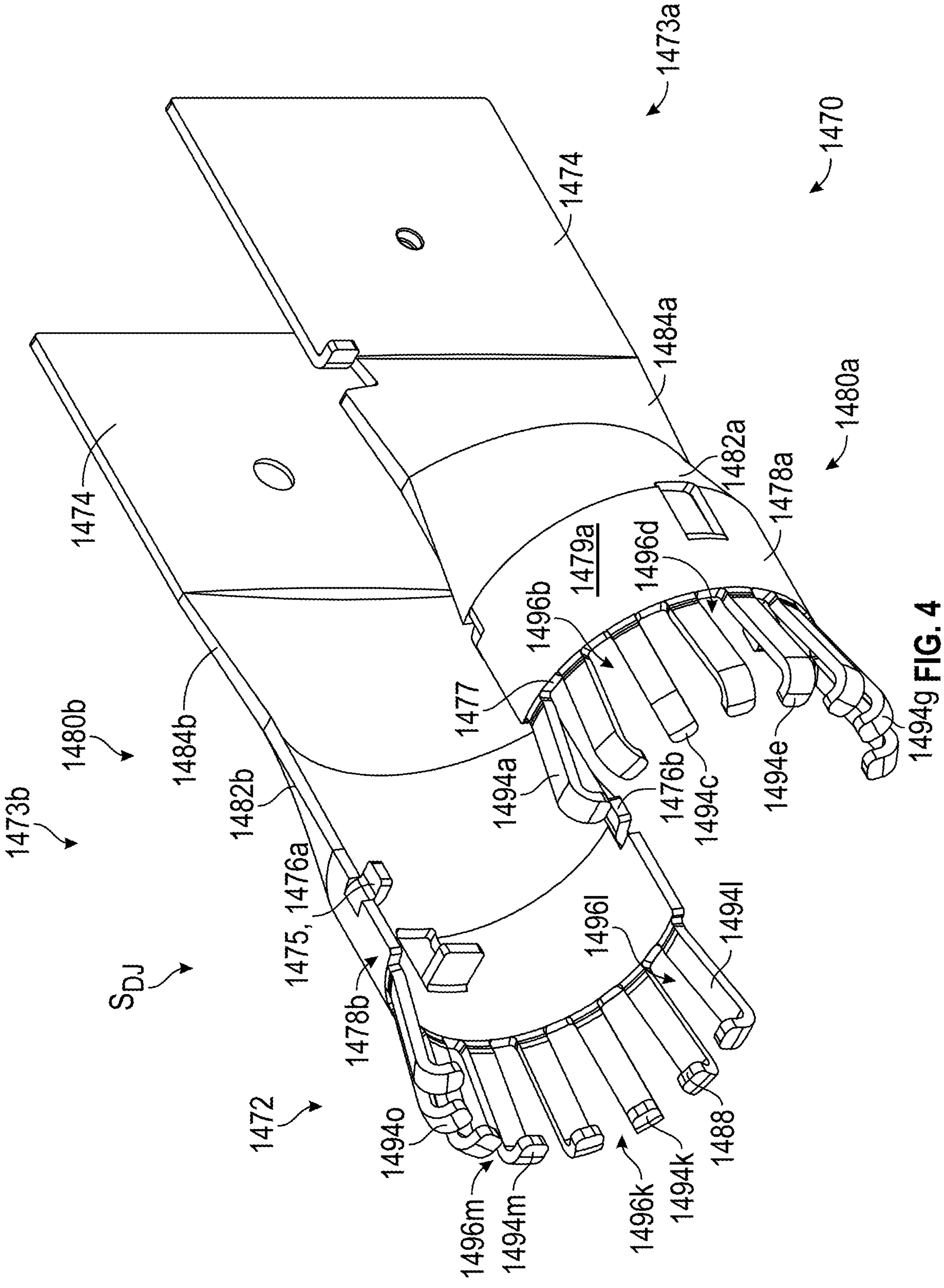
FIG. 4 is a perspective view of the male terminal body of FIG. 3 in a disjoined state ($S_{DJ}$)
Figure 5:
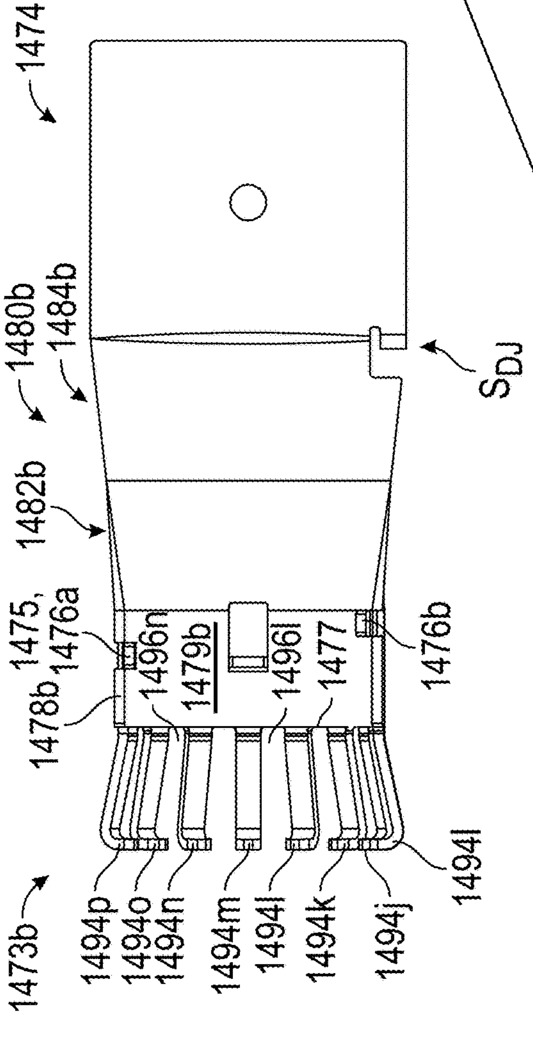
FIG. 5 is a side view of an interior portion of the male terminal body of FIG. 4.
Figure 6:
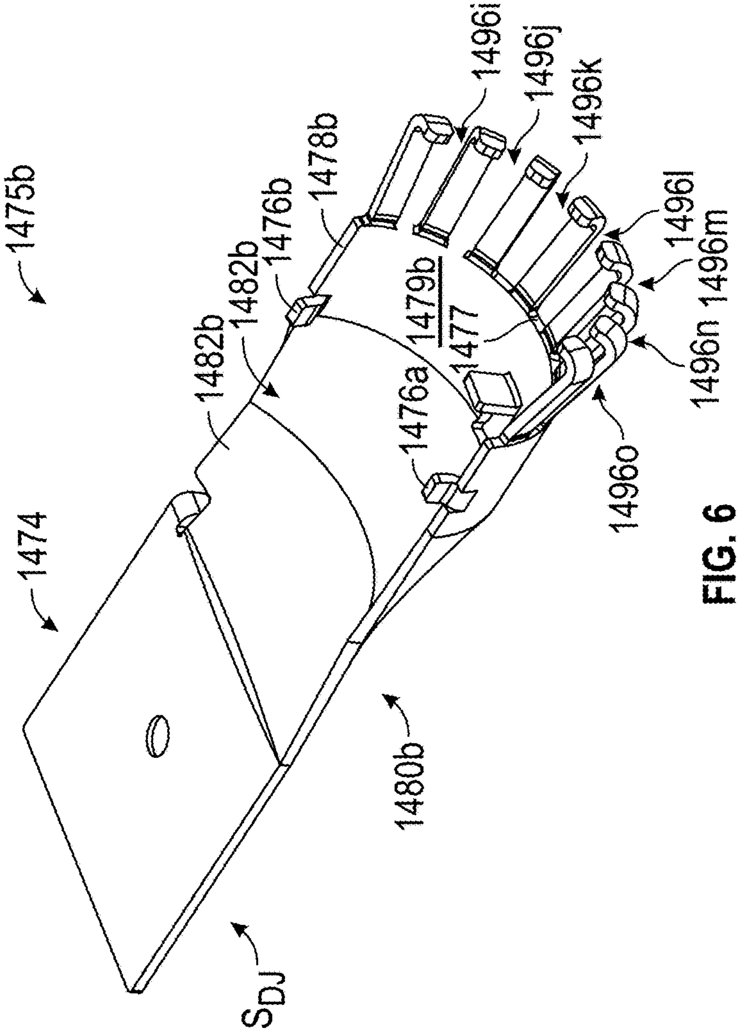
FIG. 6 is a perspective view of the interior portion of the male terminal body of FIG. 5.

In the following detailed description, numerous specific details are set forth by way of examples in order to provide a thorough understanding of the relevant teachings. However, it should be apparent to those skilled in the art that the present teachings may be practiced without such details. In other instances, well-known methods, procedures, components, and/or circuitry have been described at a relatively high-level, without detail, in order to avoid unnecessarily obscuring aspects of the present teachings.

The Figures show a high ampacity connector system 100 designed to mechanically and electrically couple a power source (e.g., alternator or battery) to a device (e.g., radiator fan, heated seat, power distribution component, or another current drawing component). The high ampacity connector system 100 may be used in a power distribution system 10 installed in a variety of applications, including an airplane, motor vehicle, a military vehicle (e.g., tank, personnel carrier, heavy-duty truck, and troop transporter), a bus, a locomotive, a bulldozer, an excavator, a ship (e.g., yacht, pleasure boat, cargo carrier, naval military ship), a submarine, mining equipment, forestry equipment, agricultural equipment (e.g., tractor, cutters, planters, combines, threshers, harvesters), a battery pack, or a 24-48 volt system. Consistent and reliable operation of the power distribution components are essential to meet industry standards, production, and performance requirements of the power distribution system and these applications. It should be understood that multiple high ampacity connector systems 100 could be used in a single power distribution system 10 in a single application.

It should be understood that the following terms used herein shall generally mean the following:

a. "High power" shall mean (i) voltage between 20 to 1,000 volts regardless of current or (ii) at any current greater than or equal to 80 amps regardless of voltage.
b. "High current" shall mean current greater than or equal to 80 amps, regardless of voltage, without damaging the connector.
c. "Ampacity" shall mean the maximum current that a connector can carry continuously under the operating conditions without exceeding its temperature rating.
d. "High ampacity" shall mean the ability of the connector to carry at least 500 or more amps during operation without damaging the connector or the connector experiencing performance degradation.
e. "High voltage" shall mean a voltage between 20 to 1,000 volts regardless of current.

In general, the high ampacity connector system 100 includes a male connector assembly 1000 and a female connector assembly 2000. The male assembly includes a male terminal body 1472 and a spring member 1440. The male terminal body 1472 includes a plurality of contact arms 1494 with free ends arranged along a curvilinear, namely circumferential, path. Similarly, the spring member includes a plurality of spring arms 1452 with free ends arranged along a curvilinear, namely circumferential, path. The curvilinear paths provided by the free ends are cooperatively dimensioned and the axial alignment of the spring member 1440 and the male terminal body 1472 create a mechanical interaction between the plurality of contact arms 1494 and the plurality of spring arms 1452, when the connector system 100 is in a particular state or subjected to specific operating conditions relating to the power distribution system 10. The cooperative configuration and positioning of the spring arms 1452 and contact arms 1494 creates a 360 degree compliant connector system 100 that meets and/or exceeds various standards (e.g., USCAR-2, USCAR-12, USCAR-21, USCAR-25, USCAR-37, and/or USCAR-38).

The high ampacity connector system 100 may include at least the following structural features or performance attributes: (i) a male housing assembly 1100 that is configured in a manner that ensures proper alignment between the terminal body 1472 and the spring member 1440, (ii) an approximate 1 to 1 ratio between the contact arm opening widths and the contact arm widths, as detailed below, (iii) does not include a current choke point between the male terminal body and the connection plate, (iii) has a base wall length is at least 90% of the contact arm length, (iv) does not include an extend of the male terminal body that surrounds the contact arms, (v) can meet the insertion force requirement of less than 45 Newtons for a USCAR class 2 connector without a lever assist, (vi) has a current rating of at least 500 amps with a wire size of 120 $mm^2$ at 55° C. rise over ambient (RoA) or at 80° C. with a current derating of 80% for each male terminal assembly 1430 that is included within the system, and (vii) has a male terminal body that is made from a plurality of separate and distinct pieces that are joined together.

While this disclosure includes several embodiments of the high ampacity connector 100 in many different forms, there is shown in the drawings and will herein be described in detail particular embodiments with the understanding that the present disclosure is to be considered as an exemplification of the principles of the disclosed methods and systems, and is not intended to limit the broad aspects of the disclosed concepts to the embodiments illustrated. As will be realized, the disclosed methods and systems are capable of other and different configurations and several details are capable of being modified without departing from the scope of the disclosed methods and systems. For example, one or more of the following embodiments, in part or whole, may be combined consistently with the disclosed methods and systems. Accordingly, the drawings and detailed descriptions are to be regarded as illustrative in nature, not restrictive or limiting.

1) Male Connector Assembly

The male connector assembly 1000 is primarily composed of: (i) the male housing assembly 1100 and (ii) the male terminal assembly 1430. The male connector assembly 1000 may have additional features not shown within the Figures; however, such additional features are contemplated by this disclosure. For example, the male connector assembly 1000 may include: (i) a connector position assurance (CPA) assembly that meets USCAR specifications (e.g., as described within PCT/US2020/49870), (ii) an interlock (IL) or high voltage interlock (HVIL), wherein said interlock can be positioned outside of the terminals 1430, 2430 or positioned within the spring member 1440a (e.g., as described within PCT/US2020/143686), (iii) shielding assemblies that surround an extent of the terminal assemblies 1430 and are formed from metal, conductive plastic (e.g., as described within PCT/US2020/13757), or other materials that may be used in minimizing EMI noise, (iv) water resistant sealing features (e.g., seals, coatings for the connector, or etc.), (v) locking handles, levers, or structures that aid in connecting the male connector assembly 1000 to the female connector assembly 2000 and/or aid in ensuring that the high ampacity connector system 100 remains within the fully connected state, and/or (vi) any combination of these structures. Additionally, other structures that are disclosed within any of the applications incorporated herein may be used in connection with the male connector assembly 1000.

As best shown in FIGS. 21-24, the male housing assembly 1100 is designed to: (i) protect and isolate the male terminal assembly 1430 from foreign objects, (ii) add structural rigidity to the terminal assembly 1430, (iii) aid in the coupling of the male terminal assembly 1430 to the female terminal assembly 2430, and (iv) aligning the spring member 1440a within the male terminal body 1472. The male housing assembly 1100 generally includes an interior male housing portion 1104 and exterior male housing portion 1150. The interior male housing portion 1104 includes: (i) an outer rear wall or mating ring 1106, (ii) an outer sidewall or contact arm wall 1110, (iii) a front wall 1114, (iv) an interior sidewall 1116, (v) an interior rear wall 1120, and (vi) separating walls 1122a-1122p.

Figure 29:
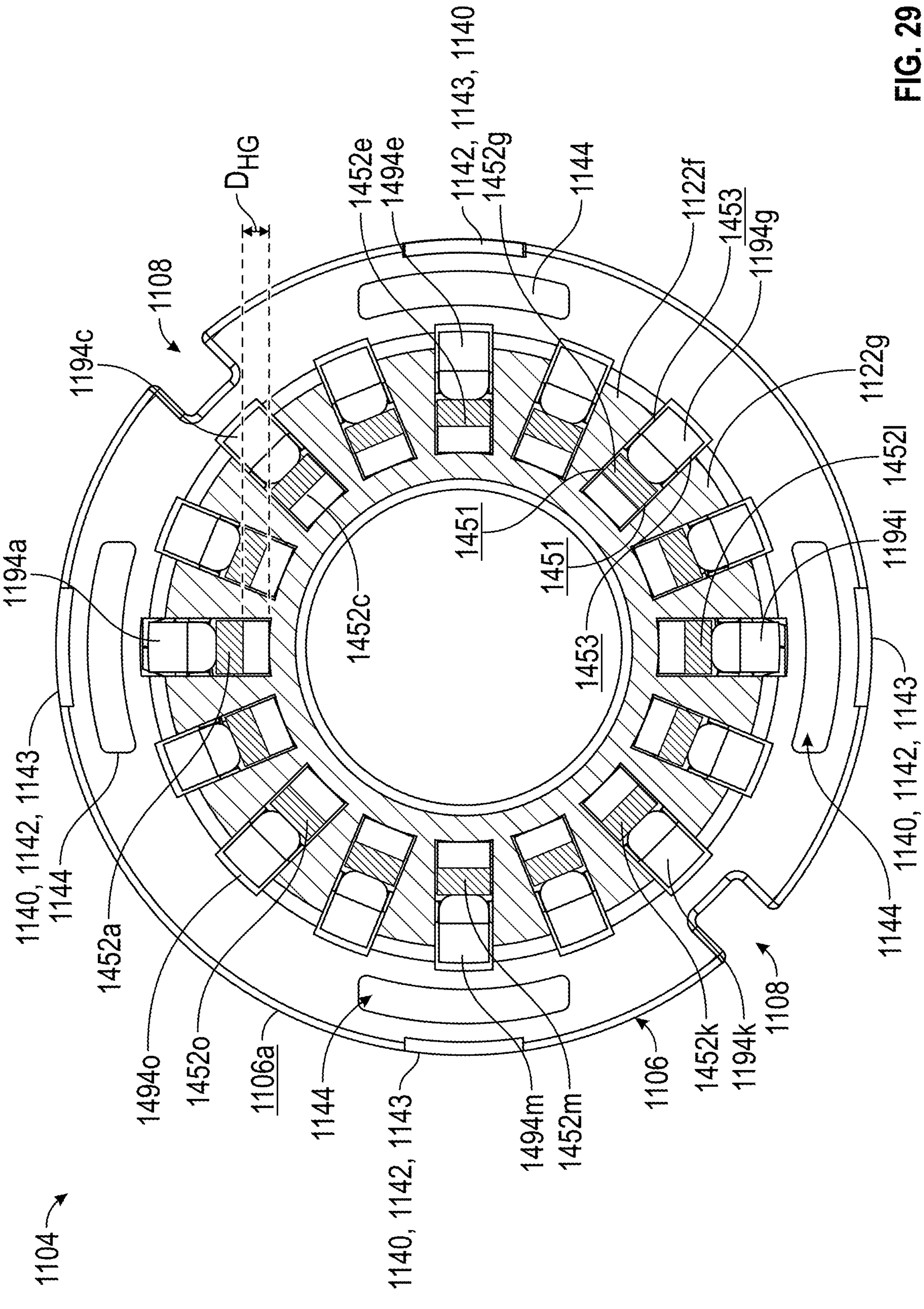
FIG. 29 is a cross-sectional view of the male connector assembly taken along line 29-29 of FIG. 27.
Figure 31:
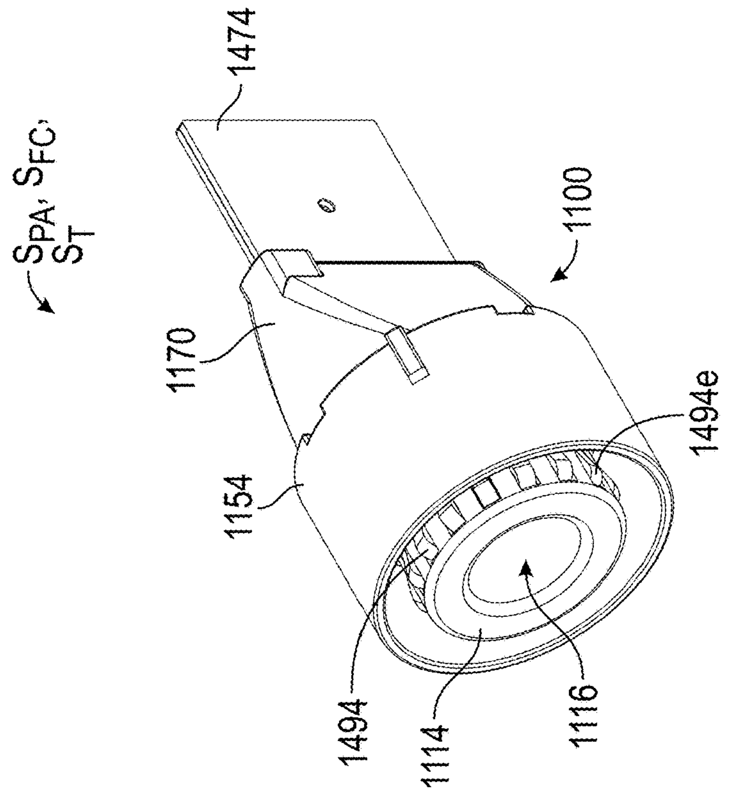
FIG. 31 is a perspective view of the male connector assembly of FIG. 3 in a fully assembled state ($S_{FA}$)
Figure 33:
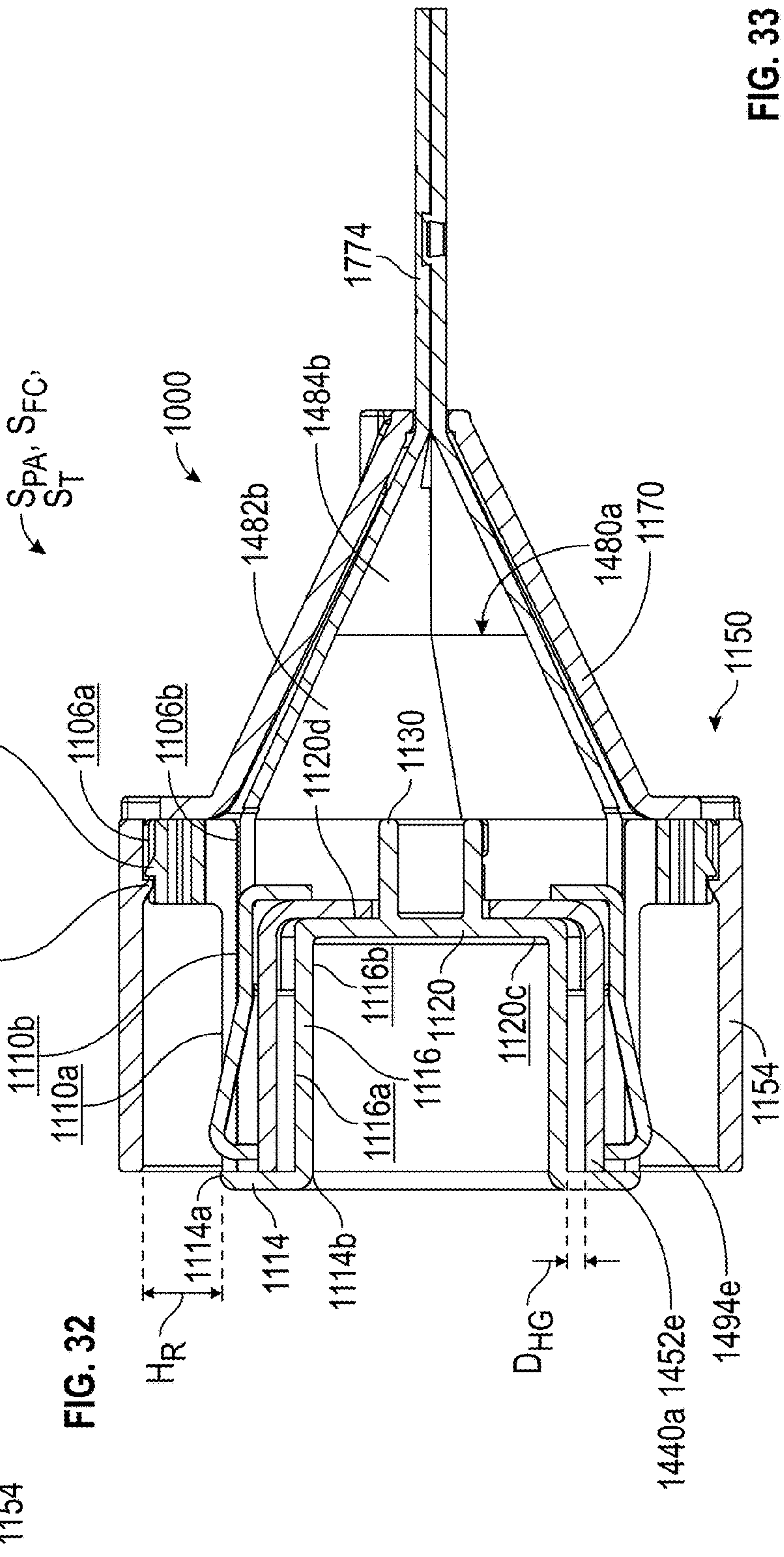
FIG. 33 is a cross-sectional view of the male connector assembly taken along line 33-33 of FIG. 32.
Figure 32:
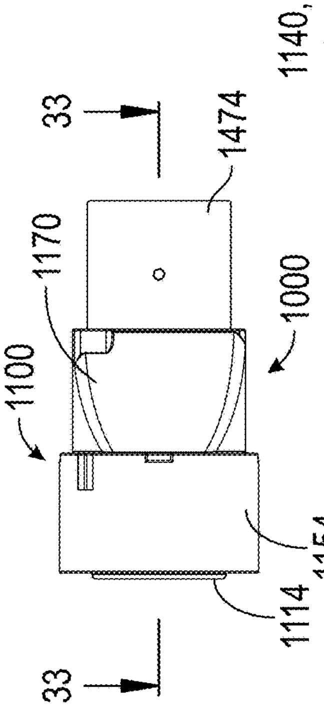
FIG. 32 is a side view of the male connector assembly of FIG. 31.
Figure 35:
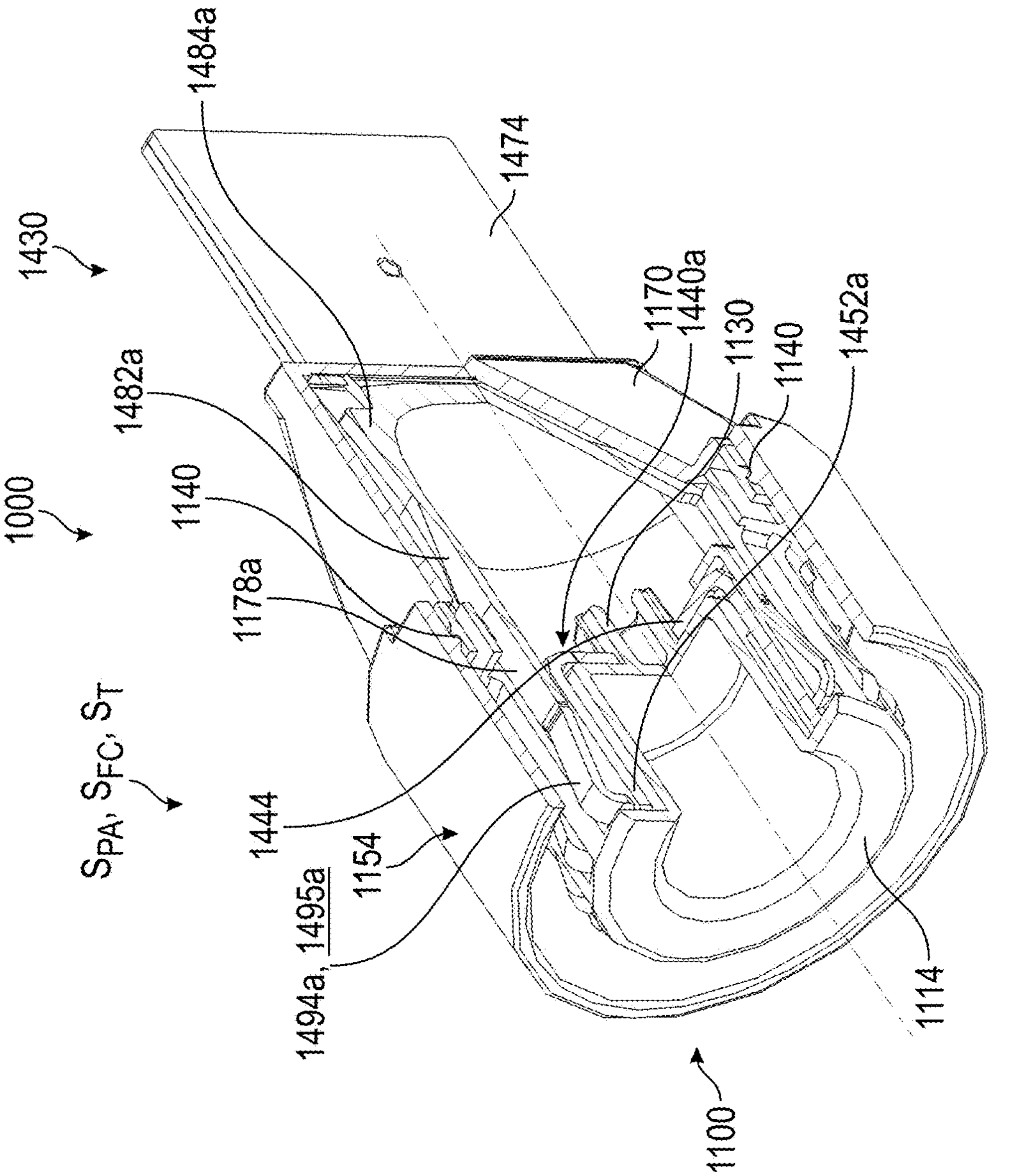
FIG. 35 is a cross-sectional view of the male connector assembly taken along line 35-35 of FIG. 34.

As shown in FIGS. 21-23, 26, 33, and 35, the outer rear wall 1106: (i) has an outer surface of 1106a and an inner surface 1106b, wherein each surface 1106a, 1106b has a curvilinear configuration and is positioned to form a hollow cylinder or cylindrical shell shape with an outer diameter that is between 30 mm and 32 mm, preferably 31 mm and an interior diameter that is between 20 mm and 22 mm, preferably 21 mm, (ii) is positioned rearward of the outer sidewall or contact arm wall 1110 and has a height that causes the outer surface of 1106a to be positioned radially outward from the outer sidewall 1110, (iii) is positioned rearward of the contact arms 1494a-1494p and the spring arms 1452a-1452p, and (iv) surrounds an extent of the rear wall assembly 1478a-1478b of the male terminal body 1472. Additionally, as shown in FIG. 33, a majority of the outer rear wall 1106 is positioned rearward of the spring 1440a and male terminal body 1472. Moreover, the outer rear wall 1106: (i) has an outer surface 1106a that is designed to abut an extent of the exterior male housing portion 1150, when the male connector assembly 1000 is in a fully assembled state $S_{FA}$, (ii) is designed to add stability to the rear extent of the interior housing 1104, and (iii) is configured to provide an offset to allow an extent of the female connector assembly 2000 to be positioned within the exterior male housing portion 1150. Finally, the outer rear wall 1106 includes contact arm recesses 1107a-1107p formed in the inner surface 1106b of the outer rear wall 1106 (see FIG. 23). As shown in FIGS. 29 and 33, said contact arm recesses 1107a-1107p are configured to allow for the insertion of the male terminal body 1472 and mainly the contact arms 1494a-1494p without requiring compression of said body 1472 or arms 1494a-1494p.

To secure the interior male housing portion 1104 to the exterior male housing portion 1150, the housing assembly 1100 includes a housing coupling means 1140. Said housing coupling means 1140 includes an interior housing coupling member 1142 and an exterior housing coupling member 1146. In the first embodiment, the interior housing coupling member 1142 is formed in the outer rear wall 1106 and is comprised of a plurality of recessed and angled projections 1143 and coupling apertures 1144. The coupling apertures 1144 are formed between the inner surface 1106*b* and outer surface 1106*a* of the outer rear wall 1106 and below the angled projections 1143. These coupling apertures 1144 allow for the angled projections 1143 to be temporarily deformed inward or towards the center of the connector 1000 when the interior male housing portion 1104 is in the process of being coupled to the exterior male housing portion 1150. As shown in the first embodiment, the interior housing coupling member 1142 includes four angled projections 1143 positioned 90 degrees from one another. It should be understood that the interior housing coupling member 1142 may: (i) include additional structures (e.g., 5-30), (ii) fewer structures (e.g., 1-3), (iii) utilize other structures such as openings, apertures, recesses, or different types of projections that are cooperatively dimensioned and designed to interact with the exterior housing coupling member 1146.

Figure 23:
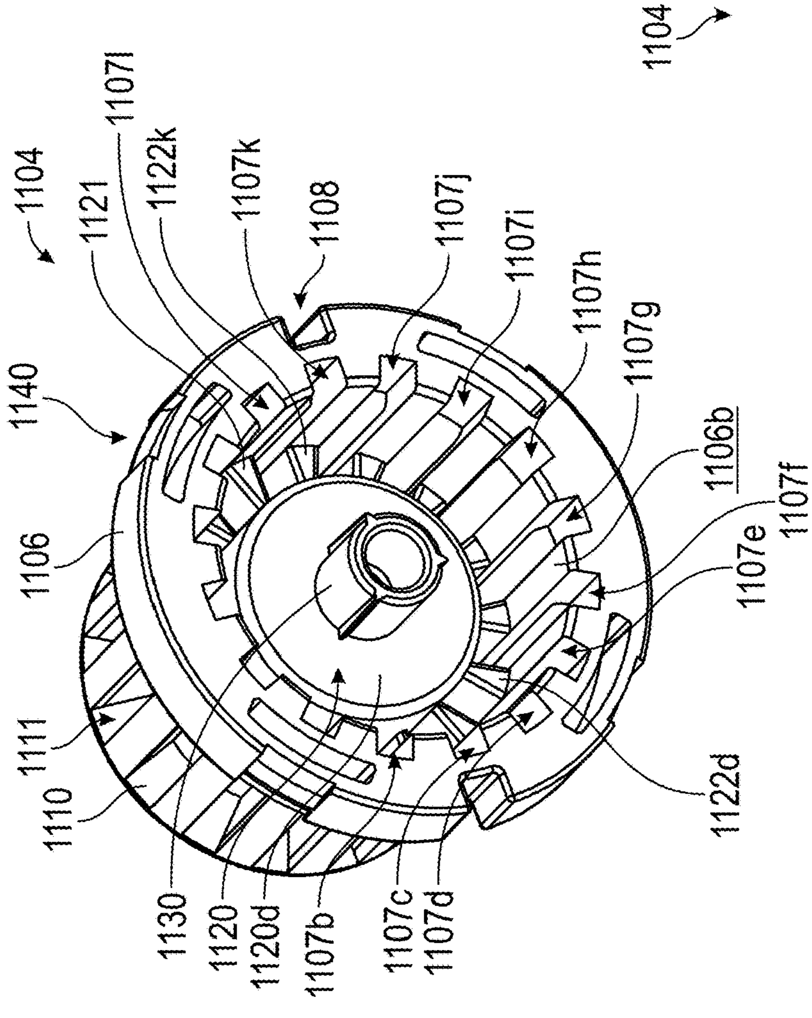
FIG. 23 is a rear perspective view of the extent of the housing of the male connector assembly of FIG. 21.
Figure 26:
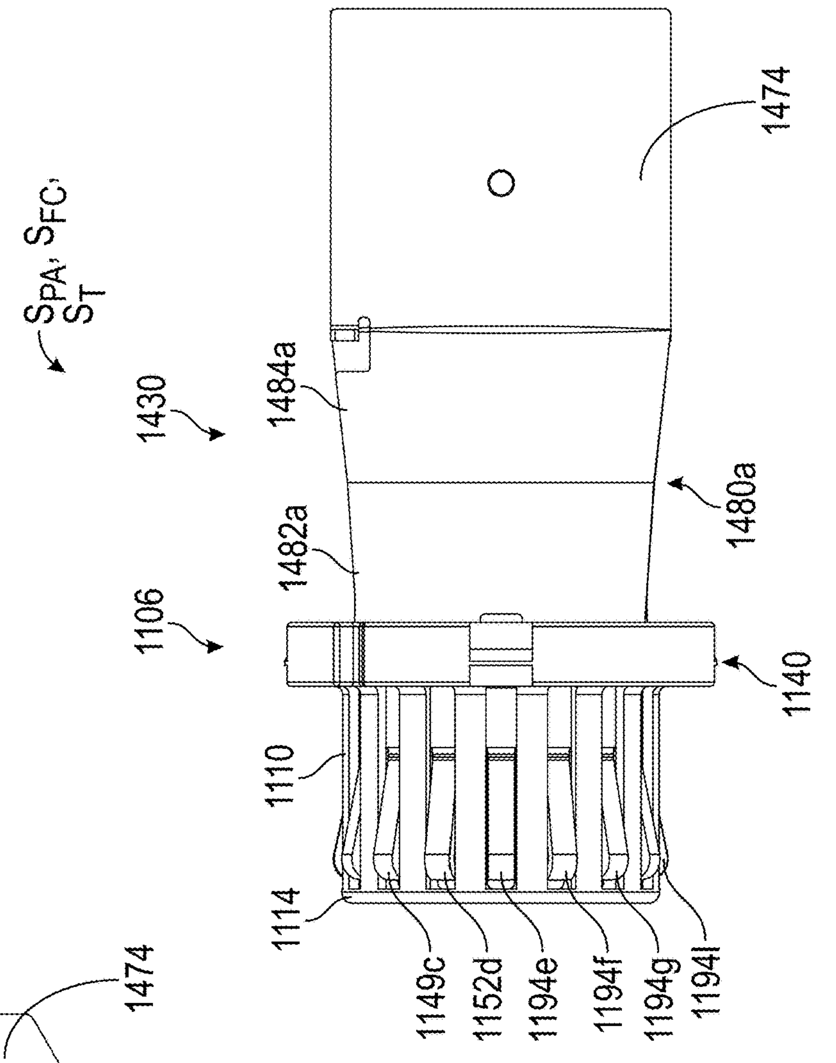
FIG. 26 is a side view of the male connector assembly of FIG. 25.
Figure 25:
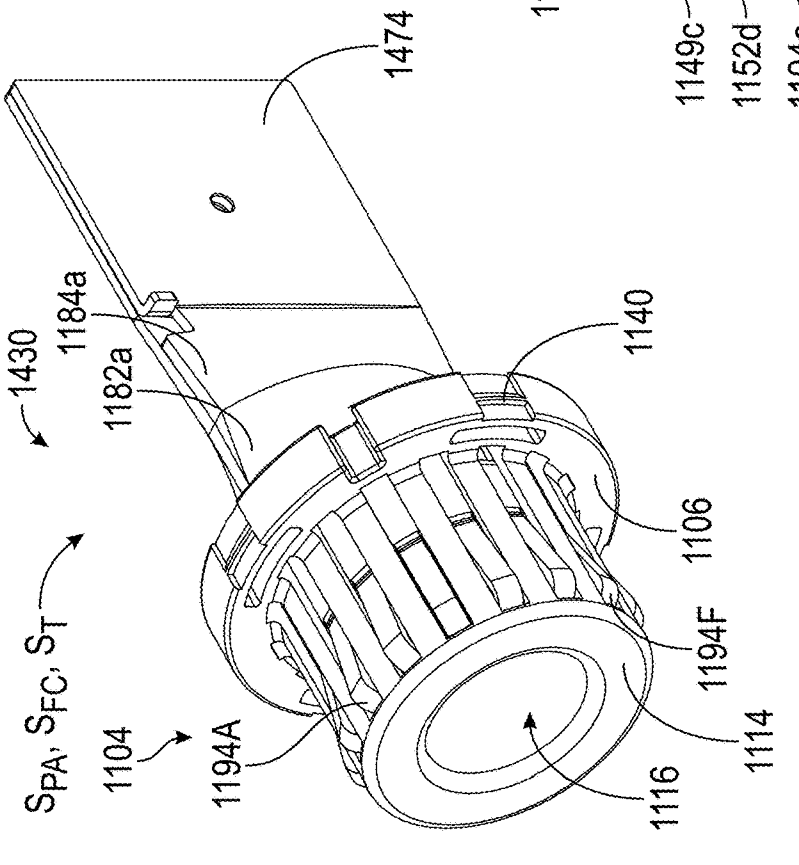
FIG. 25 is a perspective view of the male connector assembly of FIG. 42 in a partially assembled state ($S_{PA}$)
Figure 28:
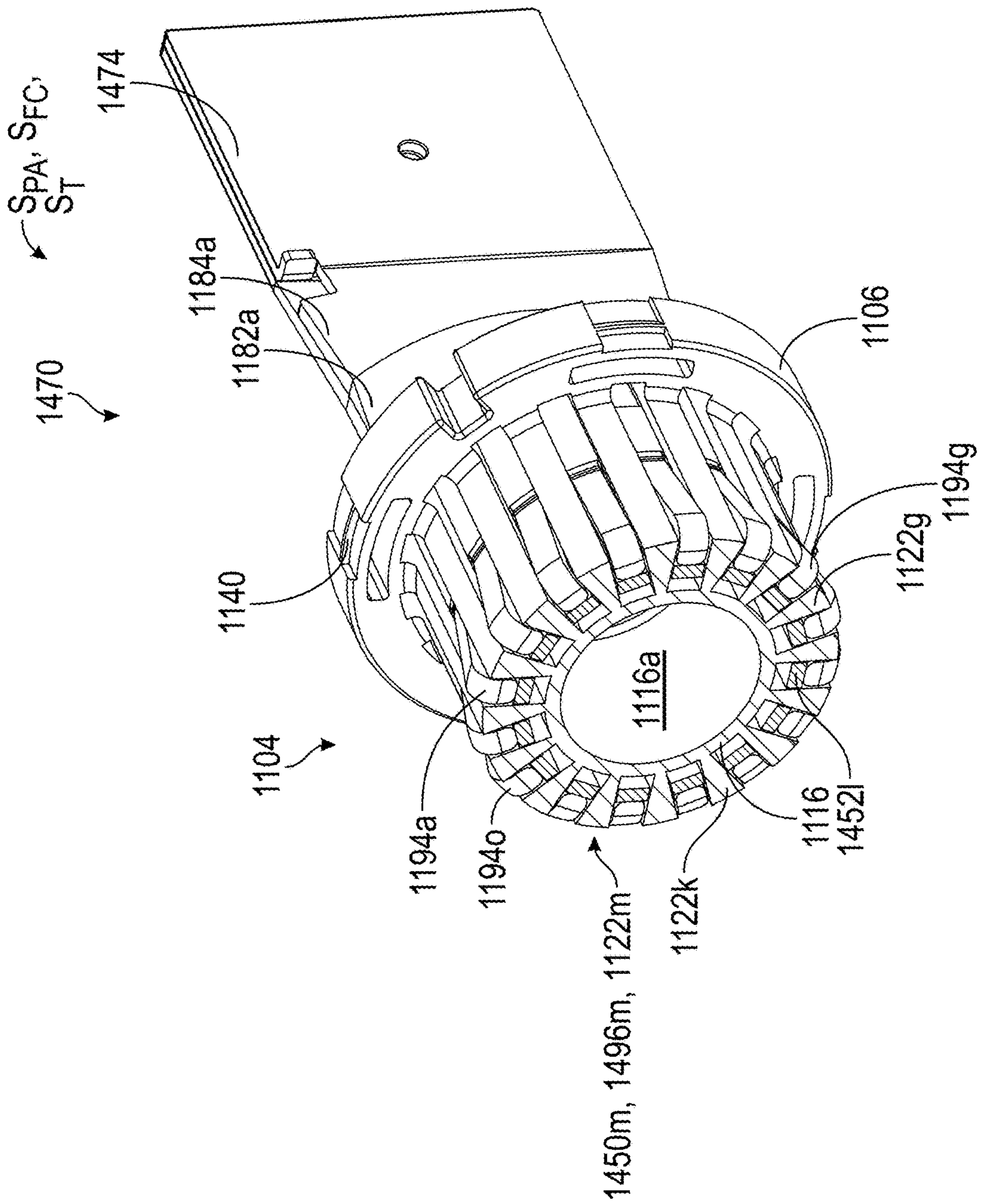
FIG. 28 is a cross-sectional view of the male connector assembly taken along line 28-28 of FIG. 27.
Figure 27:
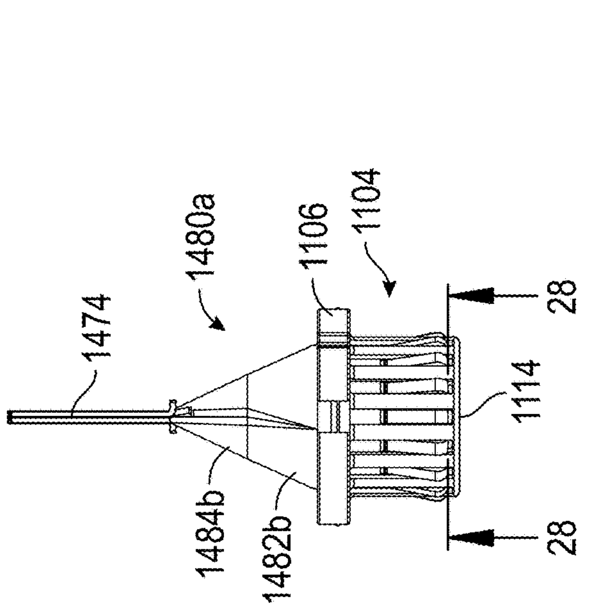
FIG. 27 is a top view of the male connector assembly of FIG. 25.
Figure 30:
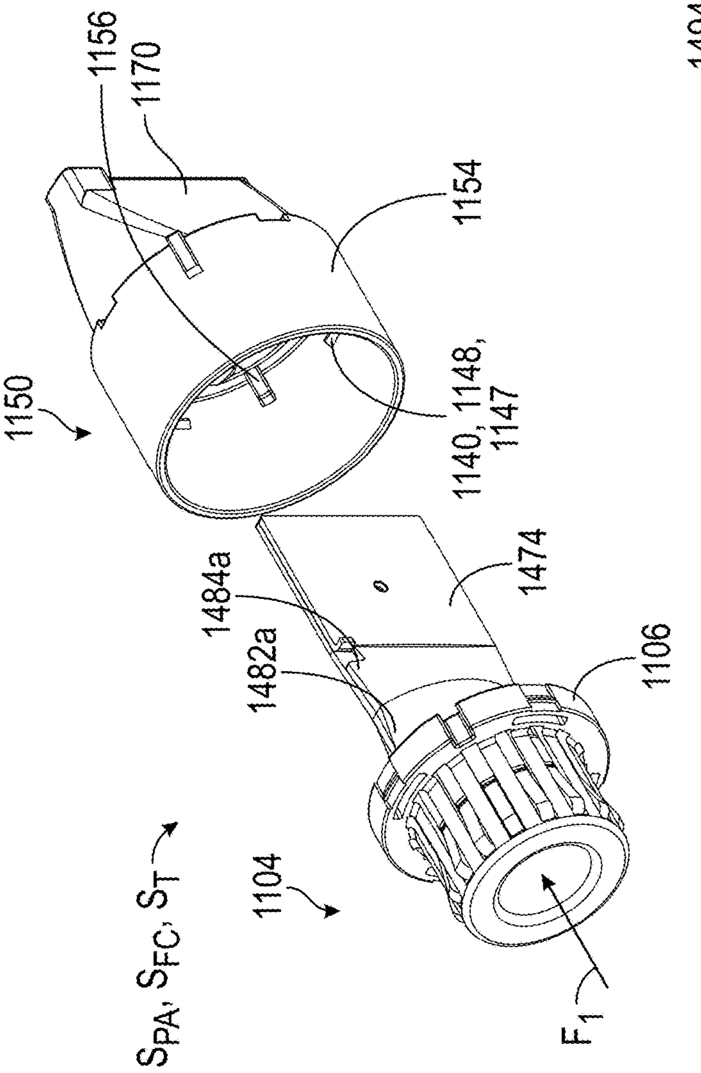
FIG. 30 is a perspective view of the male connector assembly of FIG. 3 in the partially assembled state ($S_{PA}$)
Figure 34:
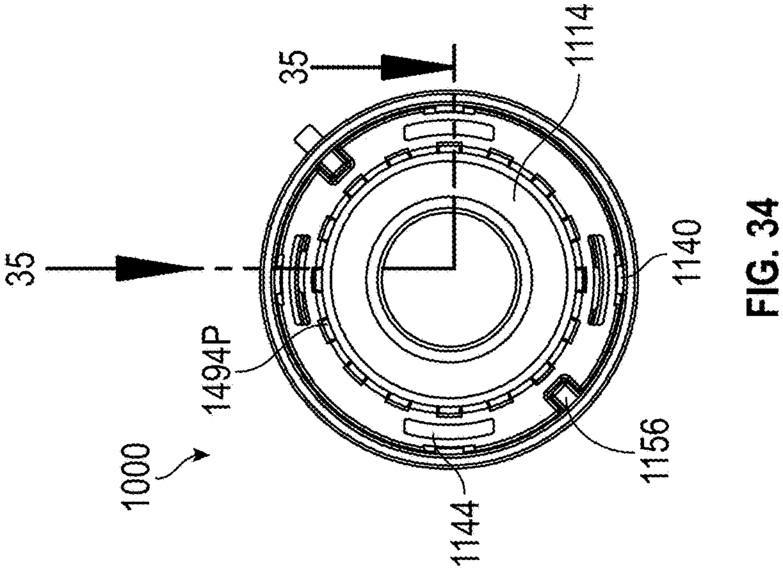
FIG. 34 is a front view of the male connector assembly of FIG. 31.
Figure 37:
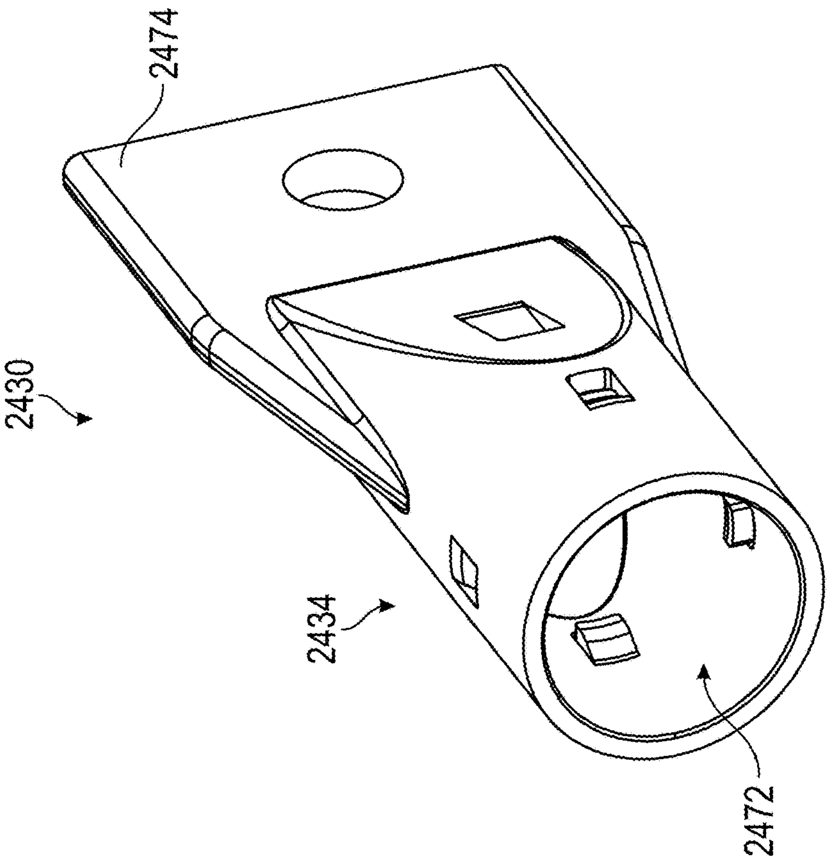
FIG. 37 is a perspective view of the female terminal assembly of FIG. 3.
Figure 36:
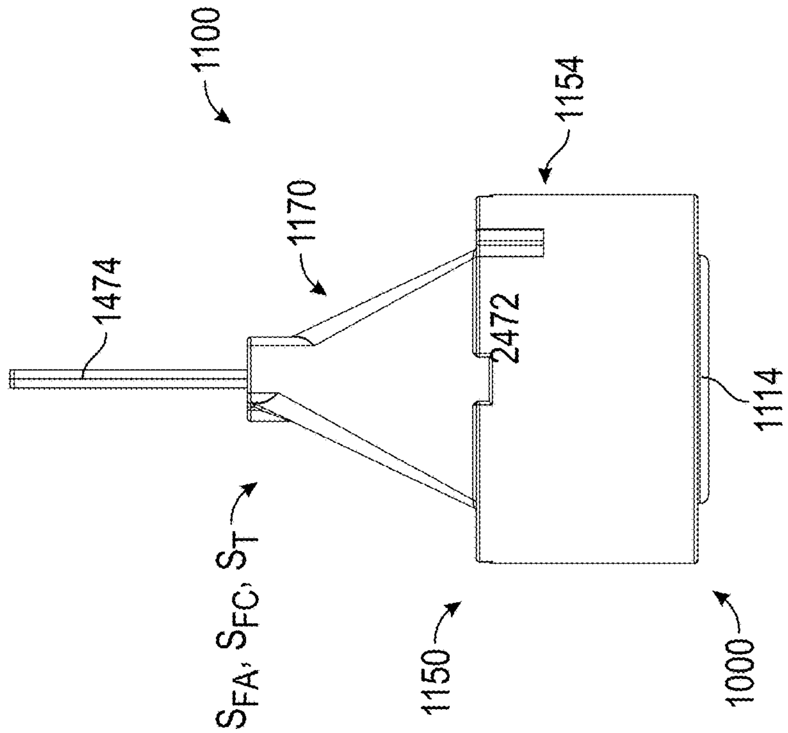
FIG. 36 is a top view of the male connector assembly of FIG. 31.
Figure 39:
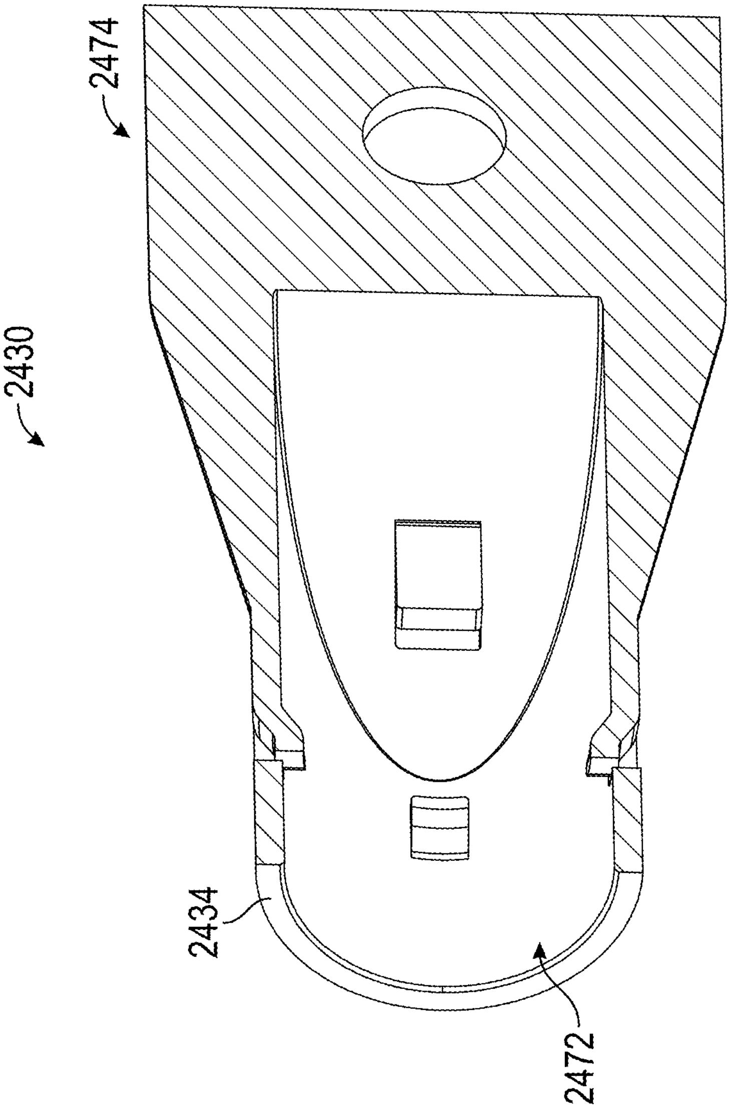
FIG. 39 is a cross-sectional view of the female terminal assembly taken along line 39-39 of FIG. 38.
Figure 38:
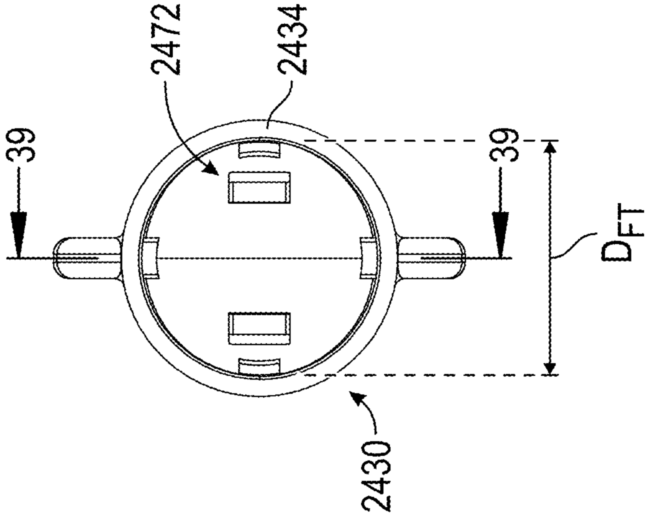
FIG. 38 is a front view of the female terminal assembly of FIG. 37.

As best shown in FIGS. 23, 30, and 34, the outer rear wall 1106 includes a number of recess keys or alignment recesses 1108. These recess keys 1108 are cooperatively dimensioned to receive projection keys or alignment projections 1156 formed in the exterior male housing portion 1150 of the male housing assembly 1100, when the male connector assembly 1000 is fully assembled state $S_{FA}$. The combination of recess keys 1108 and projection keys 1156 are configured to aid in properly aligning the male terminal assembly 1430 within the exterior male housing portion 1150. In other embodiments, the recess keys 1108 and projection keys 1156 may be replaced with: (i) additional similar structures (e.g., 5-30), (ii) fewer similar structures (e.g., 1-3), (iii) utilize other structures such as openings, apertures, recesses, or different types of projections that are cooperatively dimensioned and designed to properly align the male terminal assembly 1430 within the exterior male housing portion 1150, (iv) may be designed to interact with extents of the female connector assembly 2000 and/or (v) may aid be combined or replaced with the housing coupling means 1140.

As shown in FIGS. 21-24, 26, and 28, the outer sidewall or outer lateral wall 1110 extends laterally forward from a forward most extent of the outer rear wall 1106, has an outer surface 1110*a* that is radially positioned inward from the outer surface 1106*a* of the outer rear wall 1106, and has an inner surface 1110*b* that is substantially aligned with the inner surface 1106*b* of the outer rear wall 1106. Based on this configuration, outer and inner surfaces 1110*a*, 1110*b* have curvilinear configurations and are positioned to form a hollow cylinder or cylindrical shell shape with an outer diameter that is between 22 mm and 24 mm, preferably 22.8 mm and an interior diameter that is between 20 mm and 22 mm, preferably 21 mm. Additionally, the outer sidewall 1110 includes an arrangement of contact arm apertures 1111 formed therein and extend along the length of the outer sidewall 1110. The arrangement of contact arm apertures 1111 allows the male housing assembly 1100 to encase or surround a majority of the male terminal assembly 1430, while still allowing the contact arms 1494*a*-1494*p* to make contact with the female terminal assembly 2430. The arrangement of contact arm apertures 1111 includes a plurality of contact arm apertures 1112*a*-1112*p*, wherein each contact arm aperture 1112*a*-1112*p* is aligned with one of the contact arm recesses 1107*a*-1107*p* and is designed to receive an extent of a contact arm 1494*a*-1494*p* of the male terminal body 1472. It should be understood that fewer contact arm apertures 1112*a*-1112*p* may be used because multiple contact arms 1494*a*-1494*p* may be positioned within a single aperture 1112*a*-1112*p*. For example, two contact arms 1494*a*-1494*p* may be placed within a single aperture 1112*a*-1112*p*, or a single aperture may contain all contact arms 1494*a*-1494*p*.

Figure 22:
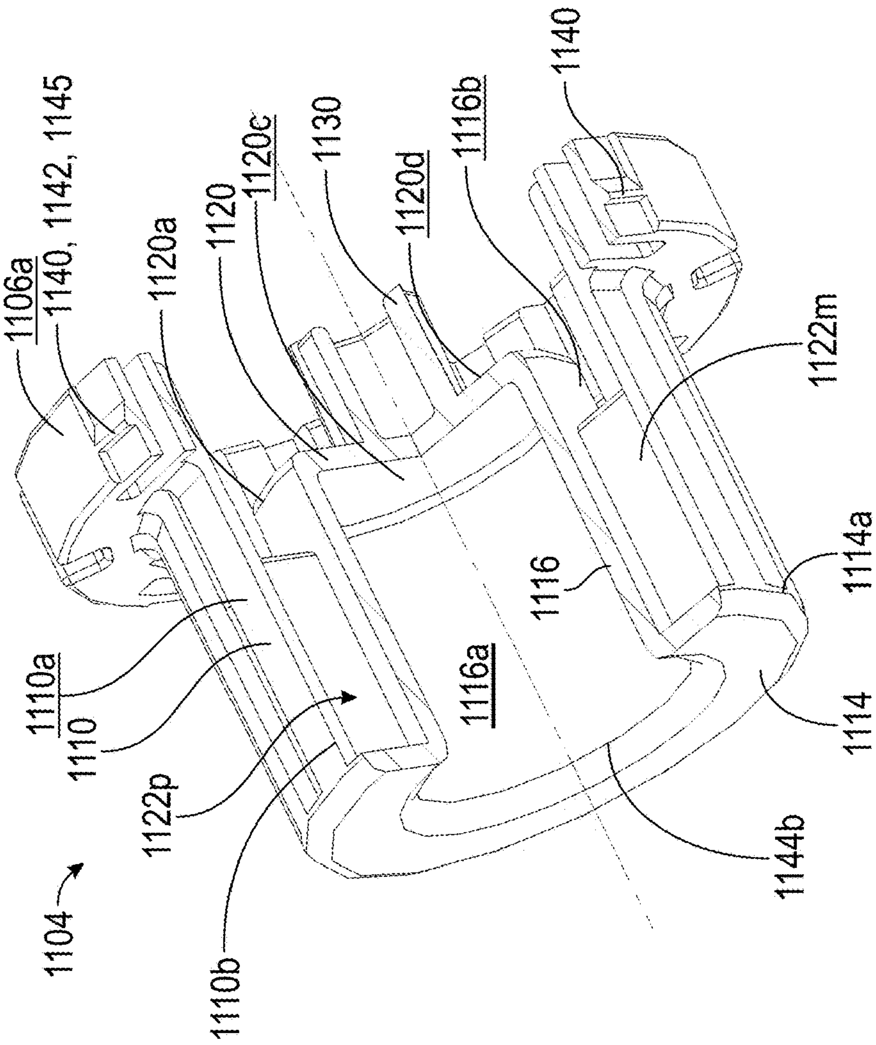
FIG. 22 is a cross-sectional view of the housing taken along line 22-22 of FIG. 21.
Figure 21:
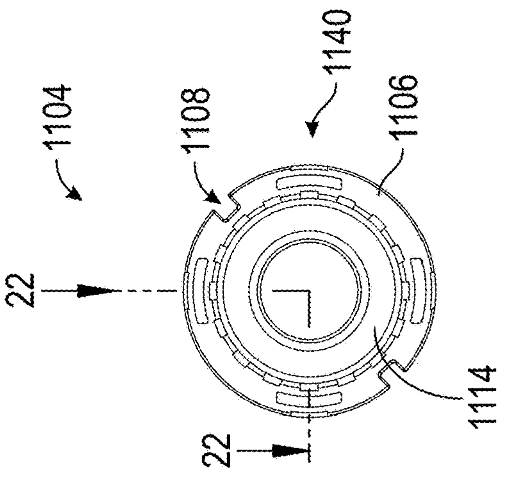
FIG. 21 is a front view of an extent of the housing of the male connector assembly of FIG. 3.
Figure 24:
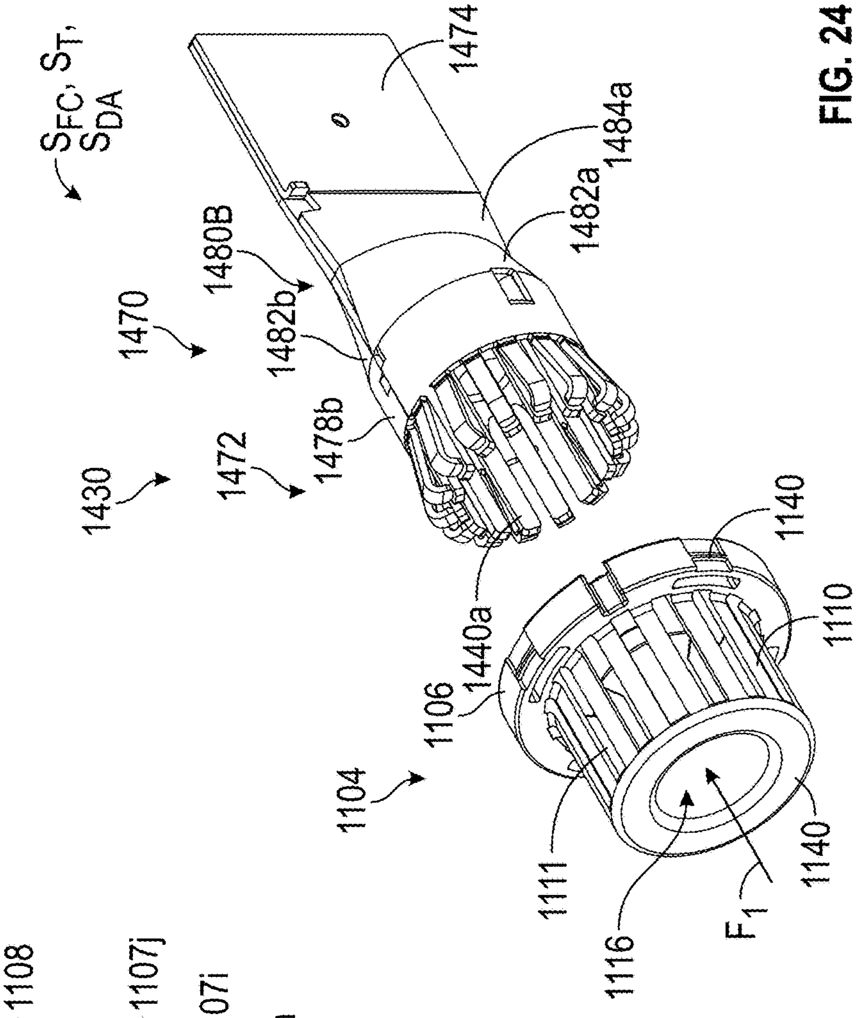
FIG. 24 is a perspective view of the male connector assembly of FIG. 3 in the disassembled state ($S_{DA}$), and wherein a rear extent of the housing is omitted.

As best shown in FIGS. 22 and 33, the front wall 1114 extends from the outer sidewall 1110 and is positioned substantially perpendicular to an extent of the outer sidewall 1110. The front wall 1114 includes an outer edge 1114*a* and inner edge 1114*b*, wherein each edge 1114*a*, 1114*b* has curvilinear configurations and is positioned to form a hollow cylinder or cylindrical shell shape. The outer edge 1114*a* is substantially aligned with the outer surface 1110*a* of the outer sidewall 1110, while the inner edge 1114*b* is positioned radially inward from the inner surface 1110*b* of the outer sidewall 1110. As such, the outer edge 1114*a* has a diameter that is 22.8 mm, and the inner edge 1114*b* has a diameter that is 12.8 mm. The configuration of the outer sidewall 1110 is designed to place the front wall 1114 forward of the contact arm 1494*a*-1494*p* and spring arm 1452*a*-1452*p*, when the male connector assembly 1000 is in a fully assembled state $S_{FA}$. In fact, an inner surface 1114*c* of the front wall 1114 is positioned adjacent to and nearly abuts the free end 1446 of the spring member 1440*a*. The front wall 1114 is designed to make contact with an extent of the female connector assembly 2000, when the high ampacity connector system 100 is in the fully connected state $S_{FCON}$ (described in greater detail below).

Figure 47:
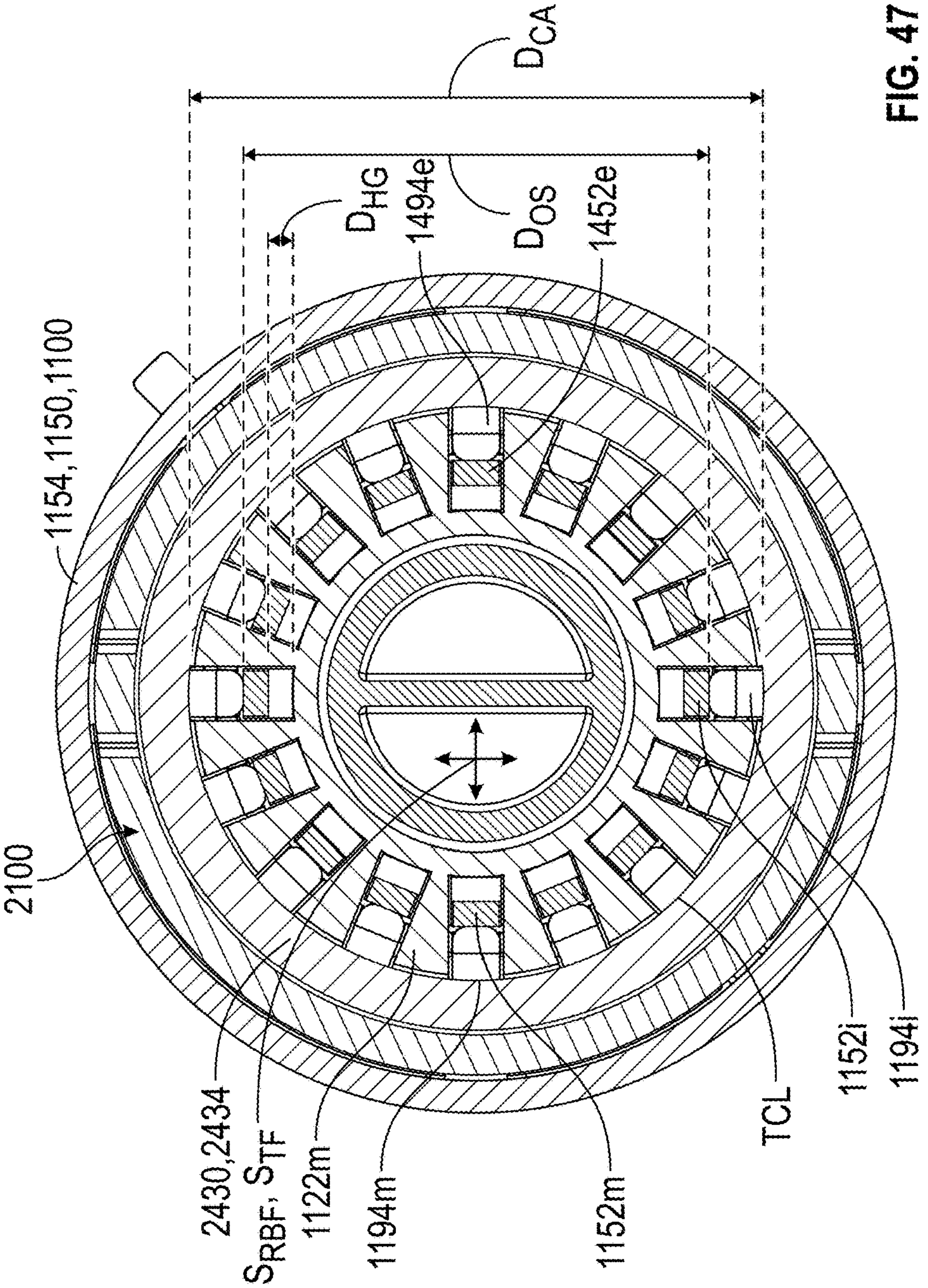
FIG. 47 is a cross-sectional view of the connector system taken along line 47-47 of FIG. 46.
Figure 46:
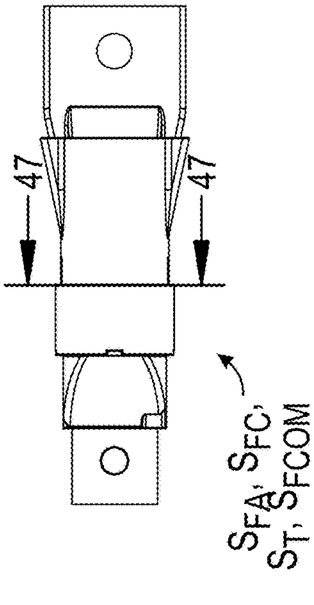
FIG. 46 is a side view of the connector system of FIG. 1 in a fully connected state ($S_{FCON}$)
Figure 48:
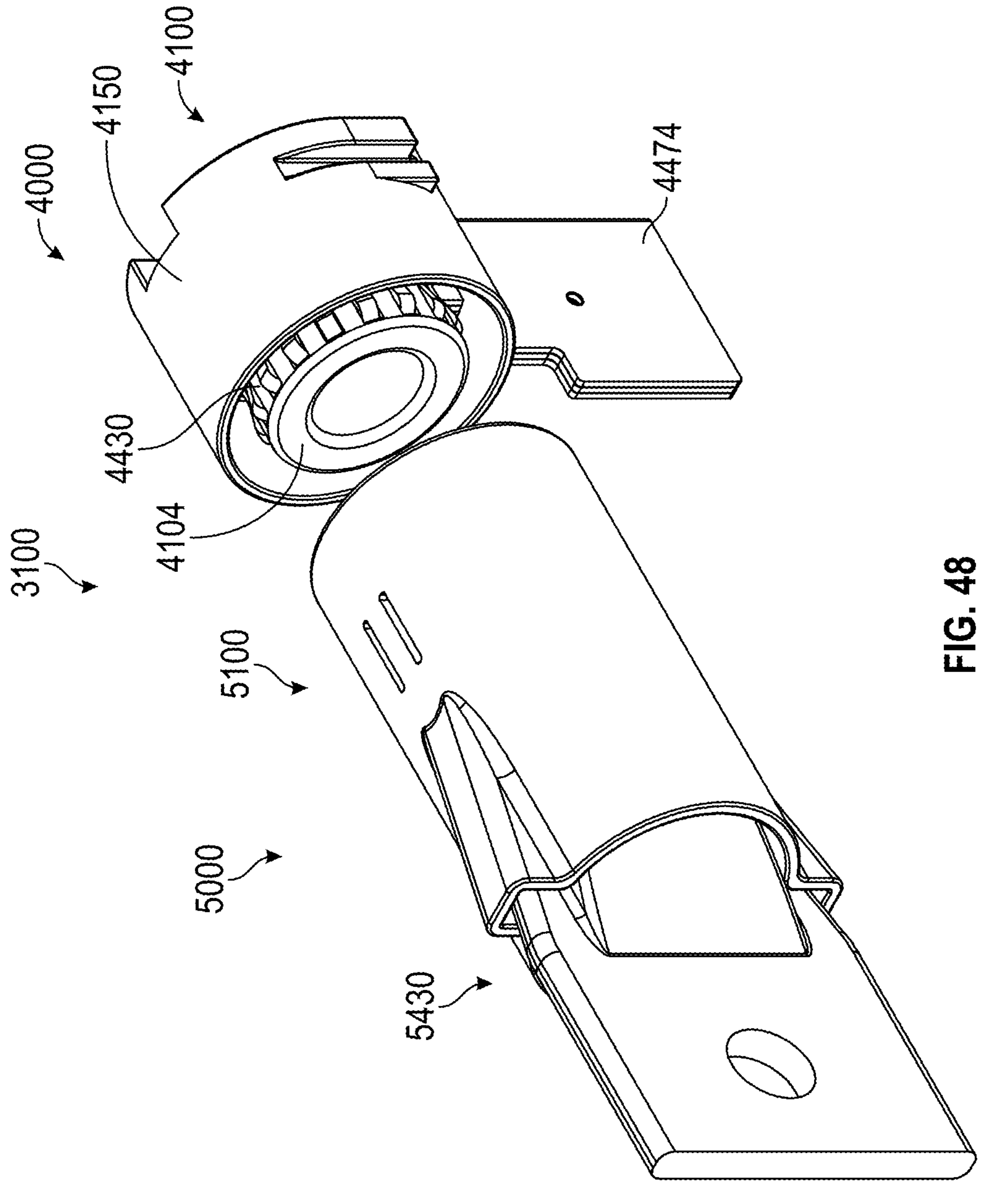
FIG. 48 is a perspective view of a second embodiment of a connector system featuring high ampacity performance and having a male connector assembly and a female connector assembly, showing the connector system in a disconnected state ($S_{DCON}$)
Figure 49:
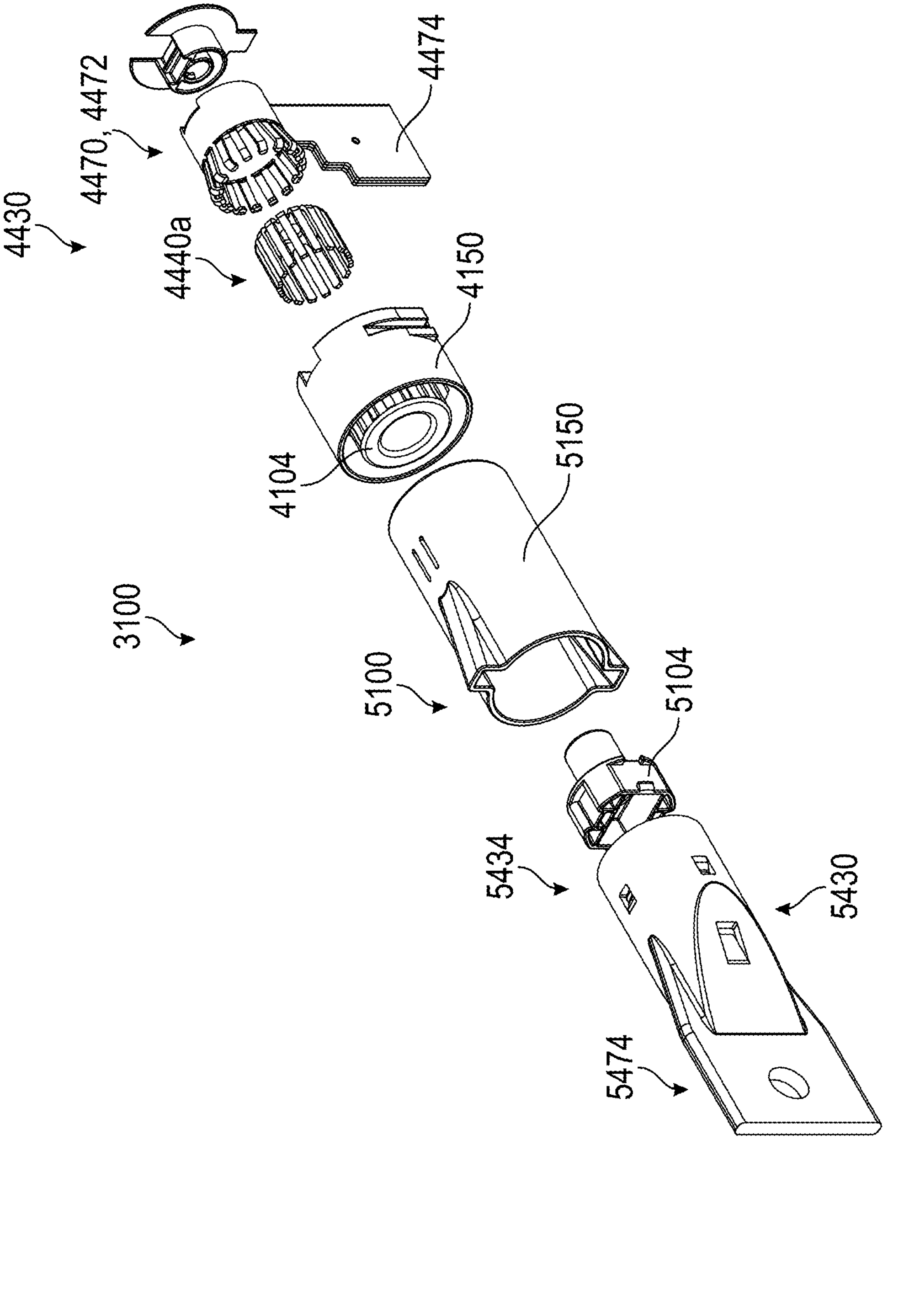
FIG. 49 is an exploded view of the connector system of FIG. 48.
Figure 51:
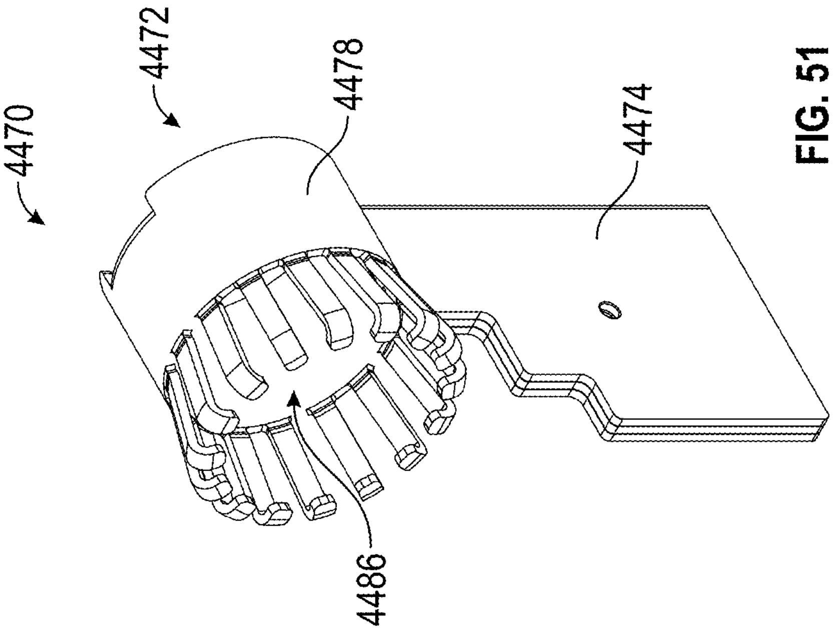
FIG. 51 is a perspective view of the male terminal body of the male terminal assembly of FIG. 50.
Figure 50:
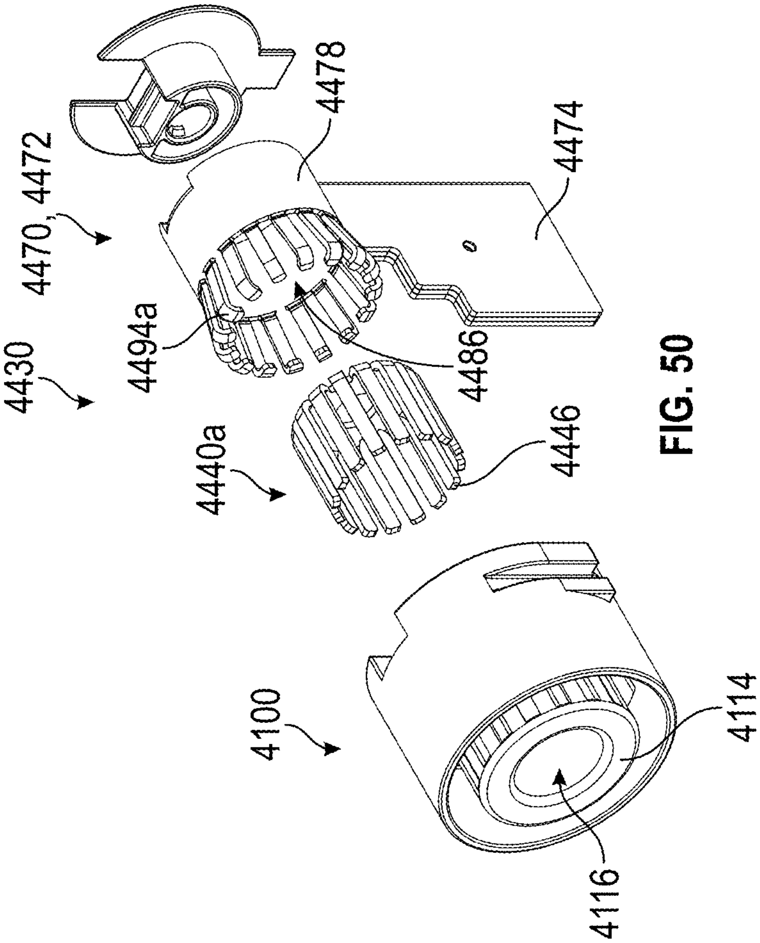
FIG. 50 is an exploded view of the male connector assembly of the connector system of FIG. 48 in a disassembled state ($S_{DA}$), the male connector assembly having a housing and a male terminal assembly that includes a male terminal body and a spring member.
Figure 53:
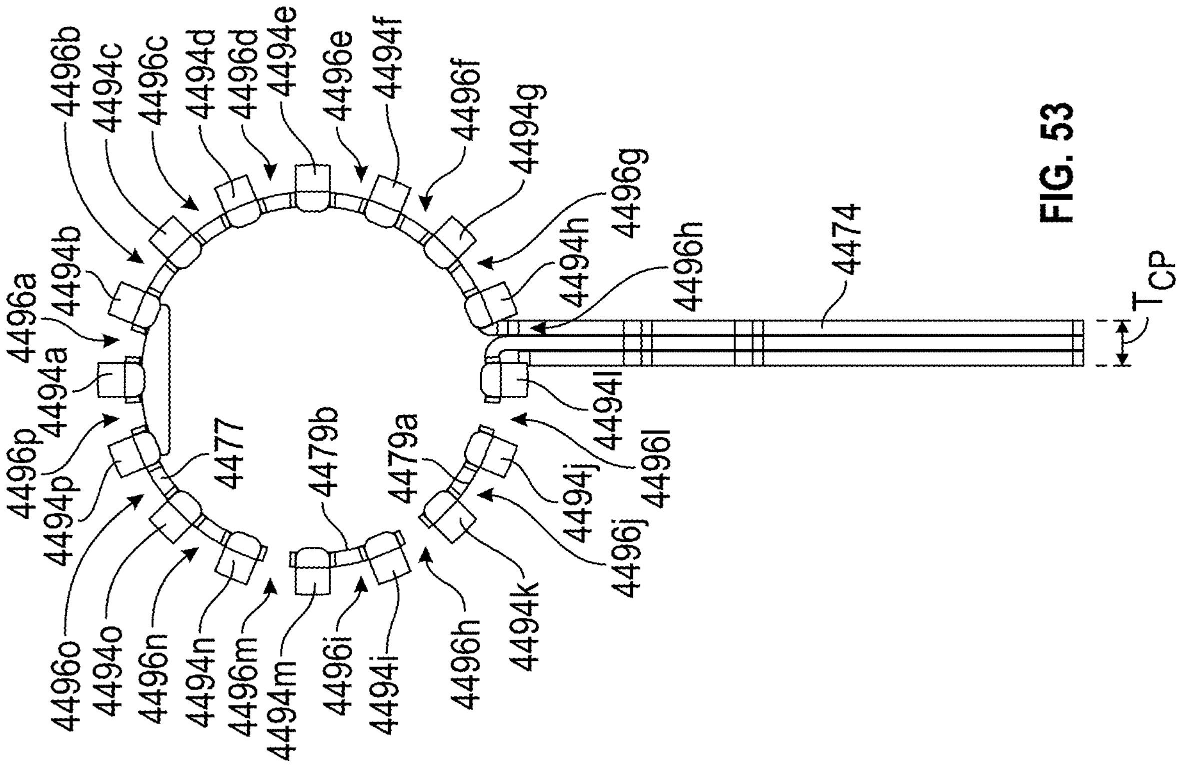
FIG. 53 is a front view of the male terminal body of FIG. 51.
Figure 52:
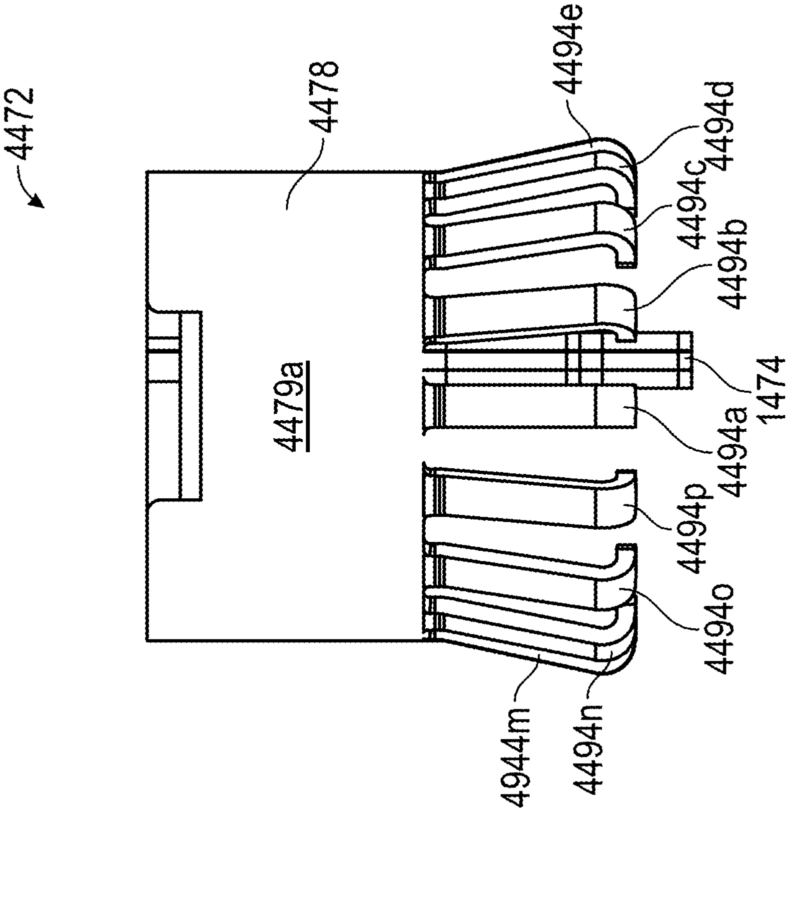
FIG. 52 is a top view of the male terminal body of FIG. 51.

As shown in FIGS. 22, 23, 29, and 33, the interior sidewall or inner lateral wall 1116 extends rearward from the front wall 1114 and has a shape that complements the outer sidewall 1110. In other words, the interior sidewall 1116 is substantially parallel with the outer sidewall 1110 and has a length that is shorter than the outer sidewall 1110. The interior sidewall 1116 has: (i) an outer surface 1116*a* that is radially positioned inward from: (a) the inner surface 1106*b* of the outer rear wall 1106 and (b) the outer edge 1114*a* of the front wall 1114 and (ii) an inner surface 1116*b* that is substantially aligned with the inner edge 1114*b* of the front wall 1114. Based on this configuration, outer and inner surfaces 1116*a*, 1116*b* have curvilinear configurations and are positioned to form a hollow cylinder or cylindrical shell shape with an outer diameter that is between 12 mm and 15 mm, preferably 13.8 mm and an interior diameter that is between 11 mm and 14 mm, preferably 12.8 mm. As best shown in FIGS. 29 and 47, the outer surface 1116*a* is configured such that it does not make contact with the internal spring member 1440*a*. In particular, the outer surface 1116*a* is positioned a distance from the inner surface of the spring arms 1452*a*-1452*p* to define a housing gap distance $D_{HG}$ when the spring member 1440*a* is in an uncompressed state (i.e., when the male terminal body 1472 is not positioned within an extent of the female terminal body 2434). In the uncompressed state, the housing gap distance $D_{HG}$ is between 0.5 mm and 3 mm, preferably 1 mm (see FIG. 29). This housing gap distance $D_{HG}$ is reduced when the spring member 1440*a* is in a compressed state (i.e., when the male terminal body 1472 is positioned within an extent of the female terminal body 2434 or the connector 100 is in the fully connected state $S_{FCON}$). Specifically, this reduction of the housing gap distance $D_{HG}$ in the compressed state is between 0.1 mm and 1 mm, preferably 0.4 mm (see FIG. 47). The inward positioning of the interior sidewall 1116 ensures that this wall 1116 does not interfere with the operation of the male terminal assembly 1430.

As shown in FIGS. 22, 23, 28, 29, and 47, the interior male housing portion 1104 includes separation walls 1122*a*-1122*p* configured to separate the contact arms 1494*a*-1494*p* and spring arms 1452*a*-1452*p* from one another. In other words, the combination of the outer sidewall 1110, the front wall 1114, and the interior sidewall 1116 forms a male terminal body receiver 1124 that receives an extent of the male terminal body 1472. The separation walls 1122*a*-1122*p* are positioned within the male terminal body receiver 1124 and specifically extend between the outer surface 1116*a* of the interior sidewall 1116 and the inner surface 1110*b* of the outer sidewall 1110. Due to the configuration of the sidewalls 1110, 1116, the separation walls 1122*a*-1122*p* have a triangular shape, and as such the lateral surfaces are not parallel with one another. This triangular shape allows the lateral surfaces 1123 of the separation walls 1122*a*-1122*p* to be positioned adjacent to lateral surfaces 1493 of the contact arms 1494*a*-1494*p* and lateral surfaces 1451 spring arms 1452*a*-1452*p*. This positional relationship of the lateral surfaces 1123, 1493, 1451 helps center the spring arms 1452*a*-1452*p* below the contact arms 1494*a*-1494*p*. Or in other words, it aligns the spring member 1440*a* with the spring receiver 1486 of the male terminal body 1472. It should be understood that the lateral surfaces 1123 of the separation walls 1122*a*-1122*p* are configured not to contact the contact arms 1494*a*-1494*p* or the spring arms 1452*a*-1452*p*. However, manufacturing tolerances and installation procedures may cause some contact to occur between these structures. Nevertheless, the separation walls 1122*a*-1122*p* provide additional rigidity to the male connector assembly 1000, aid in the alignment of components of the male connector assembly 1000, and helps ensure proper spacing between the contact arms 1494*a*-1494*p* and the spring arms 1452*a*-1452*p* to provide a 360 degree compliant connector assembly 1000.

The male connector assembly 1000 disclosed herein relies on the housing assembly 1100 to help position the spring member 1440*a* within the male terminal body 1472. This reliance on the housing 1100 is in contrast to the terminal structures (e.g., lateral projections 1454*a*-1454*d* of the spring member 1440*c* and the interior surface of the male terminal body 1472) that are used to align the spring arms 1452*a*-1452*p* with the contact arms 1494*a*-1494*p* of the connector system disclosed in PCT/US2020/143686. In other words, the housing assembly 1100 disclosed in PCT/US2020/143686 is not configured to center the spring member 1440*c* within the male terminal body 1472; instead, the male terminal assembly 1430 was modified to help ensure that the spring member 1440*c* is suitably positioned within the male terminal body 1472. Unlike the housing assembly 1100 disclosed in PCT/US2020/143686, the housing assembly 1100 disclosed herein is more substantial with a greater amount of material that helps ensure that the housing assembly 1100 is not deformed by the terminal assembly 1430. It should be understood that in an alternative embodiment, the mass of the housing assembly 1100 disclosed herein may be reduced and/or structures that are disclosed within PCT/US2020/143686 may be added to the spring member 1440*a* to facilitate the proper positioning of the spring member 1440*a* in the male terminal body 1472.

As shown in FIGS. 22 and 23, the internal rear wall 1120 extends from the interior sidewall 1116 and is positioned: (i) substantially perpendicular to an extent of the interior sidewall 1116 and (ii) substantially parallel with the front wall 1114. The internal rear wall 1120 includes an outer edge 1120*a* that has a curvilinear configuration and is substantially aligned with the outer surface 1116*a* of the inner sidewall 1116. As such, the outer edge 1120*a* has a diameter that is 13.8 mm and has a disk-like shape. The internal rear wall 1120 also includes: (i) a front surface 1120*c* that is configured to be positioned adjacent to a portion of the female connector assembly 2000, when the connector system 100 is in a fully connected state $S_{FCON}$ and (ii) a rear surface 1120*d* that is configured to be positioned adjacent to the spring member 1440*a*, when the male terminal assembly 1000 is in the fully assembled state $S_{FA}$. Additionally, the combination of interior sidewall 1116 and interior rear wall 1120 forms a connector receptacle 1126. As discussed in greater detail below, the connector receptacle 1126 is designed to receive an extent of the female connector assembly 2000 when the high ampacity connector system 100 is in a fully connected state $S_{FCON}$.

As best shown in FIGS. 22, 23, and 33, a centering projection 1130 extends from the rear surface 1120*d* of the internal rear wall 1120. The centering projection 1130 is designed to fit within an opening 1445 of the spring member 1440*a*. In certain embodiments, the centering projection 1130 may include ribs that are designed to be received by recesses that are formed within the spring member 1440*a* to help ensure that the spring member 1440*a* does not rotate during installation or use. Additionally, the combination of the rear wall 1120, interior sidewall 1116, and the front wall 1114 protects the male terminal assembly 1430 from multiple things, including accidental discharge due to the insertion of foreign objects. It should be understood that the outer rear wall 1106, the outer sidewall 1110, the front wall 1114, the interior sidewall 1116, and the internal rear wall 1120 may be integrally formed or may be formed from separate pieces. For example, these structures 1106, 1110, 1114, 1116, 1120 may be integrally formed using an injection molding process or 3D printing process. Alternatively, each or a combination of these structures may be formed and then may be coupled to one another after formation. The coupling of these structures may include deformable coupling means or other mechanical coupling means.

The exterior male housing portion 1150 of the male housing assembly 1100 is designed to surround a substantial extent of the male terminal body 1472. The exterior male housing portion 1150 is primarily composed of a forward extent 1154 and a rearward extent 1170. The forward extent 1154 surrounds and protects the contact arms 1494*a*-1494*p* from multiple aspects, including accidentally coming into contact with a foreign object. Due to the height of the outer rear wall 1106, an inner surface 1154*a* of the forward extent 1154 is positioned a receiving height $H_R$ (e.g., between 3 mm and 5 mm, preferably 4.3 mm) away from the outer surface 1116*a* of the interior sidewall 1116. This receiving height $H_R$ is designed to allow the female terminal assembly 2430 to make contact with the male terminal assembly 1430 and is determined by the designer by balancing the protection of the contact arms 1494*a*-1494*p*, the thickness of the female connector assembly 2000 that fits within this space, and the manufacturing/installation tolerances. Balancing these factors should be done in a manner that optimizes the protection of the contact arms 1494*a*-1494*p*, while ensuring that the high ampacity connector system 100 can properly function.

As described above and best shown in FIG. 33, the forward extent 1154 includes the exterior coupling housing member 1146 of the housing coupling means 1140. The exterior housing coupling member 1146 are projections 1147 that are cooperatively dimensioned to mate with the projections 1143 of the interior housing coupling member 1142. The mating of the exterior housing coupling member 1146 with the interior housing coupling member 1142 couples the exterior male housing portion 1150 to the interior male housing portion 1104. As described above, it should be understood that the exterior housing coupling member 1146 may: (i) include additional structures (e.g., 5-30), (ii) fewer structures (e.g., 1-3), (iii) utilize other structures such as openings, apertures, recesses, or different types of projections that are cooperatively dimensioned and designed to interact with the exterior housing coupling member 1146.

As best shown in FIGS. 30, 31, 33, and 35, the rearward extent 1170 is integrally formed with the forward extent 1154 and is configured to substantially encase the rear extent of the male terminal body 1472. As such, the rearward extent 1170 includes an arrangement of sidewalls 1172 positioned adjacent to the sidewalls of the terminal body 1472. The housing assembly 1100 and specifically the interior male housing portion 1104 and rearward extent 1170 of the exterior male housing portion 1150 made using any known technique (e.g., injection molding techniques, 3D printing, cast, thermoformed, or etc.) from a non-conductive material. Specifically, non-conductive materials are discussed within PCT/US2019/36127, which is incorporated herein by reference.

FIGS. 1-36 and 40-47 provide various views of the male terminal assembly 1430 for this first embodiment of the connector system 100. The male terminal assembly 1430 includes a spring member 1440*a* and a male terminal 1470. The male terminal 1470 includes a male terminal body 1472 and a male terminal connection member or plate 1474. Said male terminal body 1472 includes: (i) a plurality of contact arms 1494*a*-1494*p*, (ii) a base wall or band 1478*a*-1478*b*, and (iii) a rear male terminal wall assembly 1480*a*-1480*b*. The combination of these contact arms 1494*a*-1494*p*, base wall 1478*a*-1478*b*, and rear male terminal wall assembly 1480*a*-1480*b* forms a spring receiver 1486 that is designed to receive the spring member 1440*a*.

Referring to FIGS. 11-20, the spring member 1440*a* includes a spring member sidewall 1442 and a rear spring wall 1444. The spring member sidewall 1442 includes: (i) a plurality of first sections or curvilinear spring sections 1448*a*-1448*p* and (ii) a plurality of second sections or spring arms 1452*a*-1452*p*. The curvilinear spring sections 1448*a*-1448*p* extend between the rear spring wall 1444 and the spring arm 1452*a*-1452*p* and position the spring arm 1452*a*-1452*p* substantially perpendicular to the rear spring wall 1444.

The spring arms 1452*a*-1452*p* extend from the curvilinear spring sections 1448*a*-1448*p*, away from the rear spring wall 1444, and terminate at the free end 1446. The spring arms 1452*a*-1452*p* are arranged along a curvilinear spring arm path. In the embodiments shown in the Figures, this curvilinear spring arm path is in the form of a circle. It should be understood that the curvilinear spring arm path in other embodiments may not be circular, but instead may be an oval, oblong, ellipse, crescent, curvilinear triangle, quatrefoil, teardrop, or any other shape that has a curvilinear path. In even a further embodiment, the path that the spring arms 1452*a*-1452*p* follow may not be completely curvilinear and instead may only have one curvilinear aspect and other aspects that are substantially linear. For example, in this alternative embodiment, the spring arms may be arranged in a modified square, wherein the top linear extent of the square has been removed and replaced with a curvilinear extent. It should be understood that other similar combinations are contemplated by this disclosure.

The spring arms 1452*a*-1452*p* have a substantially linear outer surface 1453 and have a width that is between 1 mm and 3 mm, preferably is 2 mm. As discussed in greater detail below, the width of each spring arm 1452*a*-1452*p* is slightly larger than the width of the associated contact arm 1494*a*-1494*p*. This slight increase in width helps ensure that the spring member 1440*a* can properly and evenly apply a biasing force on the contact arms 1494*a*-1494*p* when the connector system 100 is in various states or is subject to certain operating conditions. Also, as shown in the Figures, the spring member 1440*a*—namely, the spring arms 1452*a*-1452*p*—lack structures (e.g., lateral projections 1454*a*-1454*d* of the spring member 1440*c*) that are used to align the spring arms 1452*a*-1452*p* with the contact arms 1491*a*-1494*p* as disclosed in connection with the connector system discussed in PCT/US2020/143686.

As shown in the Figures, the spring arms 1452*a*-1452*p* are not directly connected to one another. In other words, there are spring arm gaps 1450*a*-1450*p* that extend between: (i) the spring arms 1452*a*-1452*p*, (ii) between the curvilinear spring sections 1448*a*-1448*p*, and (iii) into an extent of the rear wall 1444. This configuration allows for the omnidirectional movement of the spring arms 1452*a*-1452*p*, which facilitates the mechanical coupling between the male terminal 1470 and the female terminal assembly 2430. It should further be understood that the spring arms 1452*a*-1452*p* are not surrounded or partially surrounded by sidewall structures. Instead, the spring arms 1452*a*-1452*p* alternate with the spring arm gaps 1450*a*-1450*p* alone the curvilinear spring arm path. In other embodiments, the spring arms 1452*a*-1452*p* may be coupled to other structures to restrict their omnidirectional expansion. The number and width of individual spring arms 1452*a*-1452*p* and openings may vary. In addition, the width of the individual spring arms 1452*a*-1452*p* is typically equal to one another; however, in other embodiments, one or more than one of the spring arms 1452*a*-1452*p* may be wider than other spring arms.

The spring member 1440*a* is typically formed from a single piece of material (e.g., metal); thus, the spring member 1440*a* is a one-piece spring member 1440*a* or has integrally formed features. In particular, the curvilinear spring sections 1448*a*-1448*p* and the spring arms 1452*a*-1452*p* are integrally formed with one another. To integrally form these features, the spring member 1440*a* is typically formed using a die forming process. The die forming process mechanically forces the spring member 1440*a* into the proper shape. As discussed in greater detail in PCT/US2018/19787 and PCT/US2019/36010, when the spring member 1440*a* is formed from a flat sheet of metal, installed within the male terminal 1472, inserted into the female receptacle 2472, and is subjected to elevated temperatures, the spring member 1440*a* applies an outwardly directed spring thermal force $S_T$ on the contact arms 1494*a*-1494*p* due in part to the fact that the spring member 1440*a* attempts to return to a flat sheet. However, it should be understood that other ways of forming the spring member 1440*a* may be utilized, such as stamping, pressing, drawing, casting, printing, or a similar method of manufacturing. In other embodiments, the features of the spring member 1440*a* may not be formed from a one-piece or be integrally formed, but instead formed from separate pieces that are welded together.

Unlike the spring arm 31 that is disclosed within FIGS. 4-8 of PCT/US2018/19787, the free end 1446 of the spring arms 1452*a*-1452*p* do not have a curvilinear component that extends along the length of the spring arm 1452*a*-1452*p*. Instead, the spring arms 1452*a*-1452*p* have a substantially planar outer surface. This configuration is beneficial because it ensures that the forces associated with the spring 1440*a* are applied substantially perpendicular to the free end 1488 of the male terminal body 1472. In contrast, the curvilinear components of the spring arm 31 are disclosed within FIGS. 4-8 of PCT/US2018/19787 do not apply a force in this manner. Additionally, unlike the spring 1440*c* disclosed in PCT/US2020/143686, the spring 1440*a* disclosed herein does not include lateral projections 1454*a*-1454*d* that are used to properly position the spring member 1440*c* within the male terminal body 1472.

In an alternative embodiment that is not shown, each spring arm 1452*a*-1452*p* may not have a substantially linear configuration and instead may have a curvilinear configuration along the width of the spring arm 1452*a*-1452*p*. In another embodiment, the width of each spring arm 1452*a*-1452*p* may be increased (thus, reducing the number of spring arms 1452*a*-1452*p*) and each spring arm 1452*a*-1452*p* may have a curvilinear configuration. In this embodiment, the spring member may have three spring arms, wherein each spring arm extends around an extent (e.g., 110 degrees) of a circle. In a further embodiment, each spring arm 1452*a*-1452*p* may have a curvilinear configuration that is not based on a circle, but instead is based upon an oval, oblong, ellipse, crescent, curvilinear triangle, quatrefoil, teardrop, or any other shape that has a curvilinear extent.

In a further alternative embodiment, the spring member 1440*a* may include: (i) a centering means (e.g., spring member 1440*c*, disclosed within PCT/US2020/143686) and/or (ii) recesses and associated strengthening ribs (e.g., spring member 1440*b*, disclosed within PCT/US2019/36010). The centering means may be: (i) formed as a part of the internal rear wall 1120, (ii) it may be formed by a projection that extends inward from the interior wall of the male housing assembly 1100 (e.g., projection that fits between one pair of contact arms 1494*a*-1494*p*), (iii) a projection that extends outward from the spring member 1440*a* and fits within a recess formed within the male housing assembly 1100, or (iv) a combination of these structures.

Figure 20:
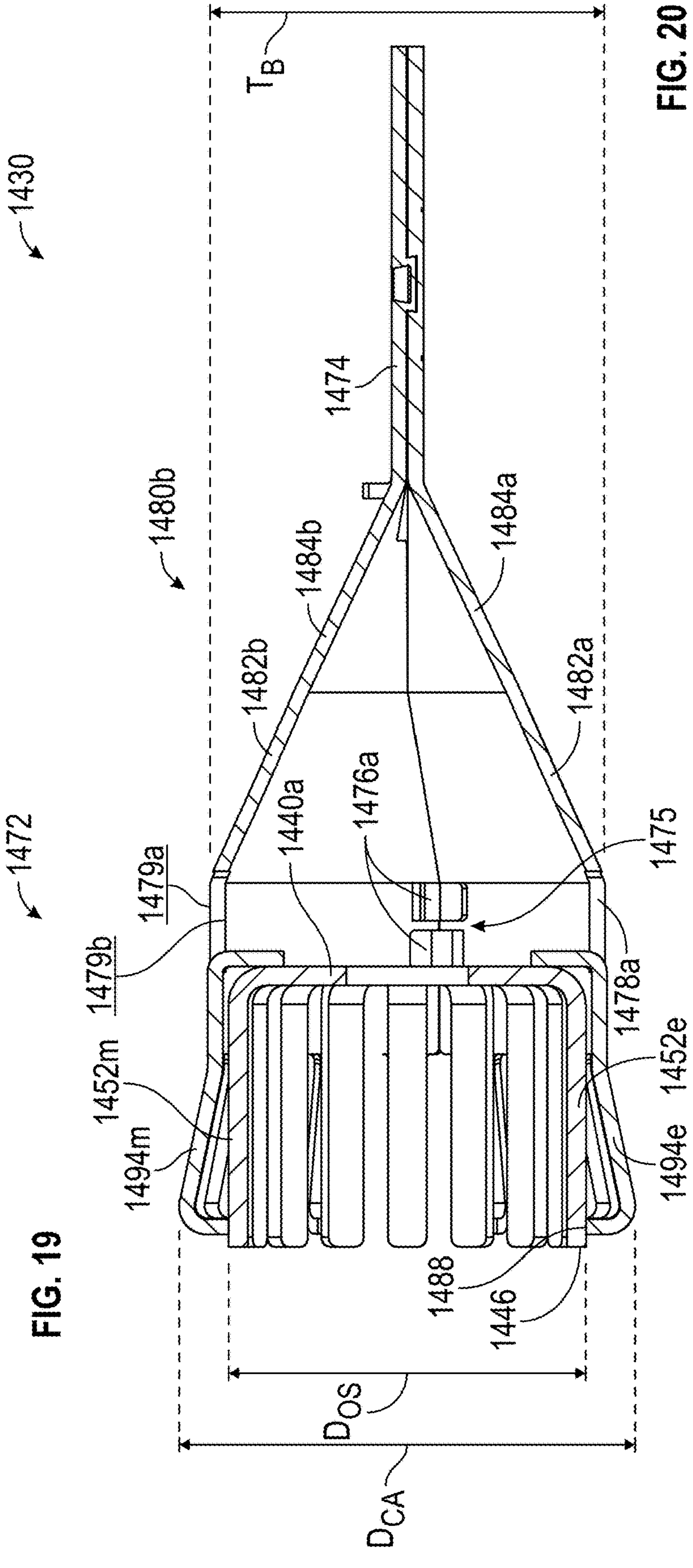
FIG. 20 is a cross-sectional view of the male terminal assembly taken along line 20-20 of FIG. 19.

The above changes to the configuration of the spring member 1440*a* or other changes (e.g., thickness) to the spring member 1440*a* may alter the forces that are associated with the spring 1440*a*. Alterations to the forces that are associated with the spring 1440*a*, alter the forces associated with coupling/decoupling the male and female connector assemblies 1000, 2000. In particular, the spring biasing force $S_{BF}$ is the amount of force that is applied by the spring member 1440*a* to resist the inward deflection of the free end 1446 of the spring member 1440*a* when the male terminal assembly 1430 is inserted within the female terminal assembly 2430. Specifically, as best shown in FIGS. 20 and 47, the internal spring member 1440*a* has an outer spring diameter Dos when the spring member 1440*a* is in an uncompressed state (i.e., when the male terminal assembly 1430 is not positioned within an extent of the female terminal body 2434). In this uncompressed state, the outer spring diameter Dos is between 16 mm and 22 mm, preferably between 18 and 20 mm, and most preferably 18.8 mm (see FIG. 20). This outer spring diameter Dos is reduced when the spring member 1440*a* is in a compressed state (i.e., when the male terminal assembly 1430 is positioned within an extent of the female terminal body 2434 or the connector 100 is in the fully connected state $S_{FCON}$) because an extent of an outer surface of the male terminal body 1472 is slightly larger (1% to 20% larger) than the interior of the female receptacle 2472. In this compressed state, the outer spring diameter Dos is between 14 mm and 20 mm, preferably 18 mm (see FIG. 47).

In other words, when the male terminal assembly 1430 is inserted into the female terminal assembly 2430, the extent of the outer surface is forced radially inward towards the center 1490 of the male terminal 1470. This inward force on the outer surface displaces the free end 1446 of the spring member 1440*a* inward (i.e., towards the center 1490). The spring member 1440*a* resists this inward displacement by providing the spring biasing force $S_{BF}$. Because the spring biasing force $S_{BF}$ is associated with inward deflection occurs during the insertion of the male terminal assembly 1430 into the female terminal assembly 2430, said spring biasing force $S_{BF}$ factors into the insertion force associated with mating the male connector assembly 1000 with the female connector assembly 2000. This insertion force of this connector 100 is targeted to be at or below 45 Newtons, which is the maximum that is permitted by a connector to meet class 2 of USCAR 25, and is below 75 Newtons, which is the maximum that is permitted by a connector to meet class 3 of USCAR 25. Thus, the disclosed connector 100 can: (i) meet the insertion force requirement of both classes 2 and 3 of the USCAR specifications, (ii) does not require a lever assist, and (iii) provides high ampacity with a rating to transfer or carry at least 500 amps of current over time without the connector 100 experiencing performance degradation and/or failure.

As shown in FIGS. 1-36 and 40-47, the male terminal connection plate 1474 is coupled to the male terminal body 1472 and is configured to receive an extent of a structure (e.g., lead or wire) that connects the male terminal assembly 1430 to a device (e.g., an alternator) or component of a power distribution system external to the high ampacity connector system 100. The male terminal connection plate 1474 has: (i) a height $H_{CP}$ that is between 18 mm and 29 mm, preferably is 23.6 mm, (ii) a length $L_{CP}$ that is between 18 mm and 29 mm, preferably is 23 mm, and (iii) a thickness $T_{CP}$ that is between 1 mm and 3 mm, preferably is 1.65 mm. To ensure that the connector 100 does not include a current choke point, the cross-sectional area of the male terminal connection plate 1474 at the body connection location BCL (i.e., the location where the male terminal connection plate 1474 is coupled to the male terminal body 1472) should be greater than, or equal to, the cross-sectional area of the contact arms 1494*a*-1494*p* at the terminal connection location TCL (i.e., the location where the arms 1494*a*-1494*p* contact the inner surface of the female receptacle 2472). In other words, the height $H_{CP}$ of the male terminal connection plate 1474 (e.g., 23.6 mm)*thickness $T_{CP}$ of the male terminal connection plate 1474 (e.g., 1.65 mm) should be greater than, or equal to, the thickness $T_{CA}$ of the contact arms 1494*a*-1494*p* (e.g., 0.8 mm)*number of contact arms (e.g., 16)*contact width $W_{CA}$ of the contact arms 1494*a*-1494*p* (e.g., 1.9 mm). Accordingly, the cross-sectional area of the male terminal connection plate 1474 at the body connection location is (i.e., 38.94 $mm^2$) is greater than the cross-sectional area of the contact arms 1494*a*-1494*p* at terminal connection location (i.e., 24.32 $mm^2$). Thus, a current choke point between the male terminal connection plate 1474 and the male terminal body 1472 will not be formed.

It should be understood that the height or the thickness of the male terminal connection plate 1474 may be reduced as long as the cross-sectional area of the male terminal connection plate 1474 is greater than, or equal to, the cross-sectional area of the contact arms 1494*a*-1494*p*. However, reducing the height or length of the male terminal connection plate 1474 should be considered in light of the fact that the male connector assembly 1000 is currently designed to accept a 120 $mm^2$ wire 1495 to enable the connector assembly 100 to carry over 500 amps. In other words, reducing the size of the male terminal connection plate 1474 to a size that prevents the connector's 100 ability to accept 120 $mm^2$ wire 1495 may have a greater effect on reducing the ampacity of the connector 100 than the creation of a minor current choke point that could be formed between the male terminal connection plate 1474 and the male terminal body 1472. In light of the above discussion, a designer of similar connector systems must consider multiple factors, (e.g., the cross-sectional area of the male terminal connection plate 1474, the cross-sectional area of the contact arms 1494a-1494p, material properties of the terminal, wire sizes, and etc.) when designing a connector system intended to meet USCAR specifications, ampacities, and other requirements. As such, theoretical designs that attempt to modify conventional connectors or combine extents of conventional designs are insufficient, technically unsound, and defective because they amount to mere design exercises that are not tethered to the complex realities of designing, testing, manufacturing and certifying actual connectors, like the connector system 100.

As shown in FIGS. 4-10, the male terminal body 1472 is formed as two separate and distinct portions, namely—a first or right portion 1473a and a second or left portion 1473b. In the embodiment shown in the Figures, both the first and second portions 1473a-1473b are identical; thereby reducing manufacturing costs, assembling times, and potential part shortages. These identical portions 1473a-1473b are then joined together using a joining means 1475. In this embodiment, the joining means 1475 are tabs 1476a-1476b that are configured to: (i) extend outward from the outer edge of the portions 1473a-1473b and (ii) be positioned under an extent of the abutting portion 1473a-1473b, when the portion 1473a-1473b are coupled to one another to form the joined state ($S_J$). Forming the male terminal body 1472 from two separate and distinct portions 1473a-1473b simplifies manufacturing and helps ensure that the terminal body 1472 has a curvilinear configuration that is in the shape of a circle. In other embodiments, the joining means 1475 may be other mechanical coupling structures (e.g., recesses, openings, projections, etc.) or chemical coupling structures (e.g., welding, brazing, etc.).

It should also be understood that the male terminal 1470 may be formed from a single sheet of metal or more portions (e.g., four). Additionally, it should be understood that each piece of the male terminal 1470 includes a number of integrally formed structures (e.g., contact arms 1494, base 1478a-1478b, and rear male terminal wall assembly 1480a-1480b). However, in other embodiments, these structures may not be integrally formed or other manufacturing methods may be utilized. For example, stamping, pressing, drawing, casting, printing, or a similar method of manufacturing may be utilized may be used. Additionally, the integrally formed structures may be individually formed and welded together.

As shown in FIGS. 4-10, the rear male terminal wall assembly 1480a-1480b is coupled between the male terminal connection plate 1474 and the base wall 1478a-1478b. Each rear wall assembly 1480a-1480b is formed from two extents, namely—a first or forward transition extent 1482a-1482b and a second or rear transition extent 1484a-1484b. The second or rear transition extent 1484a-1484b: (i) is coupled between the first or forward transition extent 1482a-1482b and the male terminal connection plate 1474, and (ii) starts the angular transition from the linear connection plate 1474 to the base wall 1478a-1478b. In particular, an angle alpha α extending between an outer side surface of the connection plate 1474 and an outer surface of the rear transition extent 1484a-1484b is between 120 degrees and 170 degrees, preferably is 155 degrees, while angle beta β extending between an outer top surface of the connection plate 1474 and an outer surface of the rear transition extent 1484a-1484b is between 150 degrees and 210 degrees, preferably is 185 degrees. The angular transition can also be noted by the increase in the thickness of the terminal body 1472 to this extent, as it extends from approximately 1.65 mm to approximately 12 mm at the widest point. Overall, this transition section has a length $L_R$ that is approximately 11 mm, an internal width $W_{IR}$, that extends from the center line to the forwardmost extent, is approximately 5.22 mm, and a height that is shrinking from 23.6 mm to 22 mm.

The first or forward transition extent 1482a-1482b: (i) is coupled between the base wall 1478a-1478b and the second or rear transition extent 1484a-1484b, and (ii) finishes the angular transition from the linear connection plate 1474 to the base wall 1478a-1478b. In particular, an angle gamma γ extending between the outer surface of the rear transition extent 1484a-1484b and an outer surface of the forward transition extent 1482a-1482b is between 170 degrees and 190 degrees, preferably is 180 degrees, while angle delta δ extending between the outer surface of the rear transition extent 1484a-1484b and the outer surface of the forward transition extent 1482a-1482b is between 160 degrees and 190 degrees, preferably is 177.5 degrees. Additionally, an angle epsilon ε extending between the outer surface of the forward transition extent 1482a-1482b and the base wall 1478a-1478b is between 180 degrees and 225 degrees, preferably is 205 degrees, while angle zeta (extending between the outer surface of the forward transition extent 1482a-1482b and the base wall 1478a-1478b is between 160 degrees and 200 degrees, preferably is 176 degrees. The angular transition can also be noted by the increase in the thickness of the terminal body 1472 to this extent, as it extends from approximately 12 mm to approximately 21 mm at the widest point. Overall, this transition section has a length $L_F$ that is approximately 10 mm, and internal width $W_{IF}$, that extends from the forwardmost extent of the rear transition extent 1484a-1484b to the forwardmost extent of the forward transition extent 1482a-1482b, is approximately 4.16 mm, and a height that is shrinking from 22 mm to 21 mm. It should be understood that in alternative embodiments, the rear male terminal wall assembly 1480a-1480b may be formed from a single extent that extends between the plate and the base wall 1478a-1478b.

Figure 8:
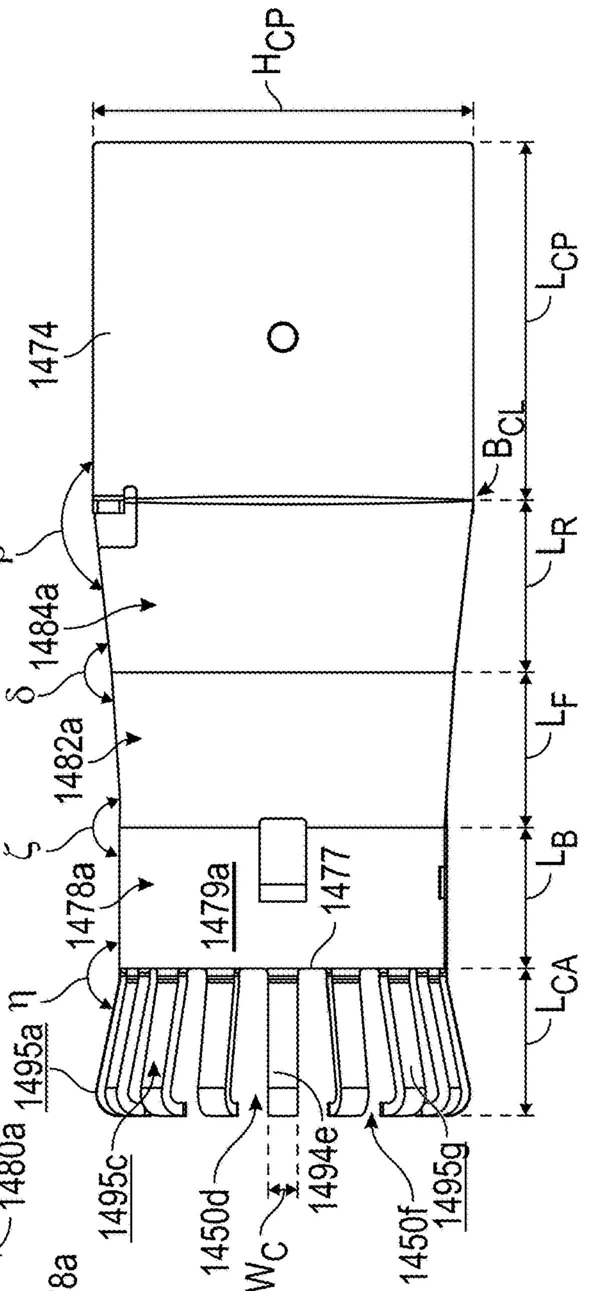
FIG. 8 is a side view of the male terminal body of FIG. 7.

The base wall or band 1478a-1478b extends forward from the first or forward transition extent 1482a-1482b. The base wall 1478a-1478b has an outer surface 1479a that has a curvilinear configuration and an inner surface 1479b that also has a curvilinear configuration. Said curvilinear configurations of the inner and outer surfaces 1479a-1479b form a hollow cylinder or cylindrical shell shape with: (i) a leading curvilinear and specifically cylindrical edge 1477, (ii) an outer diameter $D_{CA}$ or thickness that is between 20 mm and 22 mm, preferably 21 mm (e.g., a radius of 10.5 mm), and (iii) an interior diameter that is between 18 mm and 20 mm, preferably 19.4 mm (e.g., a radius of 9.7 mm). Referring to FIG. 8, the base wall 1478a-1478b has a length $L_B$ that is between 8 mm and 12 mm, preferably 9 mm; while the contact arms 1494a-1494p have a length $L_{CA}$ that is between 8 mm and 12 mm, preferably 9.5 mm. Thus, there is approximately a 1:1 ratio between the base wall length $L_B$ and contact arm length $L_{CA}$, where the base wall length $L_B$ is approximately 90% of the contact arm length $L_{CA}$. Reducing the base wall length $L_B$ below 90% of the contact arm length $L_{CA}$ can lead to manufacturing difficulties with a male terminal body 1472 that has a diameter that is greater than a predetermined value (e.g., 12 mm). In particular, these manufacturing difficulties include the inability to properly form a round connector that meets quality control requirements, USCAR specifications, predetermined manufacturing tolerances or other similar requirements using conventional mass-manufacturing connector tools. This approximate 1 to 1 ratio between the base wall length $L_B$ and contact arm length $L_{CA}$ of the connector system 100 disclosed herein is significantly different than and beneficial to the 1.5 to 1 ratio (i.e., side wall length is approximately 67% of the contact arm length) between the side wall length and contact arm length disclosed in the connector shown in PCT/US2020/143788. In other words, if the connector that is shown in PCT/US2020/143788 was scaled up, such that its diameter is over the predetermined value (e.g., 12 mm), then this connectors 1.5 to 1 ratio between side wall length and the contact arm length will lead to manufacturing difficulties.

As shown in FIGS. 4-10, the contact arms 1494*a*-1494*p*: (i) extend forward from the leading curvilinear edge 1477 of the base wall 1478*a*-1478*b*, (ii) extend away from: (a) the base wall 1478*a*-1478*b*, (b) rear male terminal wall assembly 1480*a*-1480*b*, and (c) male terminal connection plate 1474, and (iii) have an outer surfaces 1495*a*-1494*p* that radially expand from the outer surface 1479*a* of the base wall 1478*a*-1478*b*. In particular, the angle eta η, which extends between the outer surfaces 1495*a*-1494*p* of the contact arms 1494*a*-1494*p* and the outer surface 1479*a* of the base wall 1478*a*-1478*b*, is between 150 degrees and 179.9 degrees, preferably 168 degrees. In other words, the contact arms 1494*a*-1494*p* extend upward from parallel with the outer surface 1479*a* of the base wall 1478*a*-1478*b* at an angle may be between 0.1 degree and 20 degrees and is preferably between 8 degrees and 16 degrees and most preferably 12 degrees. This angled outer surface 1495*a*-1494*p* of the contact arms 1494*a*-1494*p* in comparison to the outer surface 1479*a* of the base wall 1478*a*-1478*b* causes the outermost extent of the contact arms 1494*a*-1494*p* to be 3 mm larger than the outermost extent of the base wall 1478*a*-1478*b*. In other words, the largest outer diameter $D_{CA}$ of the contact arms 1494*a*-1494*p* is 24 mm (i.e., largest outer radius RCA is 12 mm) and the outer diameter $D_{OB}$ or thickness of the base wall 1478*a*-1478*b* is 21 mm. This increase in the outer diameter of the contact arms 1494*a*-1494*p* allows for the contact arms 1494*a*-1494*p* to be compressed, deflected, or displaced inward and towards the center 1490 of the male terminal 1470, when the male terminal assembly 1430 is inserted into the female terminal assembly 2430 without causing the base wall 1478*a*-1478*b* to improperly come in contact with the female terminal assembly 2430.

As shown in the Figures, the contact arms 1494*a*-1494*p* are not directly connected to one another. In other words, there are contact arm openings 1496*a*-1496*p* positioned between the contact arms 1494*a*-1494*p* and extend along the lateral length of said contact arms 1494*a*-1494*p*. This configuration allows for the omnidirectional movement of the contact arms 1494*a*-1494*p*, which facilitates the mechanical coupling between the male terminal 1470 and the female terminal assembly 2430. When the male terminal assembly 1430 is in the fully coupled state $S_{FC}$, the contact arm openings 1496*a*-1496*p* are aligned with the spring arm gaps 1450*a*-1450*p*. This configuration of gaps 1450*a*-1450*p* forms the same number of spring arms 1452*a*-1452*p* as the number of contact arms 1494*a*-1494*h*. In other words, the embodiment includes 16 spring arms 1452*a*-1452*p* and 16 contact arms 1494*a*-1494*p*. It should be understood that in other embodiments, the number of spring arms 1452*a*-1452*p* may not match the number of contact arms 1494*a*-1494*p*. For example, there may be fewer spring arms 1452*a*-1452*p* than contact arms 1494*a*-1494*p*.

Figure 9:
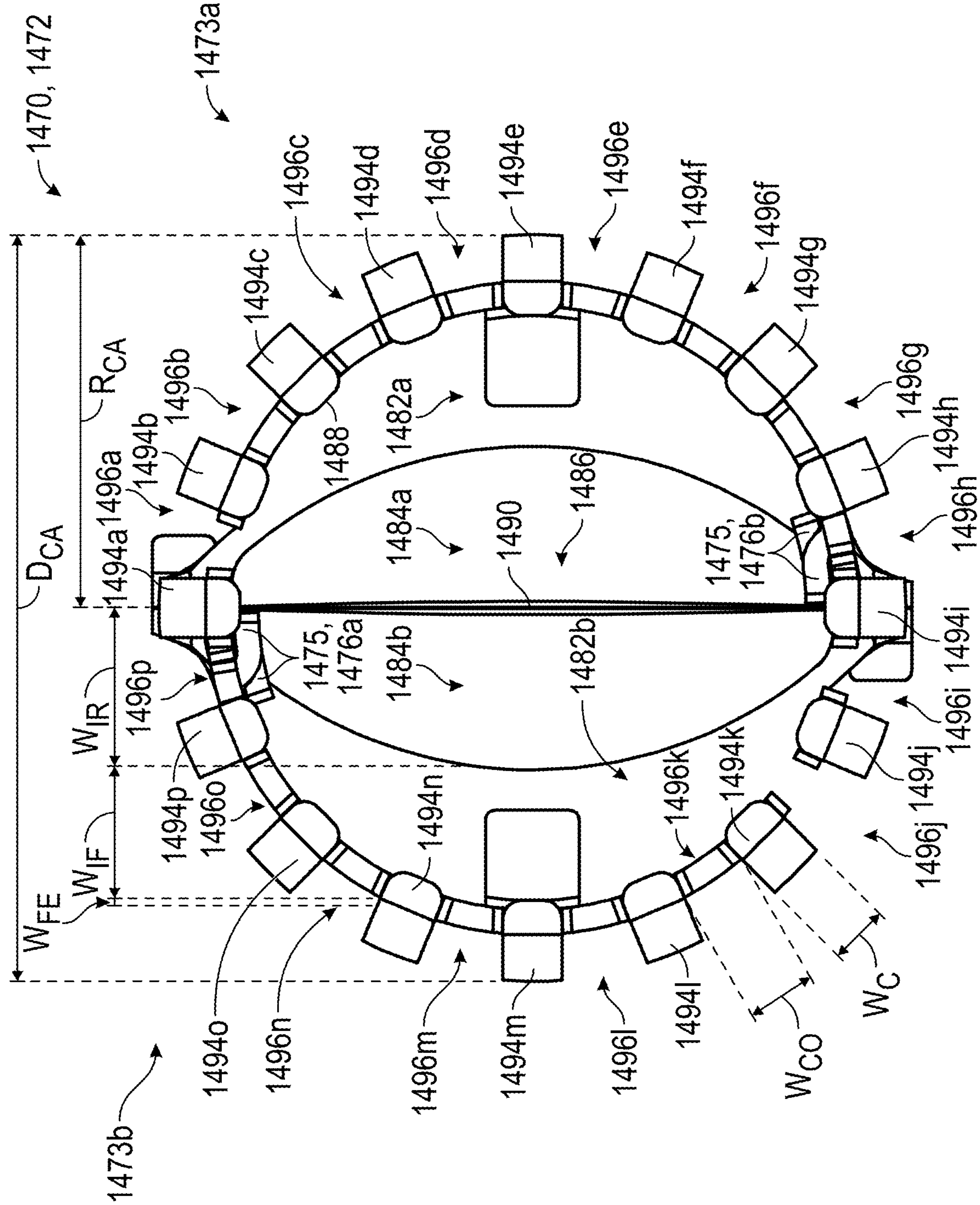
FIG. 9 is a front view of the male terminal body of FIG. 7.
Figure 10:
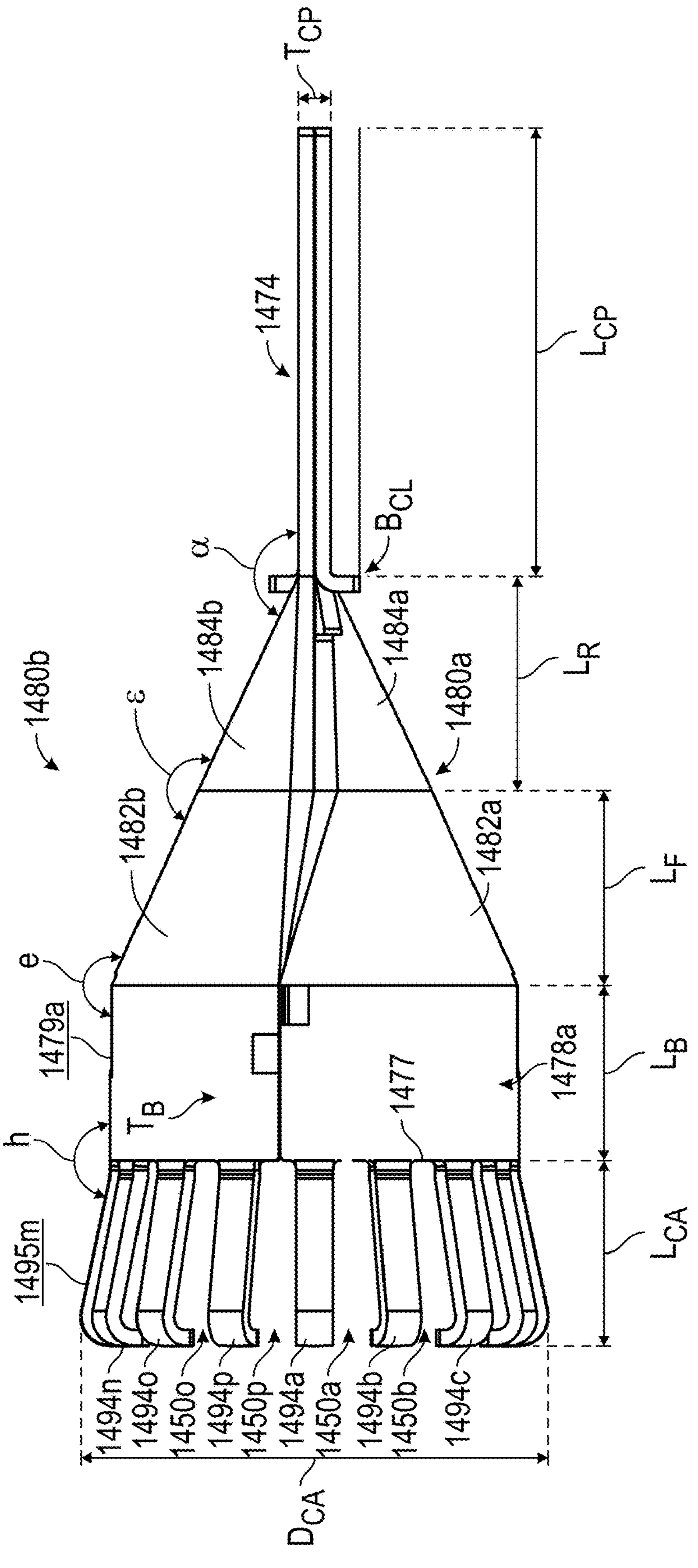
FIG. 10 is a top view of the male terminal body of FIG. 7.
Figure 11:
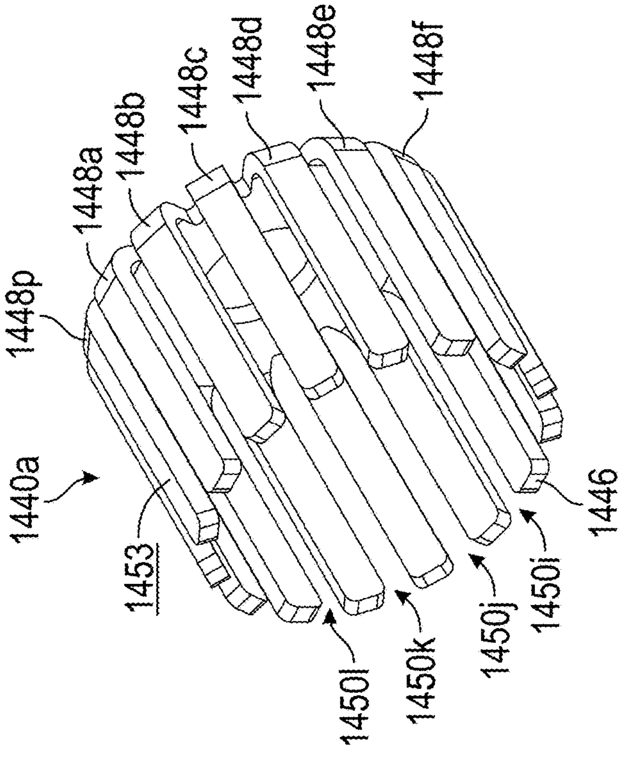
FIG. 11 is a front perspective view of the spring member of the male connector assembly of FIG. 3.
Figure 12:
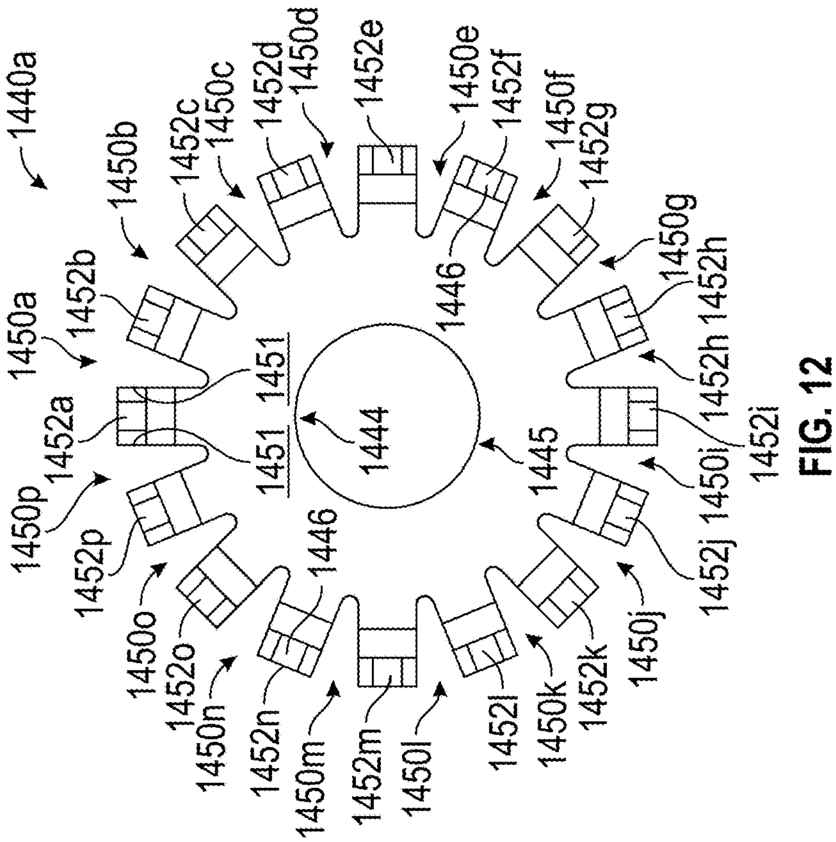
FIG. 12 is a front view of the spring member of FIG. 11.
Figure 14:
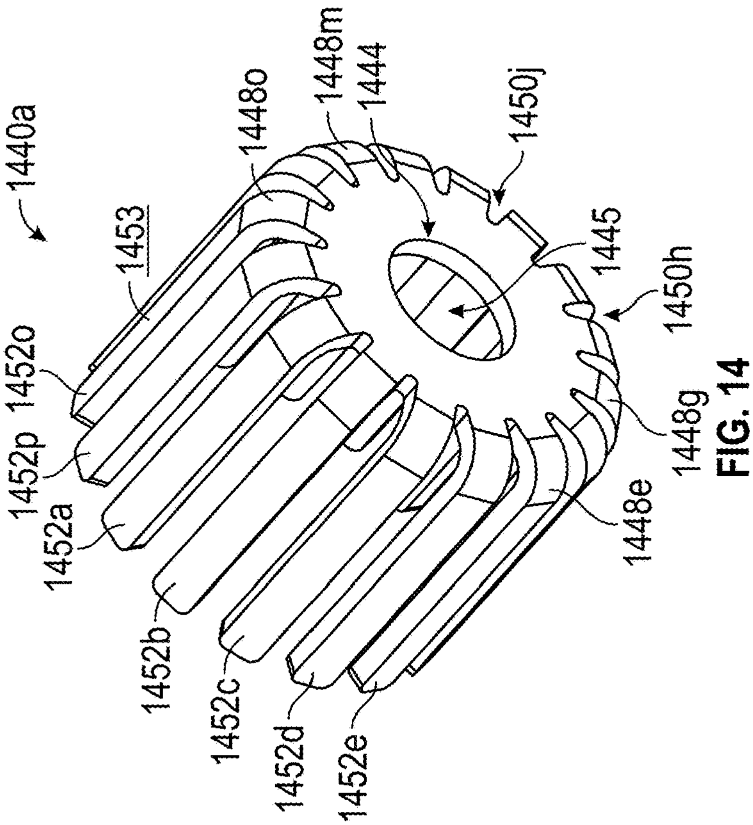
FIG. 14 is a rear perspective view of the spring member of FIG. 11.
Figure 13:
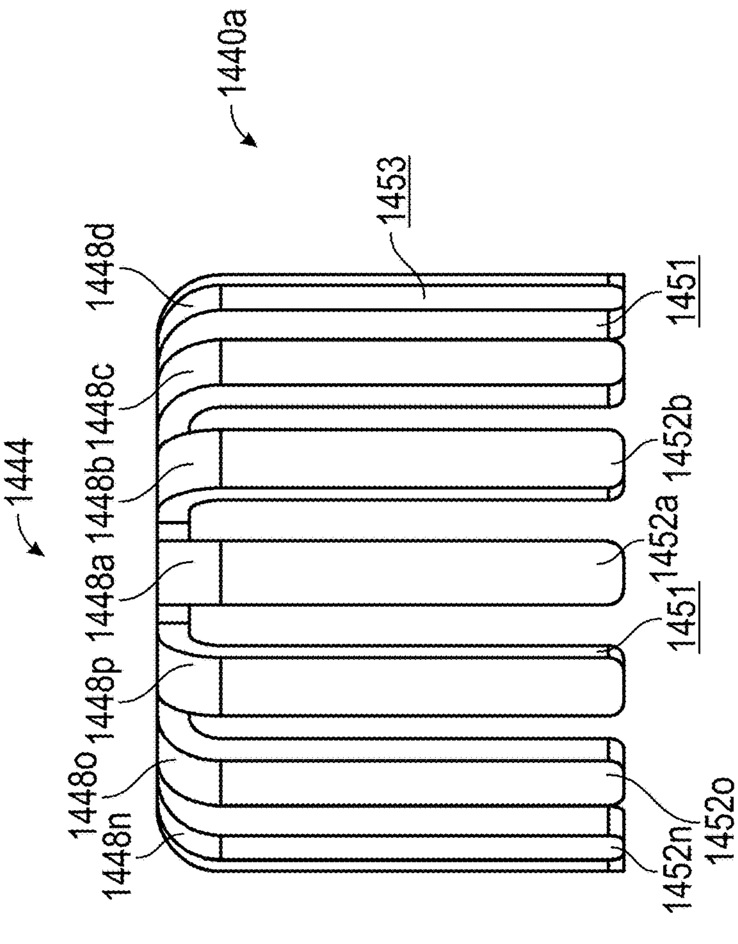
FIG. 13 is a top view of the spring member of FIG. 11.

To help ensure that the connector system 100 is 360 degree compliant and does not have disconnection associated problems, the contact arm opening $W_{CO}$ is equal to or less than the contact arm width $W_C$. In other words, if the connector's outer diameter is over a predetermined value (e.g., 12 mm) and the ratio between the contact arm opening $W_{CO}$ to contact arm width $W_C$ is greater than 1 to 1, then the connector system 100 may fail to meet the 360 degree compliance requirements. Referring to FIGS. 8 and 9, the contact arm opening width $W_{CO}$ and contact arm width We is between 1.5 mm and 2.5 mm, preferably 1.9 mm. It should be understood that other measurements are contemplated by this disclosure as long as the connector's outer diameter exceeds a predetermined value (e.g., 12 mm) and the width ratio of approximately 1 to 1 holds for these alternative embodiments. However, it should be understood that this 1 to 1 width ratio is an approximation and said ratio may deviate by up to 20% without causing 360 degree compliancy issues leading to disconnection issues.

The 1 to 1 ratio of the contact arm opening width $W_{CO}$ to the contact arm width We is also shown in the figures disclosed in PCT/US2020/143788. Specifically, those figures show a connector system with contact arm opening widths and contact arm widths that are between 2.5 mm and 3.5 mm, preferably 2.9 mm. While the connector system 100 disclosed herein and the connector system disclosed in PCT/US2020/143788 both have mechanical width ratios that are substantially similar, the contact arms 1494*a*-1494*p* disclosed herein does not have the current choke point that is formed in the contact arms of the connector disclosed within PCT/US2020/143788. As such, the effective electrical width of the contact arms of the connector disclosed within PCT/US2020/143788 is approximately 1.9 mm and is not effective equal to the mechanical width of 2.9 mm. Therefore, the connector disclosed in PCT/US2020/143788 has a mechanical 1 to 1 ratio, while having a 2 to 1 electrical ratio. In contrast, the connector system 100 disclosed herein does not have a similar current choke point in the contact arms 1494*a*-1494*p* and as result, this connector system 100 has mechanical and electrical ratios of 1 to 1.

Additionally, FIGS. 87-96 of PCT/US2020/143788 disclose a connector system with contact arm opening widths between 2 and 2.8 mm and contact arm widths between 1 mm and 1.4 mm. Accordingly, the connector system disclosed in FIGS. 87-96 of PCT/US2019/36010 has a 2 to 1 ratio that is substantially different than the connector system 100 disclosed herein. In other words, if the outer diameter of the male terminal disclosed in FIGS. 87-96 of PCT/US2019/36010 was increased from approximately 6.5 mm to 24 mm to create a revised male terminal, and then this revised male terminal would fail certain 360 degree compliant testing requirements. In fact, even connectors that have a 1.45 to 1 ratio have failed certain 360 degree compliant testing requirements. In summary, the approximate 1 to 1 ratio provided by the disclosed connector system 100 ensures that said connector system 100 will meet the 360 degree compliant testing requirements leading to a substantial benefit over connectors that cannot meet this compliance testing requirement.

Figure 7:
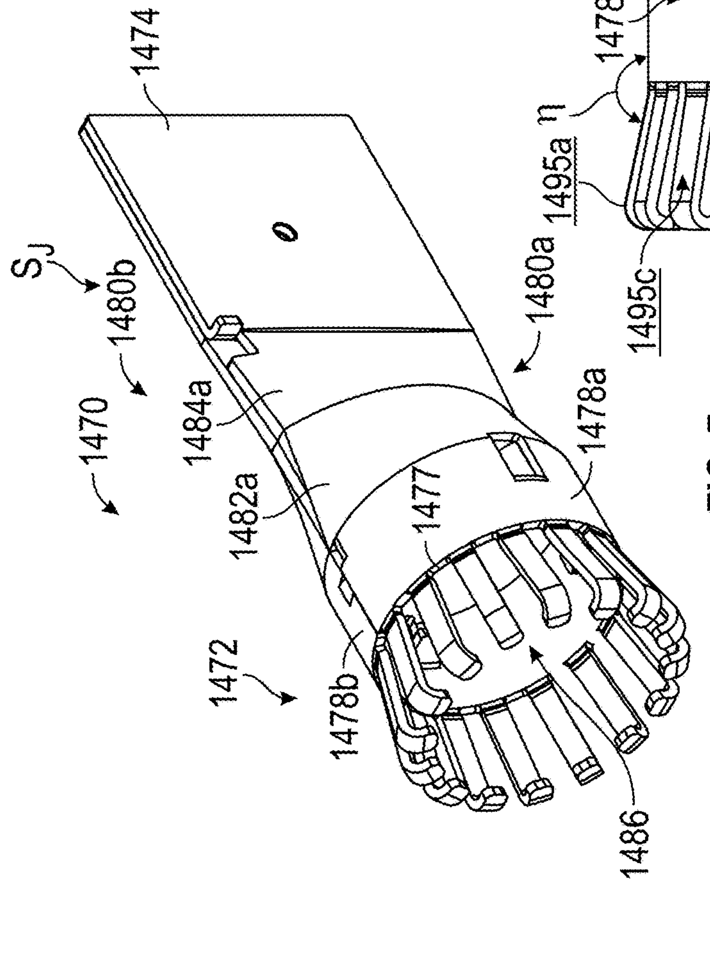
FIG. 7 is a perspective view of the male terminal body of FIG. 3 in a joined state ($S_1$)

As shown in FIG. 7, the terminal or free ends 1488 of the contact arms 1494*a*-1494*p* are positioned: (i) positioned inward (i.e., by a free end $W_{FE}$ of approximately 0.25 mm) of the inner surface 1479*b* of the base wall 1478*a*-1478*b*, (ii) substantially parallel to an extent of the base wall 1478*a*-1478*b*, and (iii) in contact the planar outer surface of the spring arms 1452*a*-1452*p*, when the spring member 1440*a* is inserted into the spring receiver 1486. The configuration of placing the terminal or free ends 1488 inward of the inner surface 1479*b* of the base wall 1478*a*-1478*b* and in contact with the planar outer surface of the spring arms 1452*a*-1452*p* is beneficial over the terminal end or free end design associated with the contact arms disclosed within FIGS. 87-96 of PCT/US2019/36010 for several reasons including manufacturing issues, current choke points, and mating issues. Additionally, the configuration of the male terminal assembly 1430 disclosed herein is beneficial over the configuration shown in FIGS. 3-8 in PCT/US2018/19787 because the assembler of the male terminal assembly 1430 does not have to apply a significant force in order to deform a majority of the contact arms 1494*a*-1494*p* outward to accept the spring member 1440*a*. This required deformation can best be shown in FIG. 6 of PCT/US2018/19787 due to the slope of the contact arm 11 and the fact the outer surface of the spring arm 31 and the inner surface of the contact arm 11 are adjacent to one another without a gap formed therebetween. In contrast to FIGS. 3-8 in PCT/US2018/19787, FIG. 30 of the present application shows a very small gap that is formed between the outer surfaces of the spring member 1440*a* and the inner surface of the contact arms 1494*a*-1494*h*. Accordingly, little, if any, force is required to insert the spring member 1440*a* into the spring receiver 1486 due to the fact the assembler does not have to force the contact arms 1494*a*-1494*h* to significantly deform during the insertion of the spring 1440*a*.

As disclosed above, the contact arms 1494*a*-1494*p* extend forward from the leading curvilinear edge 1477 of the base wall 1478*a*-1478*b* and as such the contact arms 1494*a*-1494*p* and their associated free ends 1488 are arranged along a curvilinear contact arm path and in the embodiments shown in the figures this curvilinear contact arm path is in the form of a circle. It should also be understood that the shape of the contact arm path substantially matches the shape of the spring arm path. In fact, said paths are cooperatively dimensioned and positioned in a manner to allow mechanical interaction to occur between the plurality of contact arms 1494*a*-1494*p* and the plurality of spring arms 1452*a*-1452*p*, when the connector system is in a particular state (e.g., fully assembled) or subjected to certain operating conditions (e.g., subjected to high heat environments). It should be understood that the curvilinear contact arm path in other embodiments may not be circular, but instead may be an oval, oblong, ellipse, crescent, curvilinear triangle, quatrefoil, teardrop, or any other shape that has a curvilinear path. In even a further embodiment, the path that the contact arms 1494*a*-1494*p* follow may not be completely curvilinear and instead may only have one curvilinear aspect and other aspects that are substantially linear. For example, in this alternative embodiment, the contact arms 1494*a*-1494*p* may be arranged in a modified square, wherein the top linear extent of the square has been removed and replaced with a curvilinear shaped extent. It should be understood that other similar combinations are contemplated by this disclosure.

Unlike the sidewall portions that are disclosed in connection with PCT/US2020/143788, PCT/US2020/143686, PCT/US2020/133446, PCT/US2020/50018, PCT/US2020/49870, PCT/US2020/14484, PCT/US2020/13757, PCT/US2019/36127, PCT/US2019/36070, PCT/US2019/36010, an extent of the male terminal body 1472 does not surround or flank an extent of the contact arms 1494*a*-1494*p*. In other words, the contact arms 1494*a*-1494*p* are spatially arranged such that they define a gap there between and are separated by contact arm openings 1450 but no intervening structures (e.g., a side wall portion residing between two contact arms 1494) of the male terminal body 1472 reside adjacent to or between the contact arms 1494*a*-1494*p*. Further, no structure of the male terminal body 1472 encircles or flanks the spring arms 1494*a*-1494*p*. Additionally, the configuration of the contact arms 1494*a*-1494*p* disclosed herein is beneficial over the configuration of the terminals shown in FIGS. 9-15, 18, 21-31, 32, 41-42, 45-46, 48 and 50 in PCT/US2018/19787 because: (i) the contact arms 1494*a*-1494*p* can have a shorter overall length, which means less metal material is needed for formation and the male terminal 1470 can be installed in narrower, restrictive spaces, (ii) the connector 100 has a higher ampacity, (iii) the male terminal 1470 is easier to assemble, and (iv) other beneficial features that are disclosed herein or can be determined by one of ordinary skill in the art from study of this disclosure.

In a further alternative embodiment that is not shown, each contact arm 1494*a*-1494*p* may not have a curvilinear configuration (as shown in the figures) and instead may have a substantially linear configuration along the width of the contact arm. Additionally, the width of the contact arms 1494*a*-1494*p* may be increased such that fewer contact arms (e.g., between 14 and 3) are necessary to form the male terminal body 1472 that is 360 degree compliant. Further, the curvilinear configuration of the width of each contact arm may not be based on a circle, but instead is based upon an oval, oblong, ellipse, crescent, curvilinear triangle, quatrefoil, teardrop, or any other shape that has a curvilinear extent.

Figure 16:
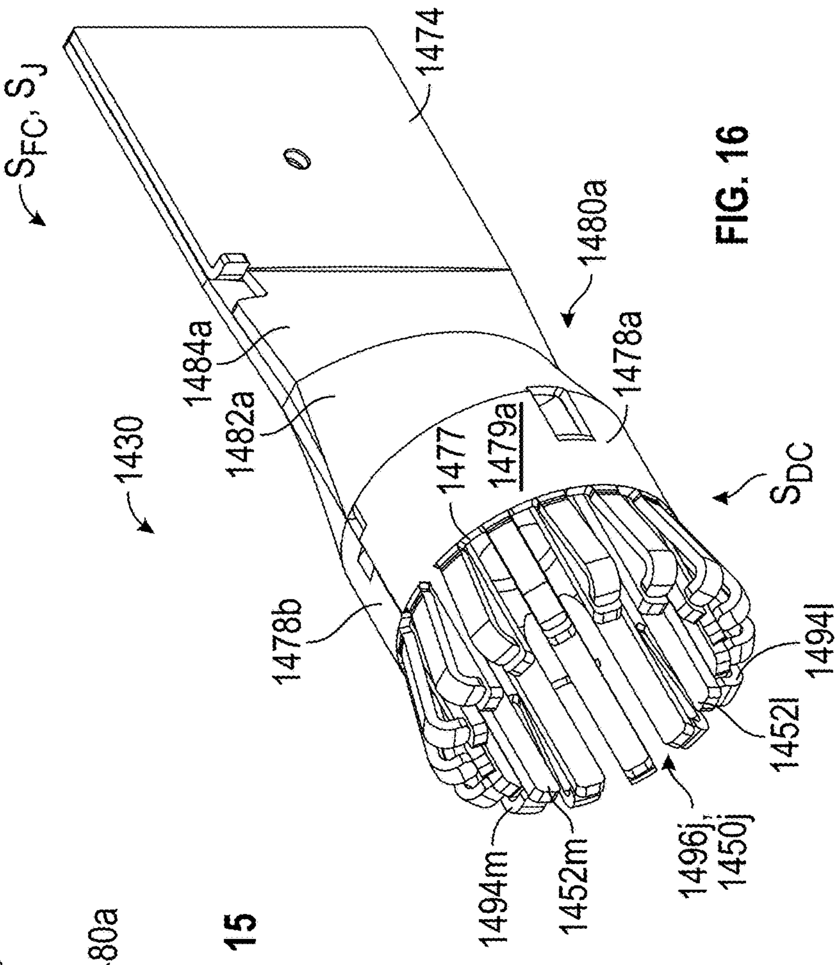
FIG. 16 is a perspective view of the male terminal assembly of FIG. 3 in a coupled state (Sc)
Figure 15:
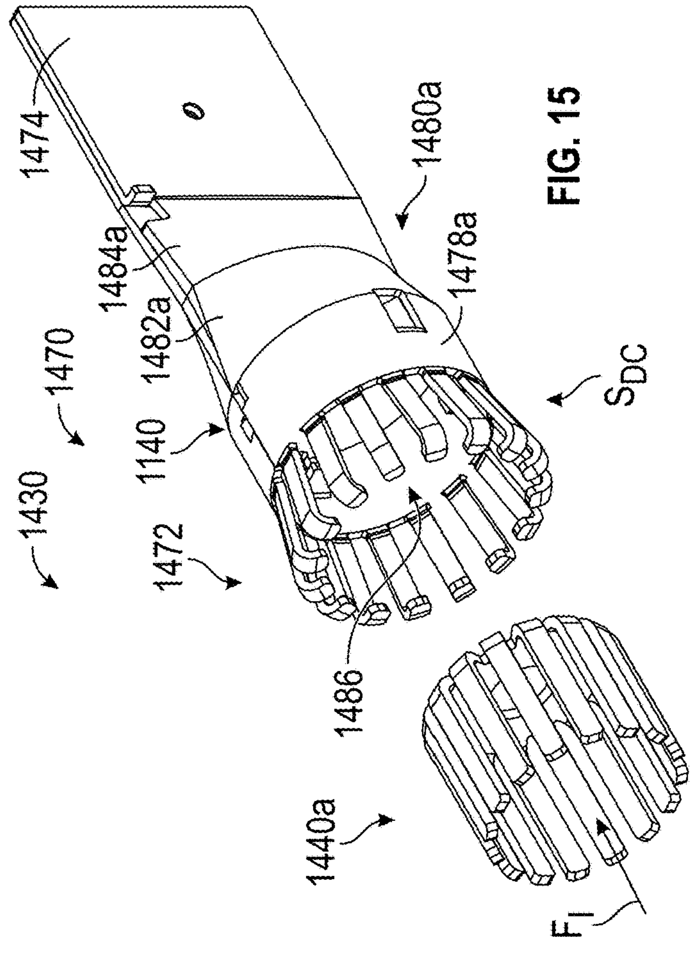
FIG. 15 is an exploded view of the male terminal assembly of FIG. 3 in a decoupled state ($S_{DC}$)
Figure 18:
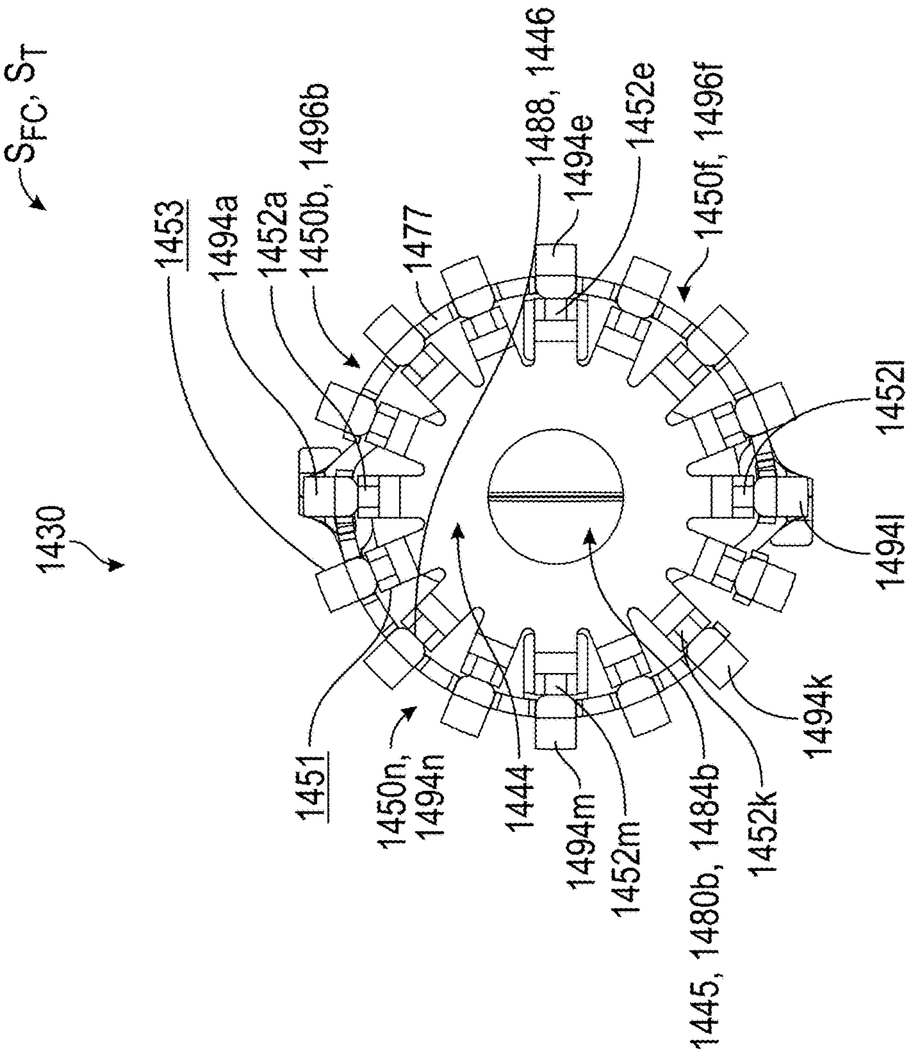
FIG. 18 is a front view of the male terminal assembly of FIG. 16.
Figure 17:
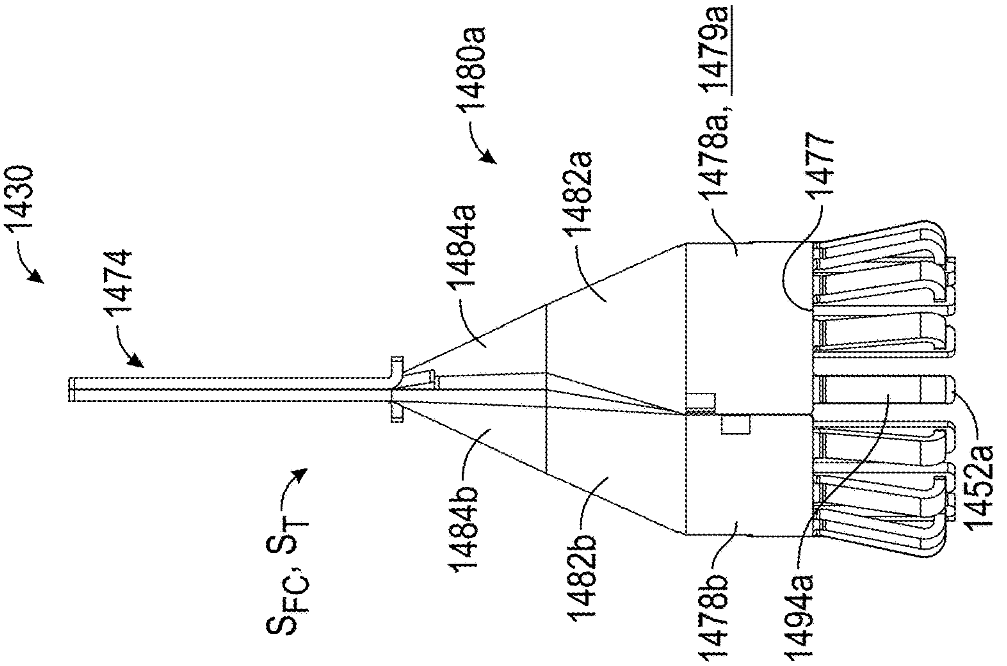
FIG. 17 is a top view of the male terminal assembly of FIG. 16.
Figure 19:
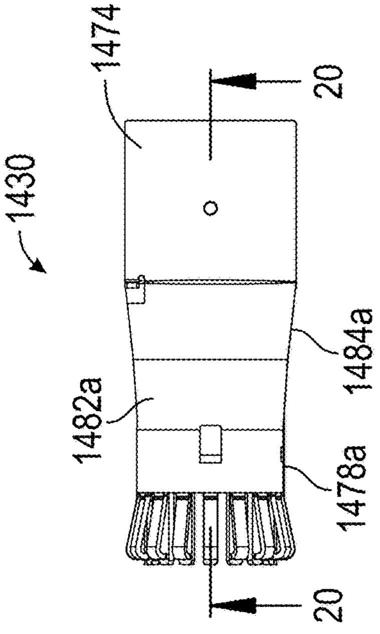
FIG. 19 is a side view of the male terminal assembly of FIG. 16.

FIG. 15 provides the first embodiment of the male terminal assembly 1430 in a decoupled state $S_{DC}$ and FIG. 16 provides the first embodiment of the male terminal assembly 1430 in a fully coupled state $S_{FC}$. The first stage of assembling the male terminal assembly 1430 is shown in FIG. 15, where the spring member 1440*a* is separated from the male terminal 1470. This configuration of the male terminal 1470 exposes the spring receiver 1486 and places the male terminal 1470 in a state that is ready for receiving the spring member 1440*a*. To move the male terminal assembly 1430 from the decoupled state $S_{DC}$ to the fully coupled state $S_{FC}$, an insertion force, $F_1$, has been applied to the spring member 1440*a* to insert the spring member 1440*a* into the spring receiver 1486. The insertion force, $F_1$, is applied on the spring member 1440*a* until the second or rear male terminal wall 1484 is positioned adjacent to the rear spring wall 1444 and the free end 1488 of the male terminal 1470 is positioned inward of the free end 1446 of the spring member 1440*a*.

Assembling the exterior connector assembly 1000 occurs across multiple steps or stages. The first step in assembling the exterior connector assembly 1000 is assembling the male terminal assembly 1430, which is shown in FIGS. 15-16 and described above. After the male terminal assembly 1430 is in a fully coupled state $S_{FC}$, then the interior male housing portion 1104 may be coupled to the male terminal assembly 1430 using a first coupling force $F_{C1}$ in order to move the male terminal assembly 1000 from a disassembled state $S_{DA}$ (FIG. 24) to a partially assembled state $S_{PA}$ (FIGS. 25-30). Finally, the male terminal assembly 1430 can be connected to the wire 1495 and the exterior male housing portion 1150 may be coupled to the interior male housing portion 1104 using a second coupling force $F_{C2}$ in order to move the male terminal assembly 1000 from the partially assembled state $S_{PA}$ (FIG. 30) to a fully assembled state $S_{FA}$ (FIGS. 31-36).

2) Female Connector Assembly

Referring to FIGS. 40-45, the female connector assembly 2000 is primarily composed of: (i) the female housing assembly 2100 and (ii) the female terminal assembly 2430. The female connector assembly 2000 may have additional features that are not shown within the figures; however, these features are contemplated by this disclosure. For example, the female connector assembly 2000 may include: (i) a connector position assurance (CPA) assembly that meets USCAR specifications (e.g., as described within PCT/US2020/49870), (ii) an interlock (IL) or high voltage interlock (HVIL), wherein said interlock can be positioned outside of the housing 2100 or positioned within the spring member 1440*a* (e.g., as described within PCT/US2020/143686), (iii) female housing assembly 2100 may include shielding assemblies that are formed from metal, conductive plastic (e.g., as described within PCT/US2020/13757), or other materials that may be used in minimizing EMI noise, (iv) water resistant sealing features (e.g., seals, coatings for the connector, or etc.), (v) locking handles or structures that aid in connecting the male connector assembly 1000 to the female connector assembly 2000 and/or aid in ensuring that the high ampacity connector system 100 remains within the fully connected state, (v) locking handles or structures that aid in connecting the male connector assembly 1000 to the female connector assembly 2000 and/or aid in ensuring that the high ampacity connector system 100 remains within the fully connected state, and/or (vi) any combination of these structures. Additionally, other structures that are disclosed within any of the applications incorporated herein may be used in connection with the female connector assembly 2000.

The female housing assembly 2100 is designed to: (i) protect and isolate the female terminal assembly 2430 from foreign objects and (ii) aid in the coupling of the male terminal assembly 1430 to the female terminal assembly 2430. To accomplish this, the female housing assembly 2100 generally includes an interior female housing portion 2104 and exterior female housing portion 2150. The interior female housing portion 2104 includes a configuration of walls that are: (i) cooperatively dimensioned to fit within the connector receptacle 1126, (ii) have retaining projections that aid in retaining the interior female housing portion within the female terminal assembly 2430, and (iii) have structures that aid in the alignment of the female connector assembly 2000 with the male connector assembly 1000.

As shown in FIGS. 1 and 40-47, the exterior female housing portion 2150 includes a sidewall 2152 that surrounds a substantial extent of the female terminal assembly 2430. The sidewall 2152 has a ramped or sloped wall 2170 that extends inward from the front edge of the sidewall 2152 and is aids in the compression of the contact arms 1494*a*-1494*p* of the terminal assembly 1430. The configuration and design of this ramped or sloped wall 2170 are described in detail with PCT/US2019/36070, which is incorporated herein. This ramped or sloped wall 2170 has a rear edge that abuts the edges of the female terminal assembly 2430. Thus, the female terminal assembly 2430 is retained against this ramped or sloped wall 2170. It should be understood that other configurations for retaining the female terminal assembly 2430 within the female housing assembly 2100 may be used and are contemplated by this disclosure.

The female terminal assembly 2430 includes a connection plate 2474 and a sidewall 2434 that forms a female receptacle 2472. The connection plate 2474 may be configured as a busbar lug, a threaded pin, a tubular lug, or any other type of connecting type. The female receptacle 2472 is designed to receive an extent of the male terminal assembly 1430 and mainly the contact arms 1494*a*-1494*p*. Referring to FIGS. 38, 41, 43 and 45, the cross-sectional shape of the female receptacle 2472 is substantially circular shaped with a female terminal diameter $D_{FT}$ between 21 mm and 25 mm, preferably 23.2 mm; however, it should be understood that the cross-sectional shape of the female receptacle 2472 may be altered to substantially match the external shape of the terminal assemblies that it is mating with (e.g., oval, oblong, ellipse, crescent, curvilinear triangle, quatrefoil, teardrop, or etc.). This additionally means that the cross-sectional shape of the female receptacle 2472 may change over the length of the female terminal assembly 2430, as the internal terminal assembly 3430 may have a different configuration than the external terminal assembly 1430.

Additional details about the female terminal assembly 2430 are generally discussed PCT Application Nos. PCT/US2020/13757, PCT/US2019/36127, PCT/US2019/36070, PCT/US2019/36010, which are incorporated herein and as such these details will not be repeated here. For example, these PCT applications disclose that the inner dimensions of the female terminal assembly 2430 are smaller than an extent of the outer dimensions of the male terminal assembly 1430. This dimensional relationship ensures that the terminal assemblies 1430, 2430, are in a proper electrical and mechanical connection with one another.

3) Connecting the Connector System

Figure 40:
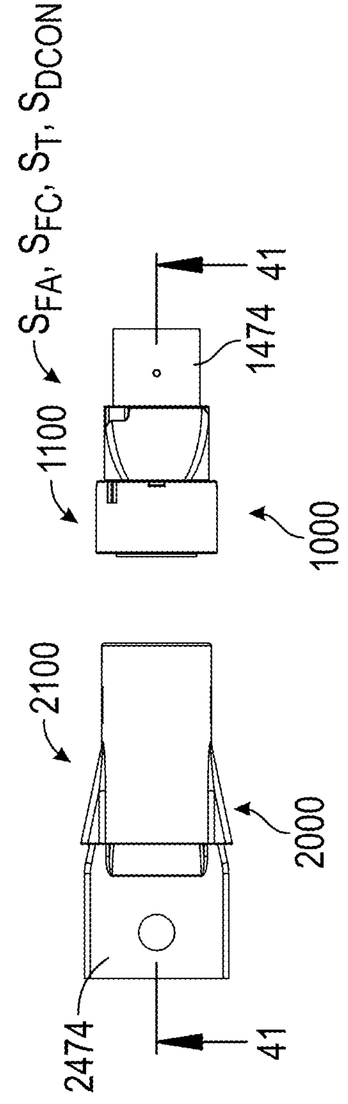
FIG. 40 is a side view of the connector system of FIG. 1 in the disconnected state ($S_{DCON}$)
Figure 41:
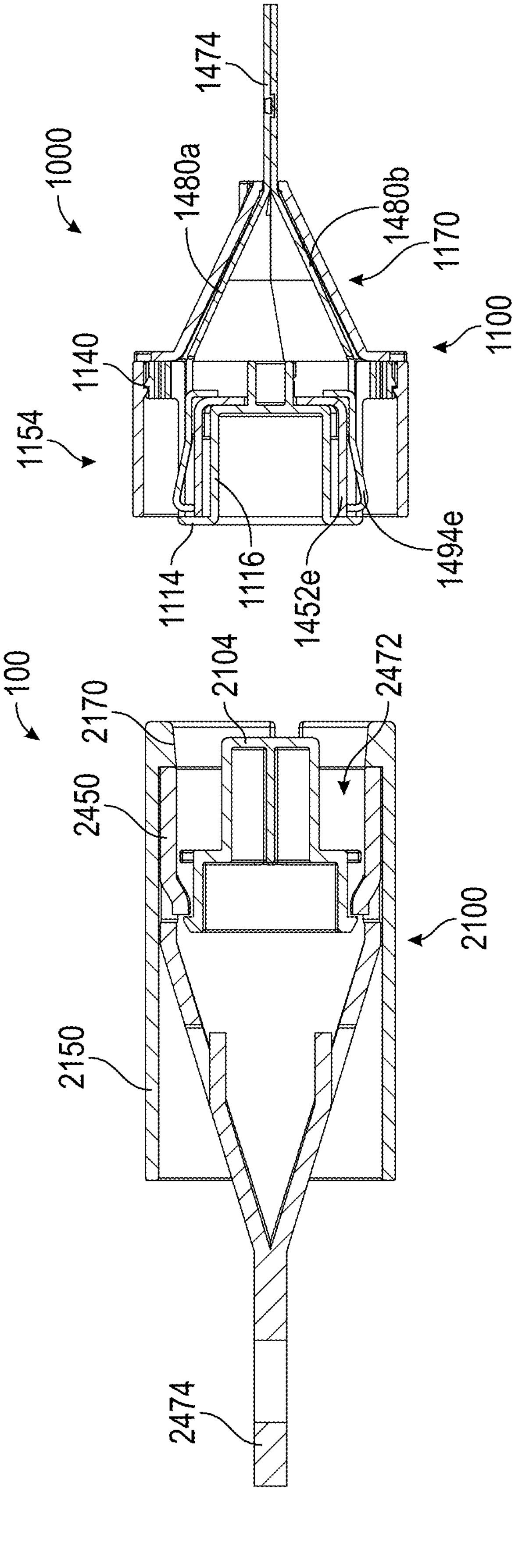
FIG. 41 is a cross-sectional view of the high ampacity connector system taken along line 41-41 of FIG. 40.
Figure 42:
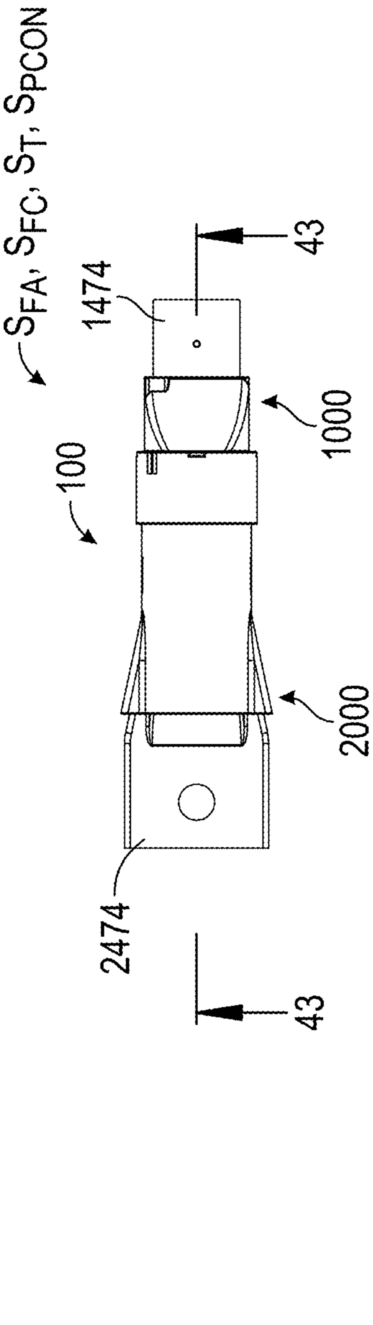
FIG. 42 is a side view of the connector system of FIG. 1 in a partially connected state ($S_{PCON}$)
Figure 43:
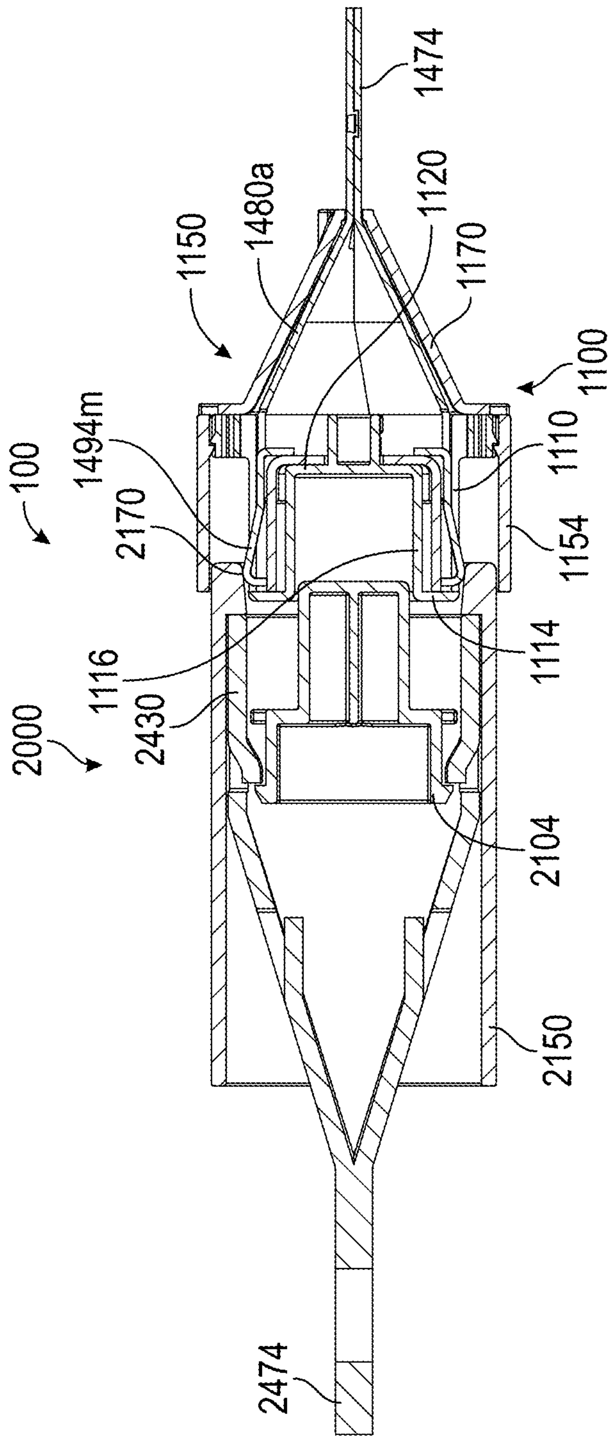
FIG. 43 is a cross-sectional view of the connector system taken along line 43-43 of FIG. 42.
Figure 44:
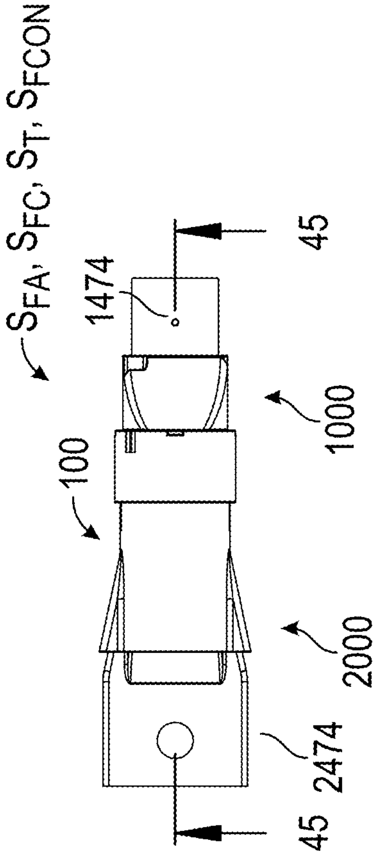
FIG. 44 is a side view of the connector system of FIG. 1 in a fully connected state ($S_{FCON}$)

FIGS. 40-47 show how the high ampacity connector system 100 can move from a disconnected state $S_{DCON}$ in FIGS. 40-41 to a fully connected state $S_{FCON}$ in FIGS. 44-47. The disconnected state $S_{DCON}$ is described above and shown in FIGS. 40-41. The high ampacity connector system 100 can then move from this disconnected state $S_{DCON}$ to a partially connected state $S_{PCON}$ is shown in FIGS. 42-43. As shown in these figures, the contact arms 1494*a*-1494*p* of the male connector assembly 1000 are about to come into contact with the ramped or sloped surface 2170 of the female connector assembly 2000. This ramped or sloped surface 2170 gently and smoothly compresses the contact arms 1494*a*-1494*p* until they can easily slide into and make contact with the inner surface of the female receptacle 2472. This process is described in greater detail within PCT/US2019/36070. Once the male connector assembly 1000 is fully connected to the intermediate connector assembly 2000, the high ampacity connector system 100 has moved from the partially connected state $S_{PCON}$ to the fully connected state $S_{FCON}$ shown in FIGS. 44-47. In this fully connected state $S_{FCON}$, an extent of the contact arms 1494*a*-1494*p* and an extent of the spring arms 1452*a*-1452*p* is positioned within the female receptacle 2472 of the female terminal assembly 2430. In addition and as discussed in other parts of this application, when the system 100 is in this fully connected state $S_{FCON}$, the spring arms 1452*a*-1452*p* are mechanical interact with the contact arms 1494*a*-1494*p* in order to apply the outwardly bias the contact arms 1494*a*-1494*p* into engagement with the inner surface of the female receptacle 2472.

4) Terminal Properties and Functionality

Figure 45:
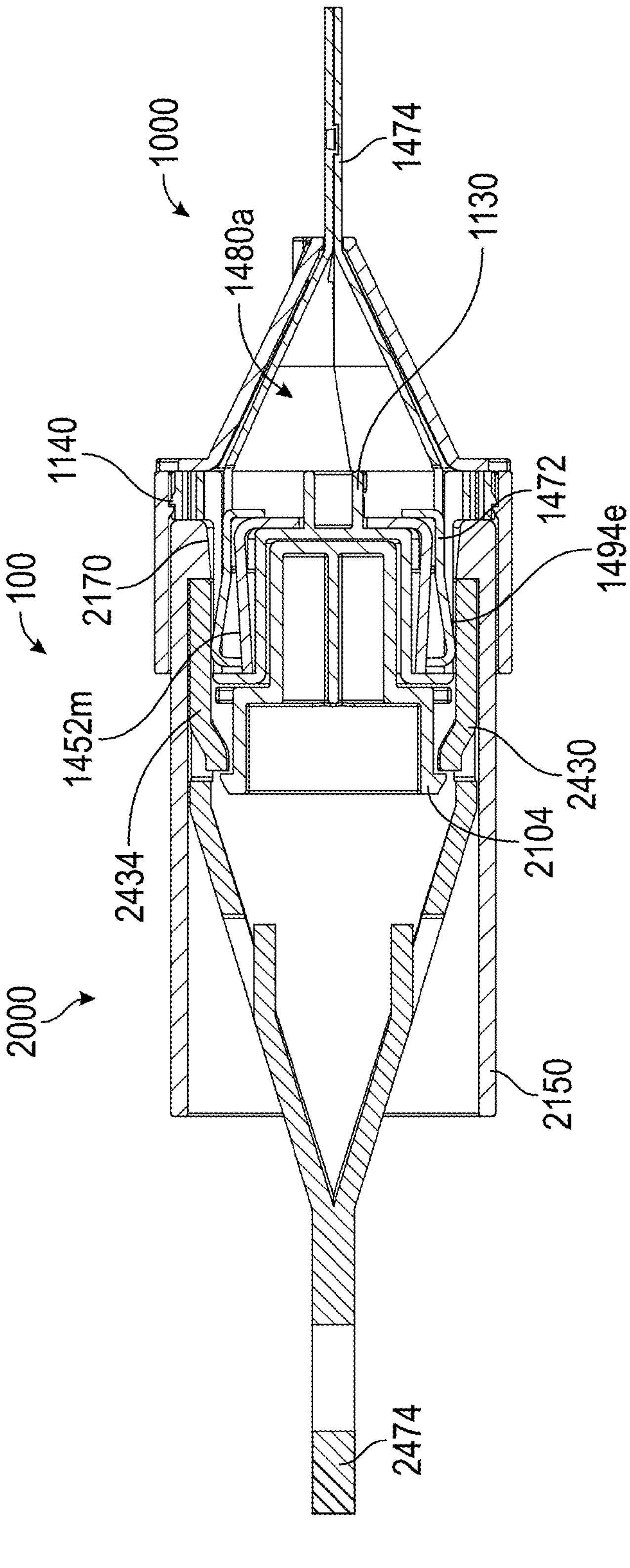
FIG. 45 is a cross-sectional view of the connector system taken along line 45-45 of FIG. 44.

As best shown in FIGS. 29, 45, and 47, the one or more outer surfaces of the spring arms 1452*a*-1452*p* contact the free ends 1488 of the respective contact arms 1494*a*-1494*p*. As discussed above, the outermost extent of the contact arms 1494*a*-1494*p* (i.e., $O_D$) is slightly larger than the inner extent of the female terminal body 2434 (i.e., $D_{FT}$). As such, when these components are mated with one another, the spring member 1440*a* is compressed. This compression of the spring member 1440*a* creates an outwardly directed biasing force $S_{BF}$ against the contact arms 1494*a*-1494*p* and away from the center of the spring member 1440*a*.

The male terminal body 1472, including the contact arms 1494*a*-1494*p*, may be formed from a first material such as copper, a highly-conductive copper alloy (e.g., C151 or C110), aluminum and/or another suitable electrically conductive material. The first material preferably has an electrical conductivity of more than 80% of IACS (International Annealed Copper Standard, i.e., the empirically derived standard value for the electrical conductivity of commercially available copper). For example, C151 typically has 95% of the conductivity of standard, pure copper compliant with IACS. Likewise, C110 has a conductivity of 101% of IACS. In certain operating environments or technical applications, it may be preferable to select C151 because it has anti-corrosive properties desirable for high-stress and/or harsh weather applications. The first material for the male terminal body 1472 is C151 and is reported, per ASTM B747 standard, to have a modulus of elasticity (Young's modulus) of approximately 115-125 gigapascals (GPa) at room temperature and a coefficient of terminal expansion (CTE) of 17.6 ppm/degree Celsius (from 20-300 degrees Celsius) and 17.0 ppm/degree Celsius (from 20-200 degrees Celsius).

The spring member 1440*a* may be formed from a second material such as spring steel, stainless steel (e.g., 301SS, ¼ hard), alloys that include iron, and/or another suitable material having greater stiffness (e.g., as measured by Young's modulus) and resilience than the first material of the male terminal body 1472. The second material preferably has an electrical conductivity that is less than the electrical conductivity of the first material. The second material also has a Young's modulus that may be approximately 193 GPa at room temperature and a coefficient of terminal expansion (CTE) of 17.8 ppm/degree Celsius (from 0-315 degrees Celsius) and 16.9 ppm/degree Celsius (from 0-100 degrees Celsius). In contemplated high-voltage applications, the cross-sectional area of copper alloy forming the male terminal body is balanced with the conductivity of the selected copper alloy. For example, when a copper alloy having lower conductivity is selected, the contact arms 1494*a*-1494*p* formed therefrom have a greater cross-sectional area so as to adequately conduct electricity. Likewise, the selection of a first material having a higher conductivity may allow for contact arms 1494*a*-1494*p* having a relatively smaller cross-sectional area while still meeting conductivity specifications.

In an example embodiment, the CTE of the second material may be greater than the CTE of the first material, i.e., the CTE of the spring member 1440*a* is greater than the CTE of the male terminal body 1472. Therefore, when the assembly of the male terminal body 1472 and the spring member 1440*a* is subjected to the high-voltage and high-temperature environment typical for use of the electrical connector described in the present disclosure, the spring member 1440*a* expands relatively more than the male terminal body 1472. Accordingly, the outward force $S_{BF}$ produced by the spring member 1440*a* on the contact arms 1494*a*-1494*p* of the male terminal body 1472 is increased in accordance with the increased temperature, which is reference to below as a thermal spring force, $S_{TF}$.

An example application of the present disclosure, such as for use in a vehicle alternator, is suitable for deployment in a class 5 automotive environment, such as that found in passenger and commercial vehicles. Class 5 environments are often found under the hood of a vehicle, e.g., alternator, and present 1500 Celsius ambient temperatures and routinely reach 2000 Celsius. When copper and/or highly conductive copper alloys are subjected to temperatures above approximately 150° Celsius said alloys become malleable and lose mechanical resilience, i.e., the copper material softens. However, the steel forming the spring member 1440*a* retains hardness and mechanical properties when subjected to similar conditions. Therefore, when the male terminal body 1472 and spring member 1440*a* are both subjected to high-temperature, the first material of the male terminal body 1472 softens and the structural integrity of the spring member 1440*a*, formed from the second material, is retained, such that the force applied to the softened contact arms 1494*a*-1494*p* by the spring member 1440*a* more effectively displaces the softened contact arms 1494*a*-1494*p* outward relative the interior of the male terminal body 1472, in the fully connected position $S_{FC}$.

The male terminal body 1472, spring member 1440*a*, and female terminal body 2434, are configured to maintain conductive and mechanical engagement while withstanding elevated temperatures and thermal cycling resulting from high-power, high-voltage applications to which the connector assembly is subjected. Further, the male terminal body 1472 and female terminal body 2434 may undergo thermal expansion as a result of the elevated temperatures and thermal cycling resulting from high-voltage, high-temperature applications, which increases the outwardly directed force applied by the male terminal body 1472 on the female terminal body 2434. The configuration of the male terminal body 1472, spring member 1440*a*, and the female terminal body 2434 increase the outwardly directed connective force therebetween while the connector system 100 withstands thermal expansion resulting from thermal cycling in the connected position $P_C$.

Based on the above exemplary embodiment, the Young's modulus and the CTE of the spring member 1440*a* are greater than the Young's modulus and the CTE of the male terminal body 1472. Thus, when the male terminal body 1472 is used in a high current application that subjects the connector system 3100 to repeated thermal cycling with elevated temperatures (e.g., approximately 1500 Celsius), then: (i) the male terminal body 1472 become malleable and loses some mechanical resilience, i.e., the copper material in the male terminal body 1472 softens and (ii) the spring member 1440*a* does not become as malleable or lose as much mechanical stiffness in comparison to the male terminal body 1472.

Thus, when utilizing a spring member 1440*a* that is mechanically formed by a cold forced process into its shape (e.g., utilizing a die forming process) and then subjected to elevated temperatures, the spring member 1440*a* will attempt to at least return to its uncompressed state, which occurs prior to insertion of the male terminals assembly 1430 within the female terminal assembly 1430, and preferably to its original flat state, which occurs prior to formation of the spring member 1440*a*. In doing so, the spring member 1440*a* will apply a generally outward directed thermal spring force, $S_{TF}$, (as depicted by the arrows labeled "$S_{TF}$" in FIG. 47) on the free ends 1488 of the contact arms 1494*a*-1494*p*. This thermal spring force, $S_{TF}$, is dependent upon local temperature conditions, including high and/or low temperatures, in the environment where the system 100 is installed. Accordingly, the combination of the spring biasing force, $S_{BF}$, and the thermal spring force, $S_{TF}$, provides a resultant biasing force, $S_{RBF}$, that ensures that the outer surface of the contact arms 1494*a*-1494*p* is forced into contact with the inner surface of the female terminal body 2434 when the male terminal assembly 2430 is inserted into the female terminal 6430 and during operation of the system 100 to ensure an electrical and mechanical connection.

Additionally, with repeated thermal cycling events, the male terminal assembly 1430 will develop an increase in the outwardly directed resultant spring forces, $S_{RBF}$, that are applied to the female terminal assembly 2430 during repeated operation of the system 100.

Further illustrated in FIG. 47, in the fully connected state $S_{FC}$, the male terminal assembly 1430 provides 360° compliance with the female terminal assembly 6430 to ensure that a sufficient amount of outwardly directed force F is applied by the male terminal assembly 1430 to the female terminal assembly 2430 for electrical and mechanical connectivity in all four primarily directions. This attribute allows for the omission of a keying feature and/or another feature designed to ensure a desired orientation of the components during connection. The 360° compliance attribute of the system 100 also aids in maintaining mechanical and electrical connections under strenuous mechanical conditions, e.g., vibration. In a traditional blade or fork-shaped connector with 1800 compliance, i.e., connection on only two opposing sides, vibration may develop a harmonic resonance that causes the 180° compliant connector to oscillate with greater amplitude at specific frequencies. For example, subjecting a fork-shaped connector to harmonic resonance may cause the fork-shaped connector to open. Opening of the fork-shaped connector during electrical conduction is undesirable because momentary mechanical separation of the fork-shaped connector from an associated terminal may result in electrical arcing. Arcing may have significant negative effects on the 180° compliant terminal as well as the entire electrical system of which the 180° compliant terminal is a component. However, the 360° compliance feature of the present disclosure may prevent the possible catastrophic failures caused by strong vibration and electrical arcing.

5) Second Embodiment of the Connector System

FIGS. 48-76 disclose an alternative configuration of the high ampacity connector system 100. It should be understood that this second embodiment of the connector system 3100 contains structures, features and/or functions that are similar to the structures, features and/or functions disclosed in connection with the first embodiment of the connector system 100. Accordingly, reference numbers that are separated by 3000 will be used in connection with this second embodiment to denote the structures and/or features that are similar to the structures and/or features disclosed in the first embodiment. For example, the contact arms of the first embodiment are labeled **1494*a*-1494*p*, while the contact arms of the second embodiment are labeled 4494*a*-4494*p*. Therefore, one of ordinary skill in the art shall assume that the contact arms of the first embodiment 1494*a*-1494*p* have similar structures, features and/or functions in comparison to the contact arms of the second embodiment 4494*a*-4494*p***. Additionally, one of ordinary skill in the art shall understand that while the structures, features and/or functions are similar that does not mean the structures, features and/or functions are exactly the same.

The primary differences between the first and the second embodiments of the connector systems 100, 3100 that is disclosed herein in the fact that the plates 1474, 2474 of the first embodiment 100 are substantially parallel with the terminal body 1472, 2472 and the plates 4474, 5474 of the second embodiment 3100 are substantially perpendicular with the terminal body 4472, 5472. The change in orientation from the 180 degree connector shown in the first embodiment 100 to the 90 degree connector shown in the second embodiment 3100 causes other minor changes to the male housing 4100 and terminal assembly 4430. For example, the second connector embodiment 3100 does not include a rear male terminal wall assembly and is not formed from two separate and distinct pieces.

As discussed above in connection with the first embodiment of the connector 100, the second embodiment of the connector 3100 includes at least the following: (i) a male housing assembly 4100 that includes separation walls **4122*a*-4122*p* in order to obviate the need to modify the spring member 4440*a* to ensure proper alignment within the spring receiver 4486, (ii) includes free ends 4446 of the spring arms 4452*a*-4452*p* and free ends 4488 of the contact arms 4494*a*-4494*p* that are arranged along a curvilinear path (i.e., circular path), (iii) the spring arms 4452*a*-4452*p* and contact arms 4494*a*-4494*p* are cooperatively dimensioned and positioned to allow for mechanical interactions to occur between the plurality of contact arms and the plurality of spring arms when placed in particular states or subjected to certain operating conditions, (iv) a 1 to 1 ratio between the contact arm opening $W_{CO}$ and the contact arm width $W_C$, (iv) does not include a current choke point between the male terminal body 4472 and the plate 4474, (v) has a base wall length $L_B$ that is between 90% and 110% of the contact arm length $L_{CA}$, (vi) does not include an extent of the male terminal body 1472 that surround an extent of the contact arms 1494*a*-1494*p***, (vii) has high ampacity with a rating to carry at least 500 amps with a wire size 120 $mm^2$ at 55° C. RoA or at 80° C. with a current derating of 80%, (viii) is T4/V4/S3/D2/M2 compliant, (ix) is 360 degree compliant, (x) can meet the insertion force requirement of <45 Newtons for a USCAR class 2 connector without a lever assist, (xi) includes the terminal properties and functionality that are discussed above in connection with the first embodiment, and (xii) other features or functionality that is apparent to one of skill in the art based on study of this specification and its figures.

As discussed above in connection in regards to the current choke point between the male terminal body 4472 and the plate 4474, the cross-sectional area of the male terminal connection plate 4474 at the point that the male terminal connection plate 4474 is coupled to the male terminal body 4472 is greater than the cross-sectional area of the contact arms **1494*a*-1494*p* at the point the arms contact the inner surface of the female receptacle 5472. In other words, the height $H_{CP}$ of the male terminal connection plate 4474** (12.4 mm)*thickness $T_{CP}$ of the male terminal connection plate 4474 (2.5 mm) should be greater than, or equal to, the thickness $T_{CA}$ of the contact arms **4494*a*-4494*p*** (0.8 mm)*number of contact arms (16)*contact width $W_{CA}$ of the contact arms **4494*a*-4494*p* (1.9 mm). Accordingly, in this embodiment, the cross-sectional area of the male terminal connection plate 4474 at this body connection location BCL is 31 $mm^2$, which is greater than the cross-sectional area of the contact arms 4494*a*-4494*p* at terminal connection location TCL is 24.32 $mm^2$. Thus, a current choke point between the male terminal connection plate 4474 and the male terminal body 4472 will not be formed. It should be understood that the thickness $T_{CP}$ of the male terminal connection plate 4474 has been increased in this embodiment from 1.65 mm to 2.5 mm because the using a thickness of 1.65 mm and along with a height $H_{CP}$ of 12.4 mm would create a choke point because the cross-sectional area of the male terminal connection plate 4474 (i.e., 20.46 $mm^2$), would be is less than the cross-sectional area of the contact arms 4494*a*-4494*p*** (i.e., 24.32 $mm^2$).

Figure 54:
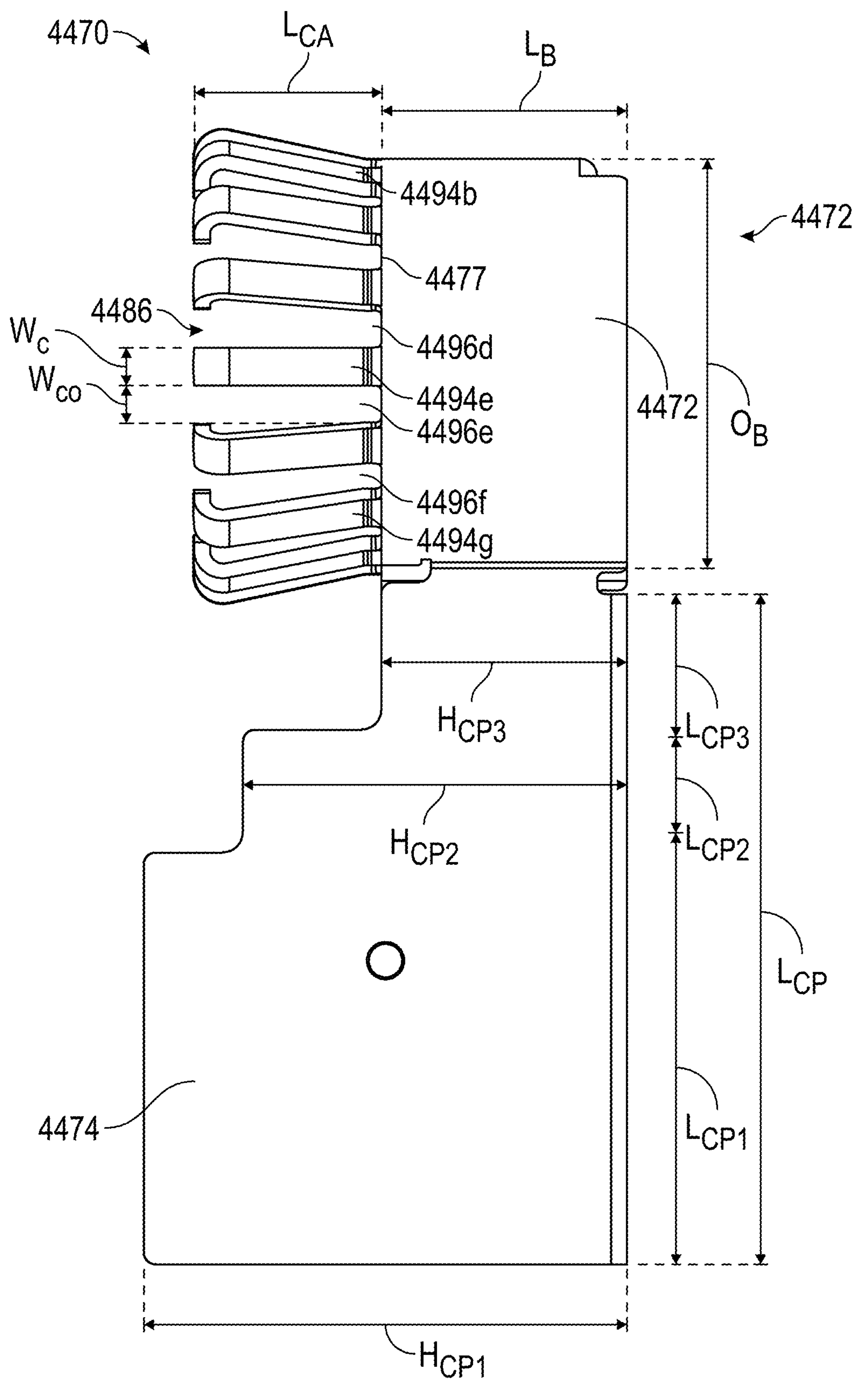
FIG. 54 is a side view of the male terminal body of FIG. 51.
Figure 56:
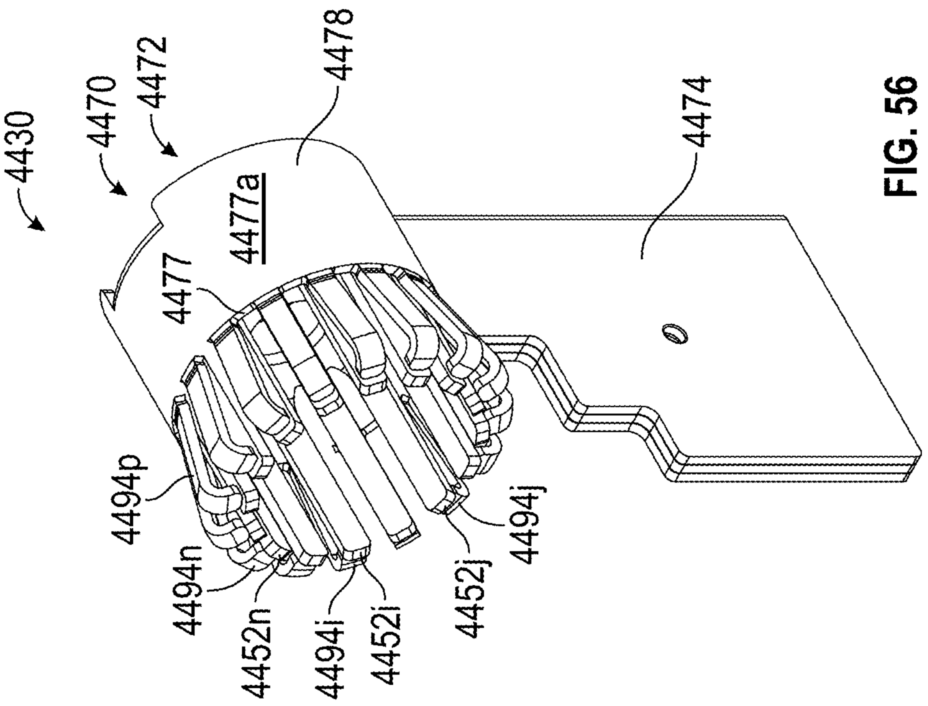
FIG. 56 is a perspective view of the male terminal assembly of FIG. 50 in a coupled state (Sc) where the spring member resides within the male terminal body.
Figure 55:
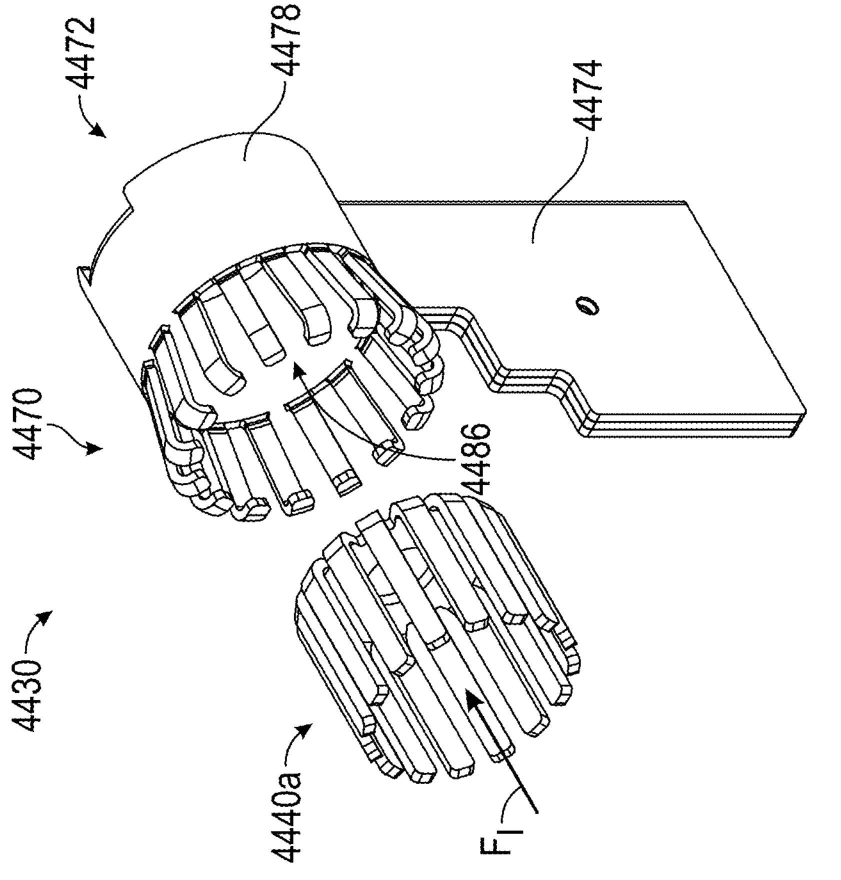
FIG. 55 is a perspective view of the male terminal assembly of FIG. 50, showing the male terminal body and the spring member in a decoupled state ($S_{DC}$)
Figure 58:
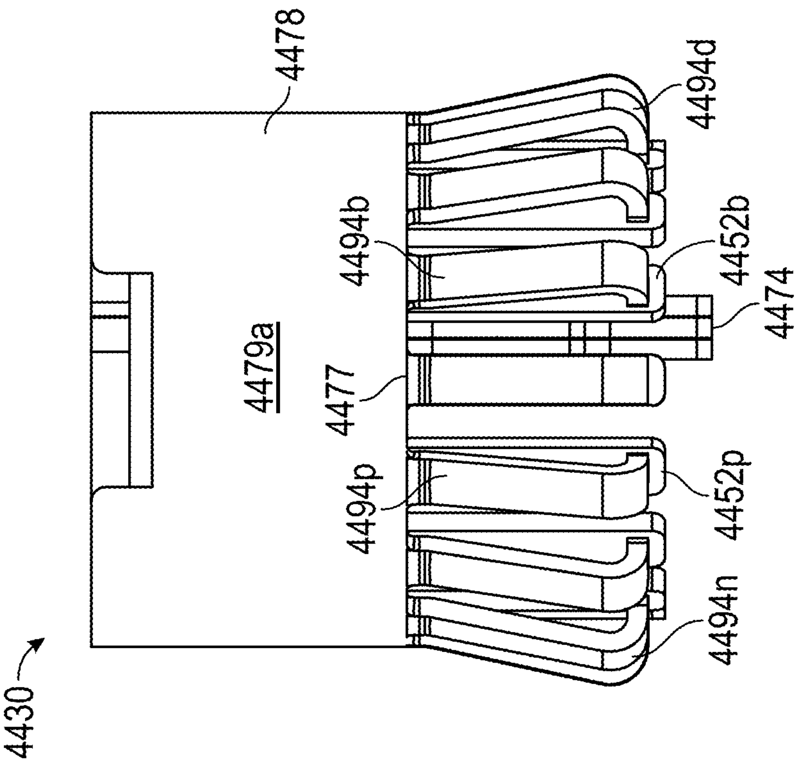
FIG. 58 is a top view of the male terminal assembly of FIG. 56.
Figure 57:
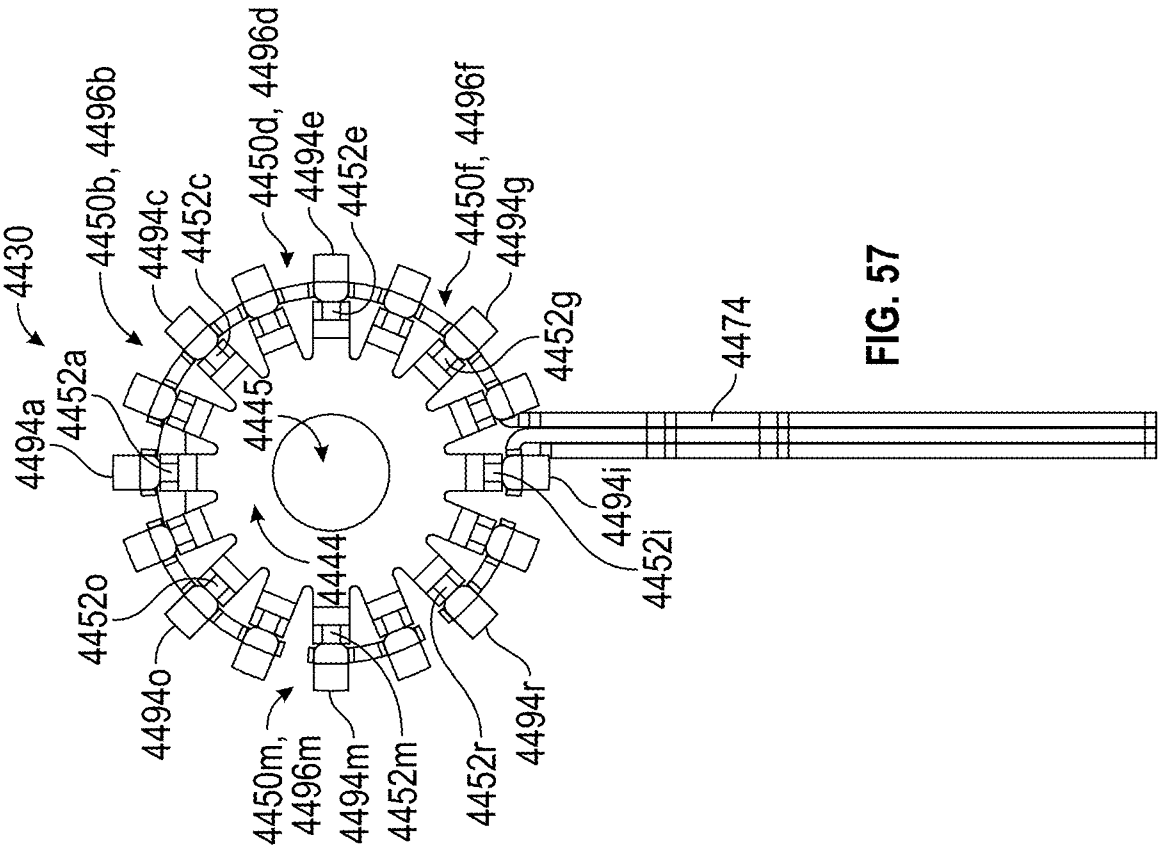
FIG. 57 is a front view of the male terminal assembly of FIG. 56.
Figure 60:
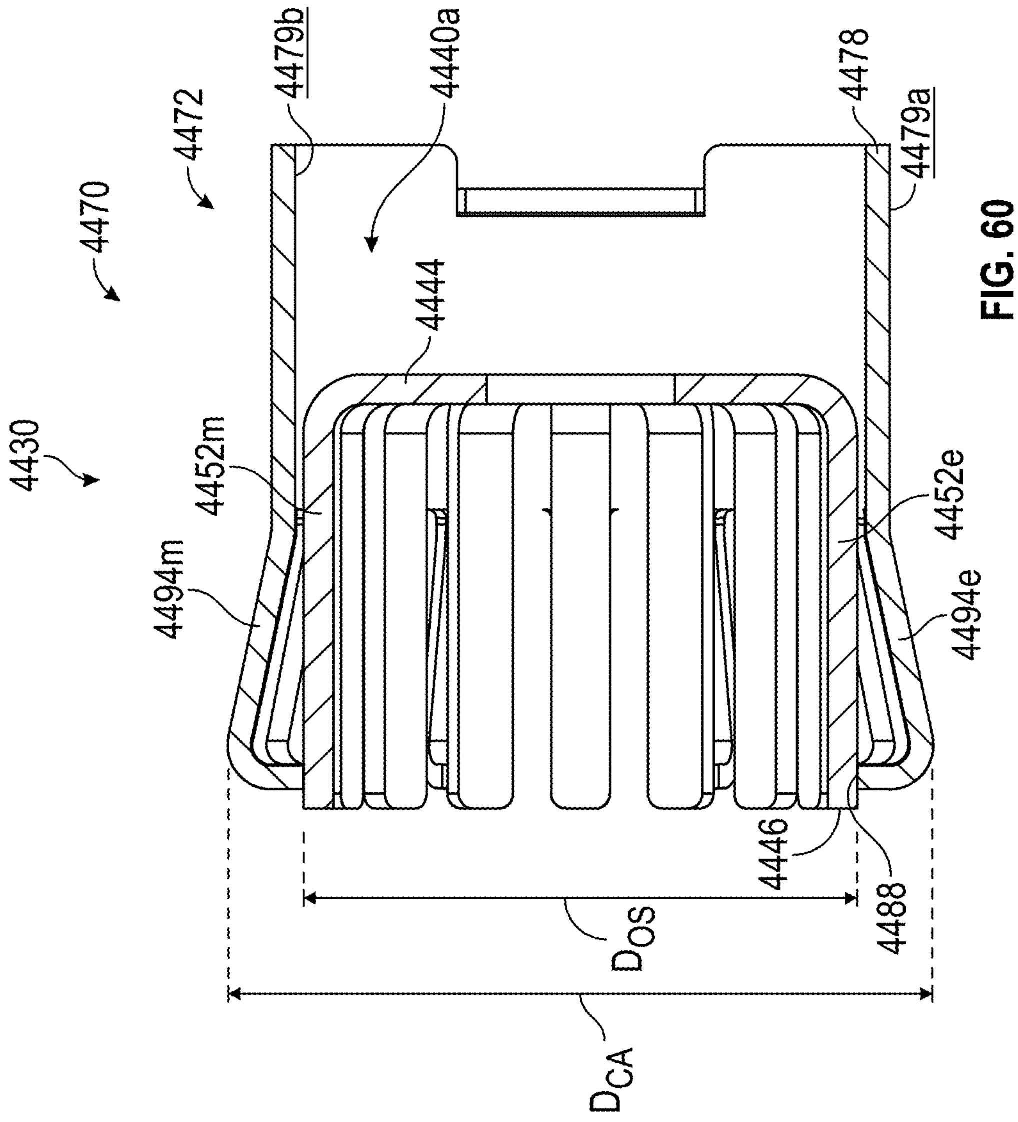
FIG. 60 is a cross-sectional view of the male terminal assembly taken along line 60-60 of FIG. 59.
Figure 59:
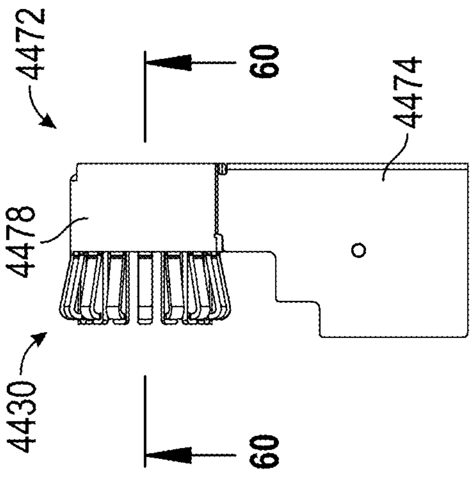
FIG. 59 is a side view of the male terminal assembly of FIG. 56.
Figure 61:
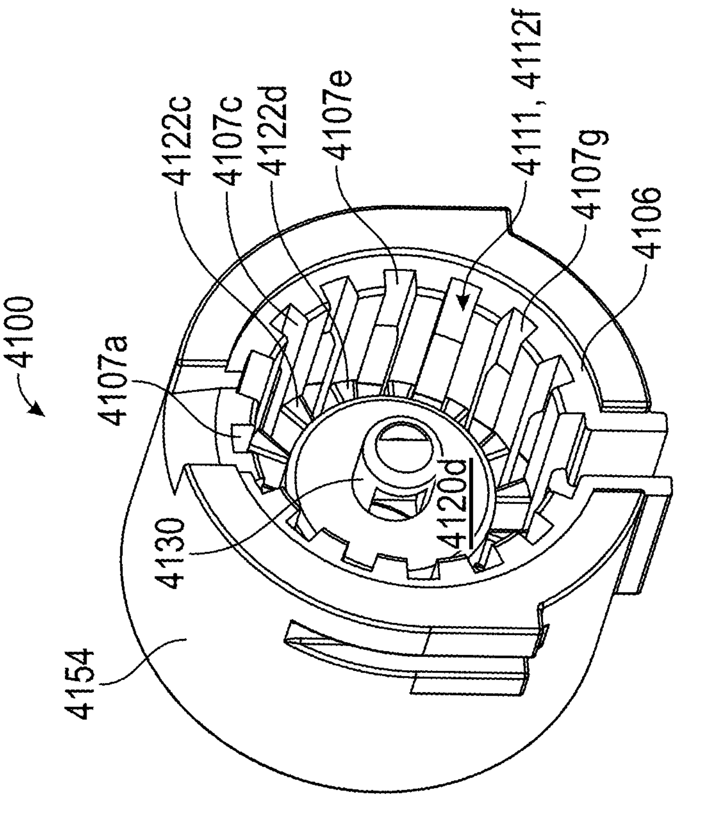
FIG. 61 is a rear perspective view of an extent of the housing of the male connector assembly of FIG. 50.
Figure 62:
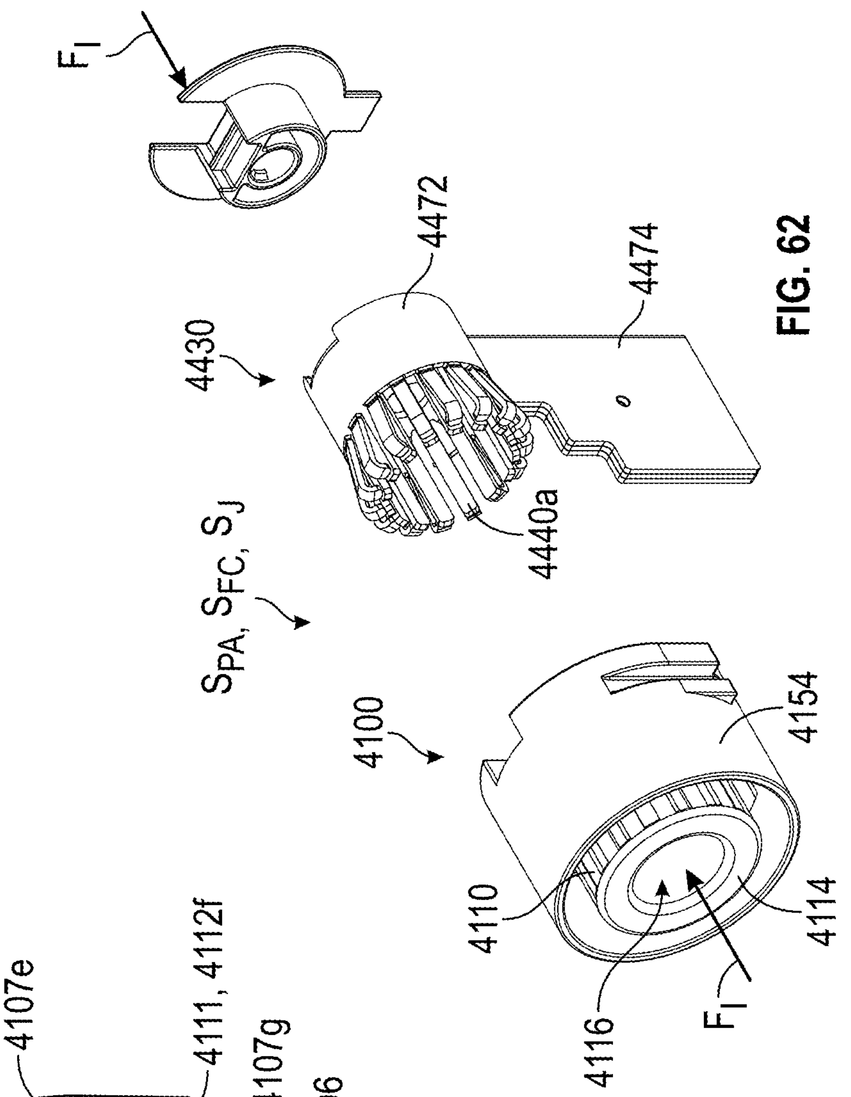
FIG. 62 is a perspective view of the male connector assembly of FIG. 50 in the disassembled state ($S_{DA}$)
Figure 64:
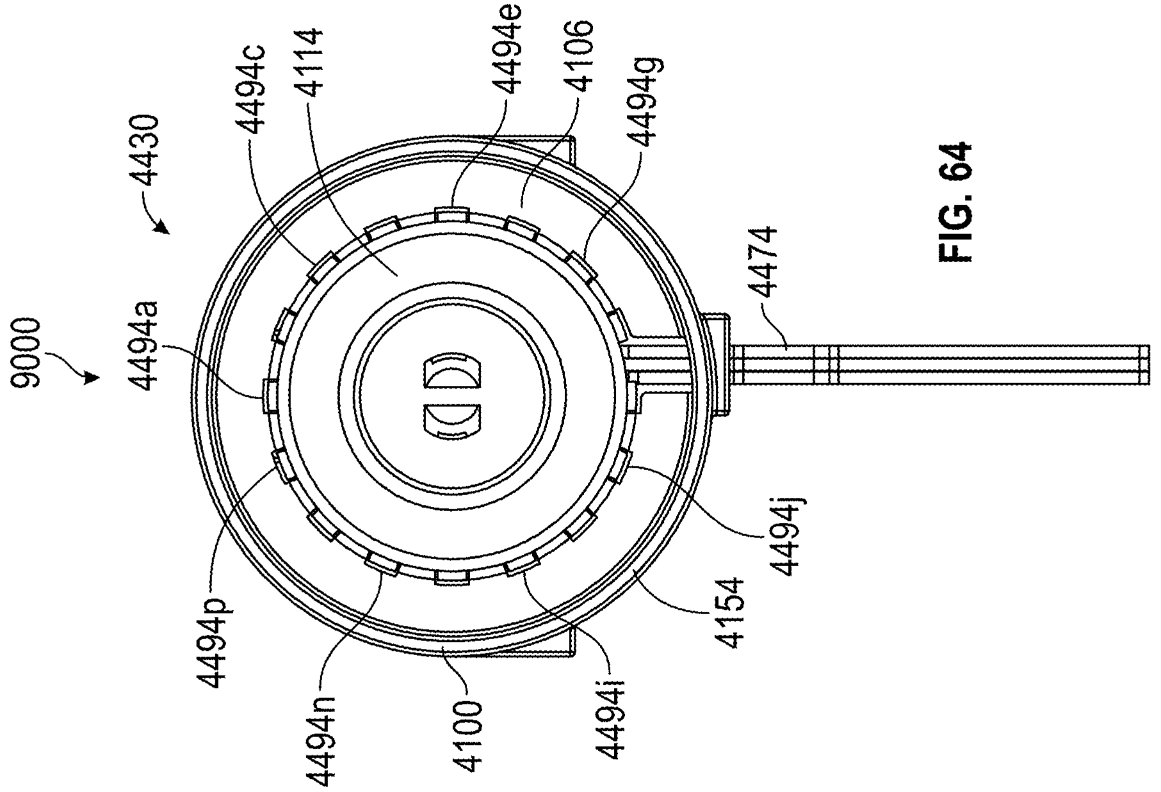
FIG. 64 is a front view of the male connector assembly of FIG. 63.
Figure 63:
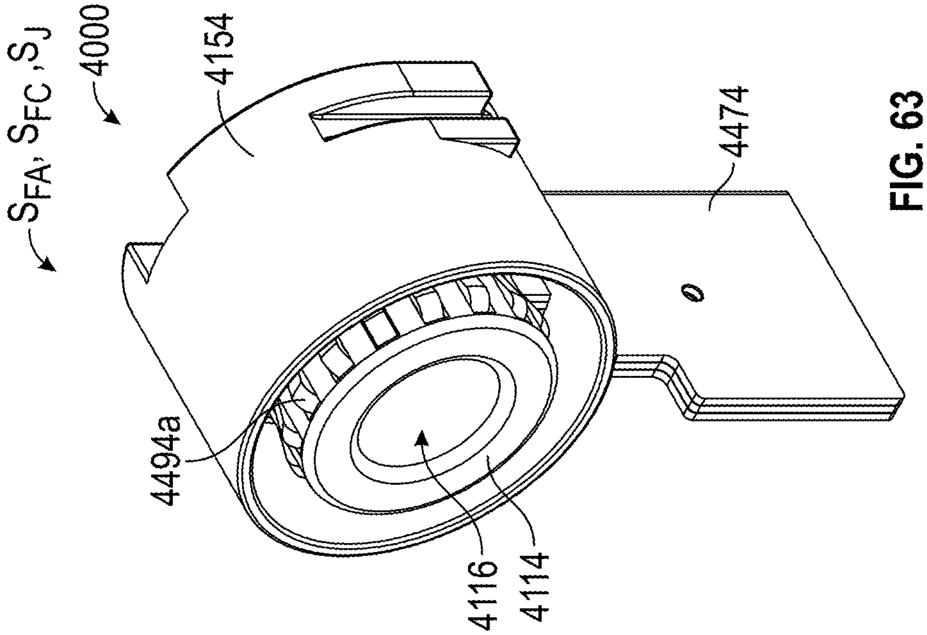
FIG. 63 is a perspective view of the male connector assembly of FIG. 50 in a fully assembled state ($S_{FA}$)
Figure 66:
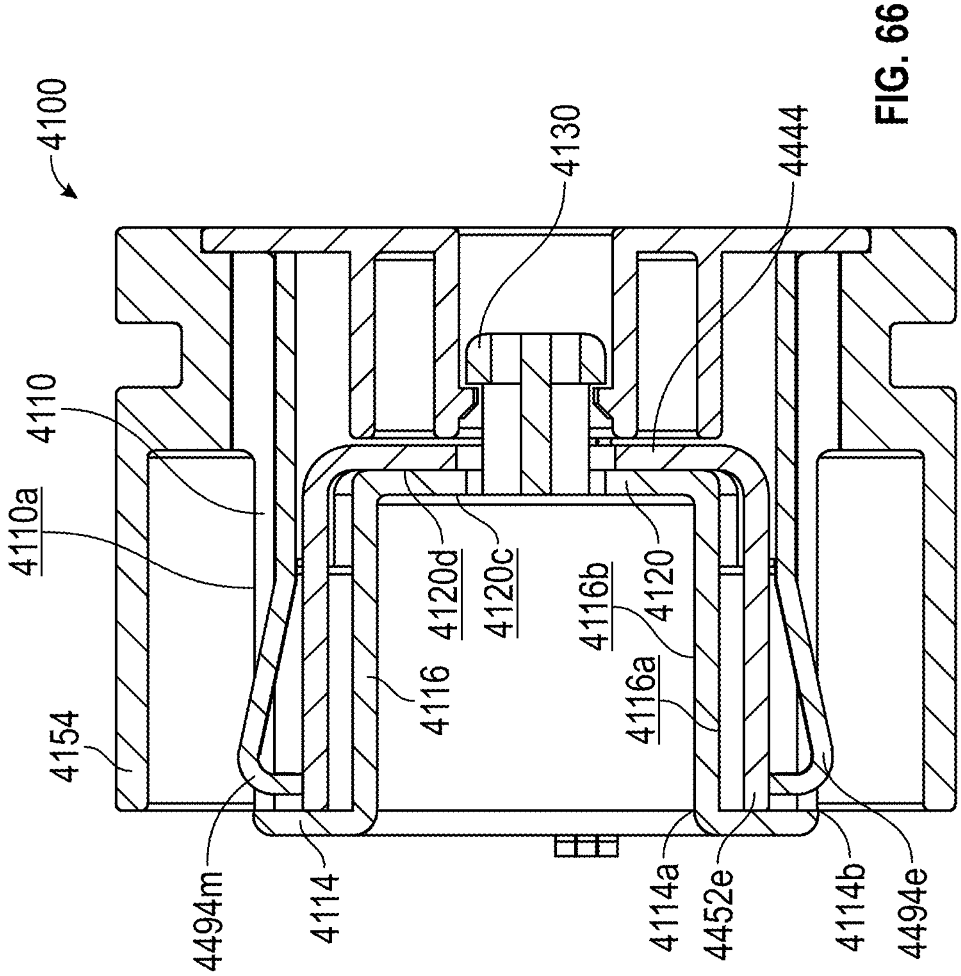
FIG. 66 is a cross-sectional view of the male connector assembly taken along line 66-66 of FIG. 65.
Figure 65:
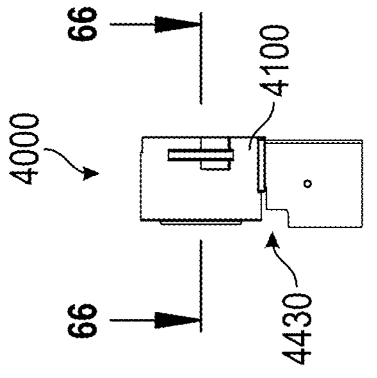
FIG. 65 is a side view of the male connector assembly of FIG. 63.
Figure 67:
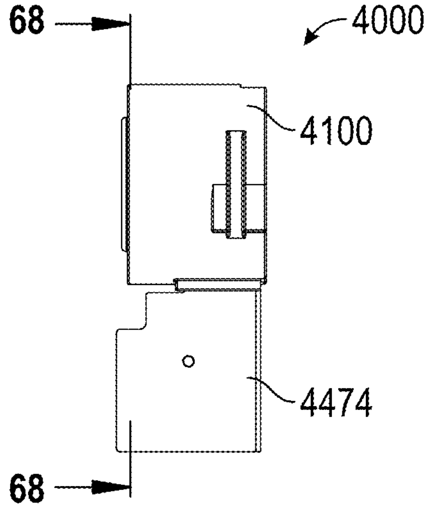
FIG. 67 is a side view of the male connector assembly of FIG. 63.
Figure 68:
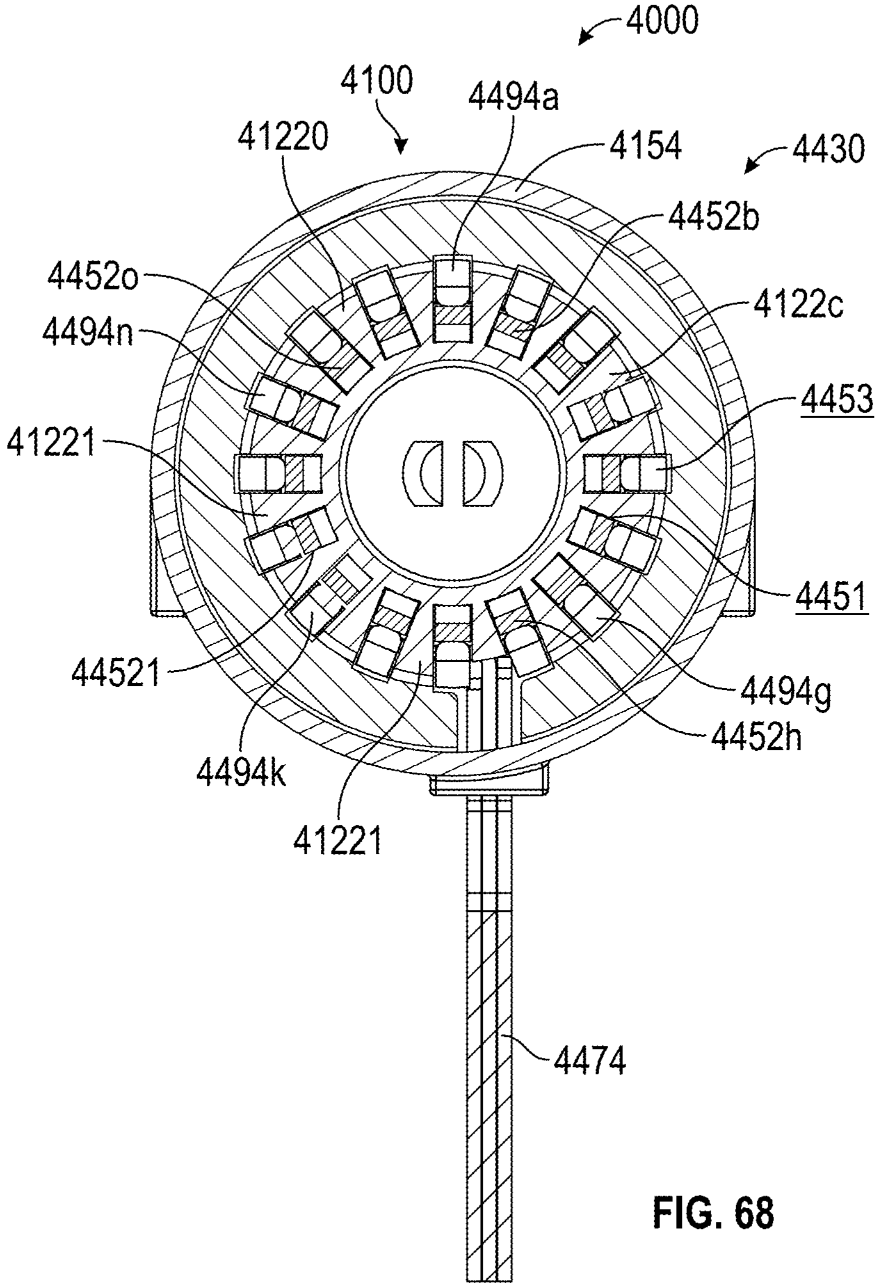
FIG. 68 is a cross-sectional view of the male connector assembly taken along line 68-68 of FIG. 67.
Figure 70:
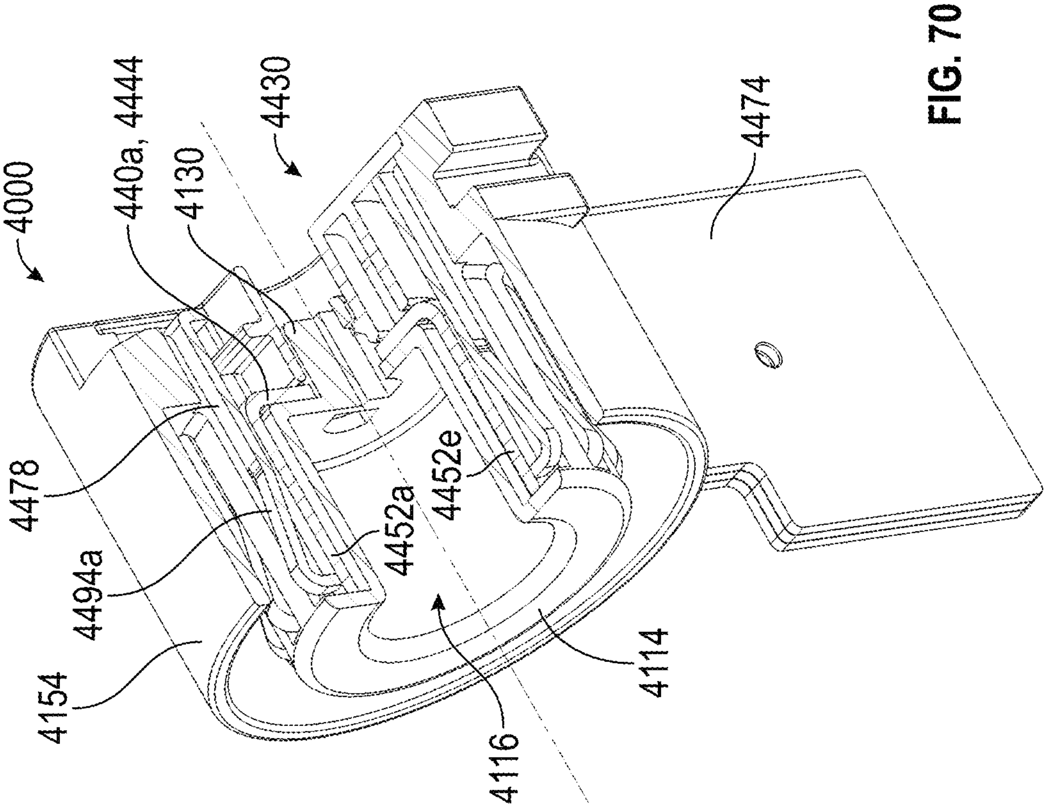
FIG. 70 is a cross-sectional view of the male connector assembly taken along line 70-70 of FIG. 69.
Figure 69:
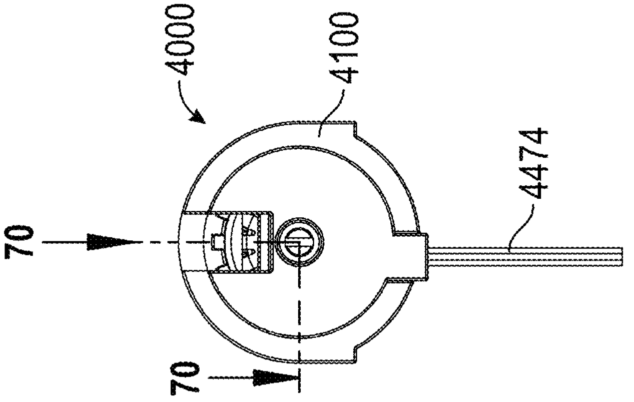
FIG. 69 is a side view of the male connector assembly of FIG. 63.
Figure 71:
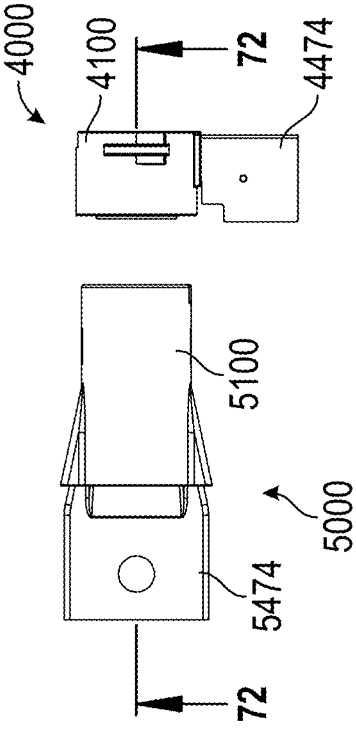
FIG. 71 is a side view of the connector system of FIG. 48 in a disconnected state ($S_{DCON}$)
Figure 72:
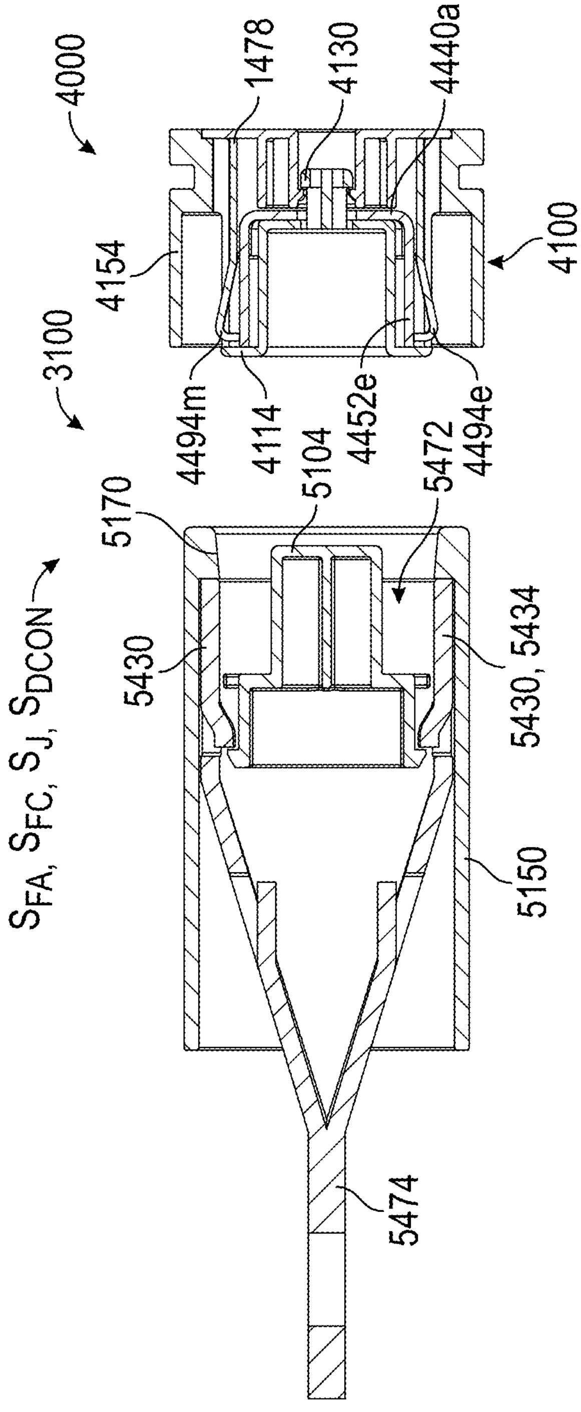
FIG. 72 is a cross-sectional view of the connector system taken along line 72-72 of FIG. 71.
Figure 73:
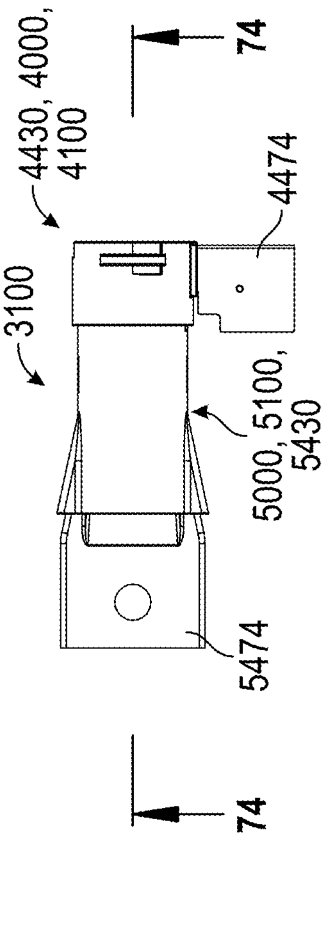
FIG. 73 is a side view of the connector system of FIG. 48 in a partially connected state ($S_{PCON}$)
Figure 74:
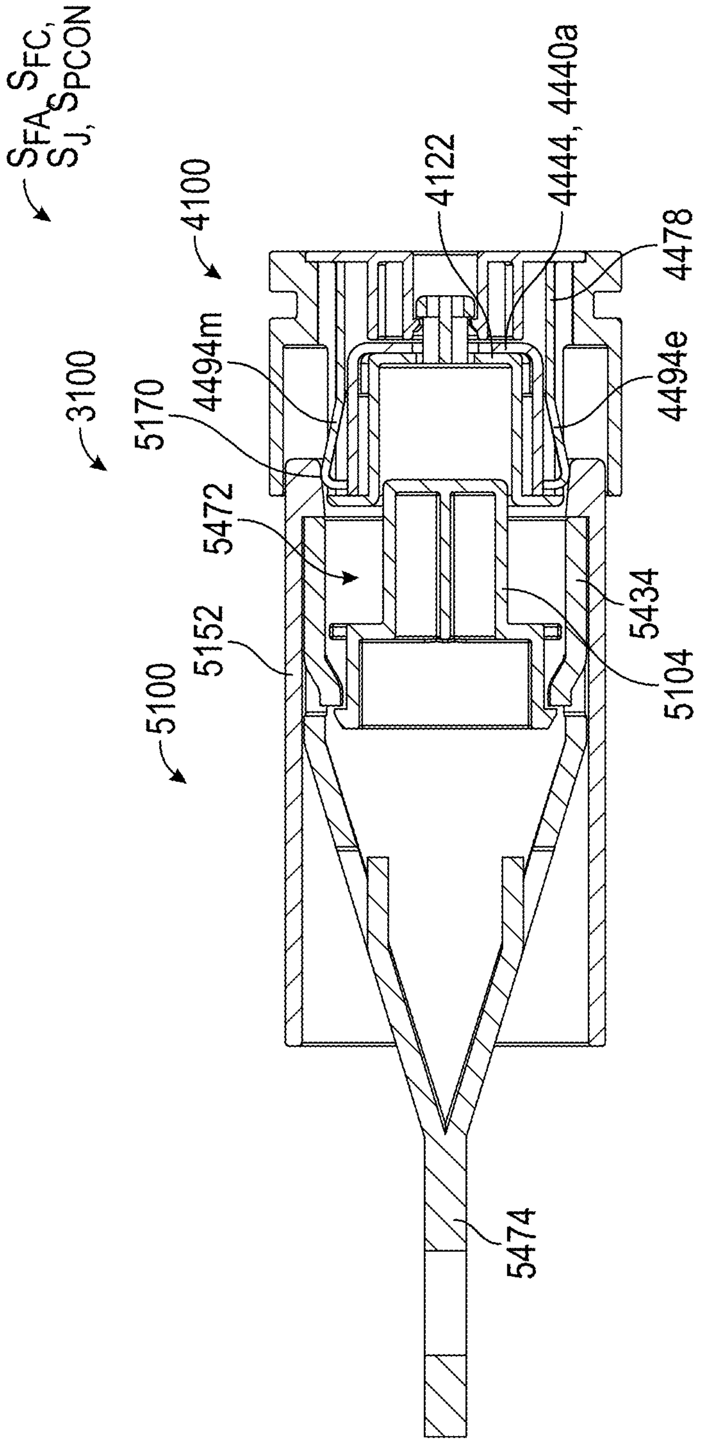
FIG. 74 is a cross-sectional view of the connector system taken along line 74-74 of FIG. 73.
Figure 75:
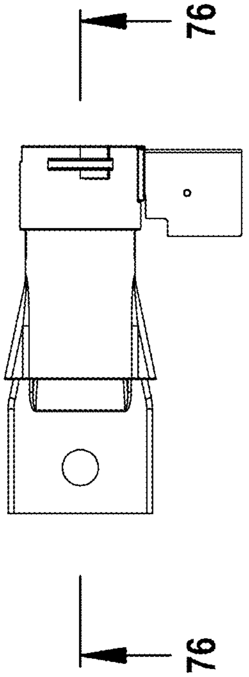
FIG. 75 is a side view of the connector system of FIG. 48 in a fully connected state ($S_{FCON}$)
Figure 76:
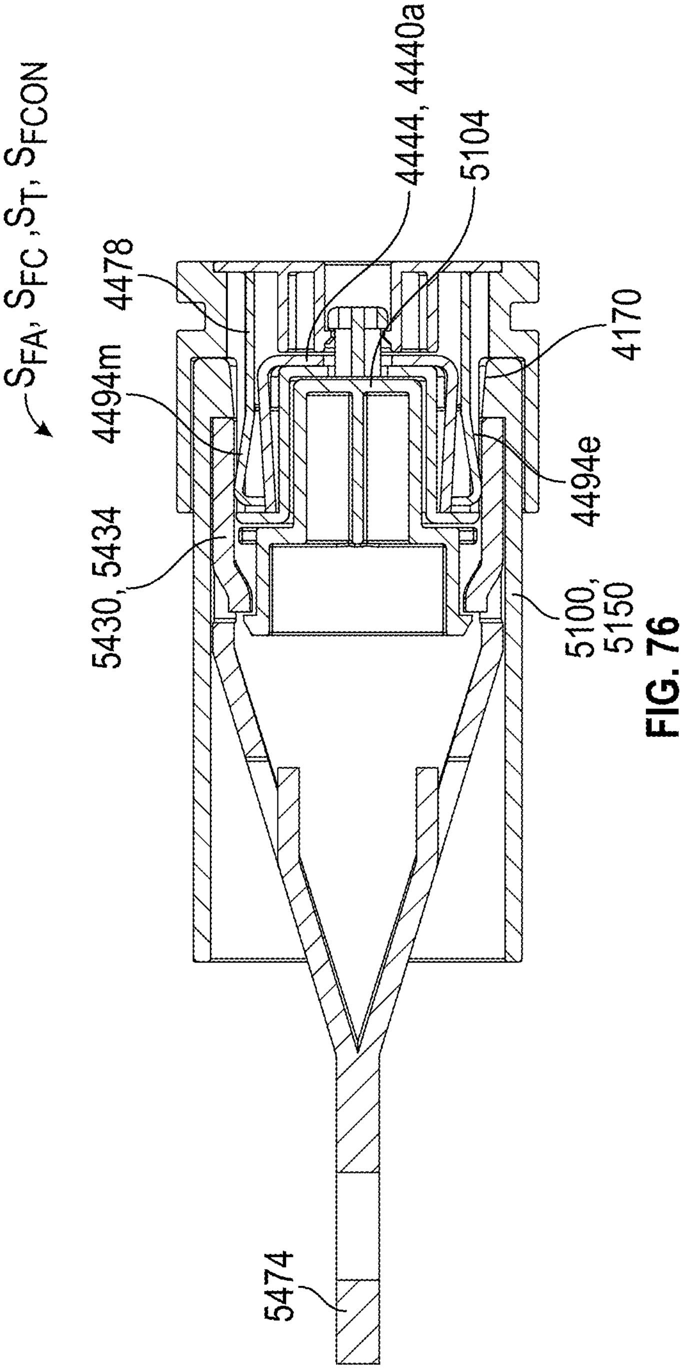
FIG. 76 is a cross-sectional view of the high ampacity connector system taken along line 76-76 of FIG. 75.
Figure 77:
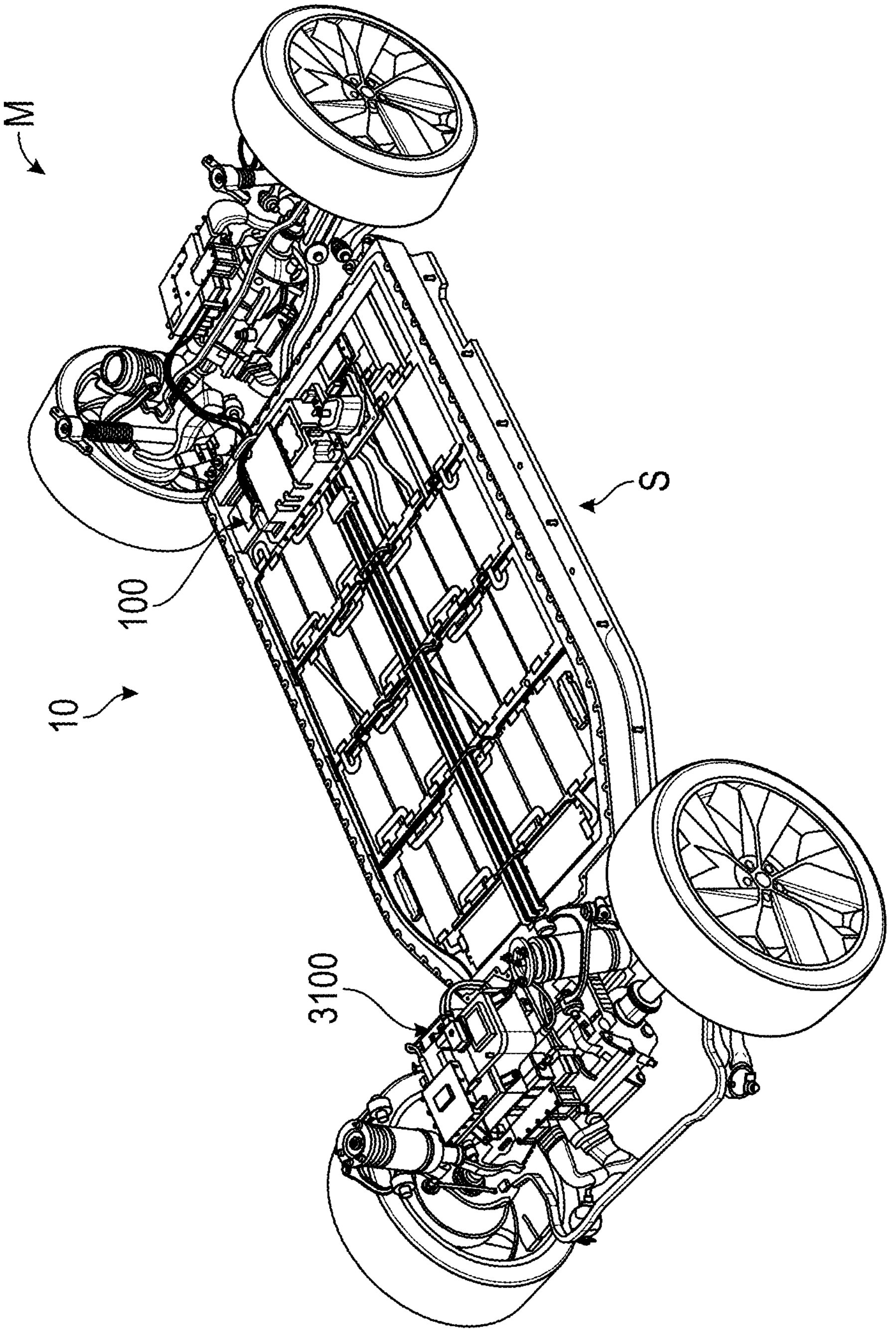
FIG. 77 is a perspective view of a vehicle skateboard having a battery pack, wherein the vehicle skateboard includes the connector system.
Figure 78:
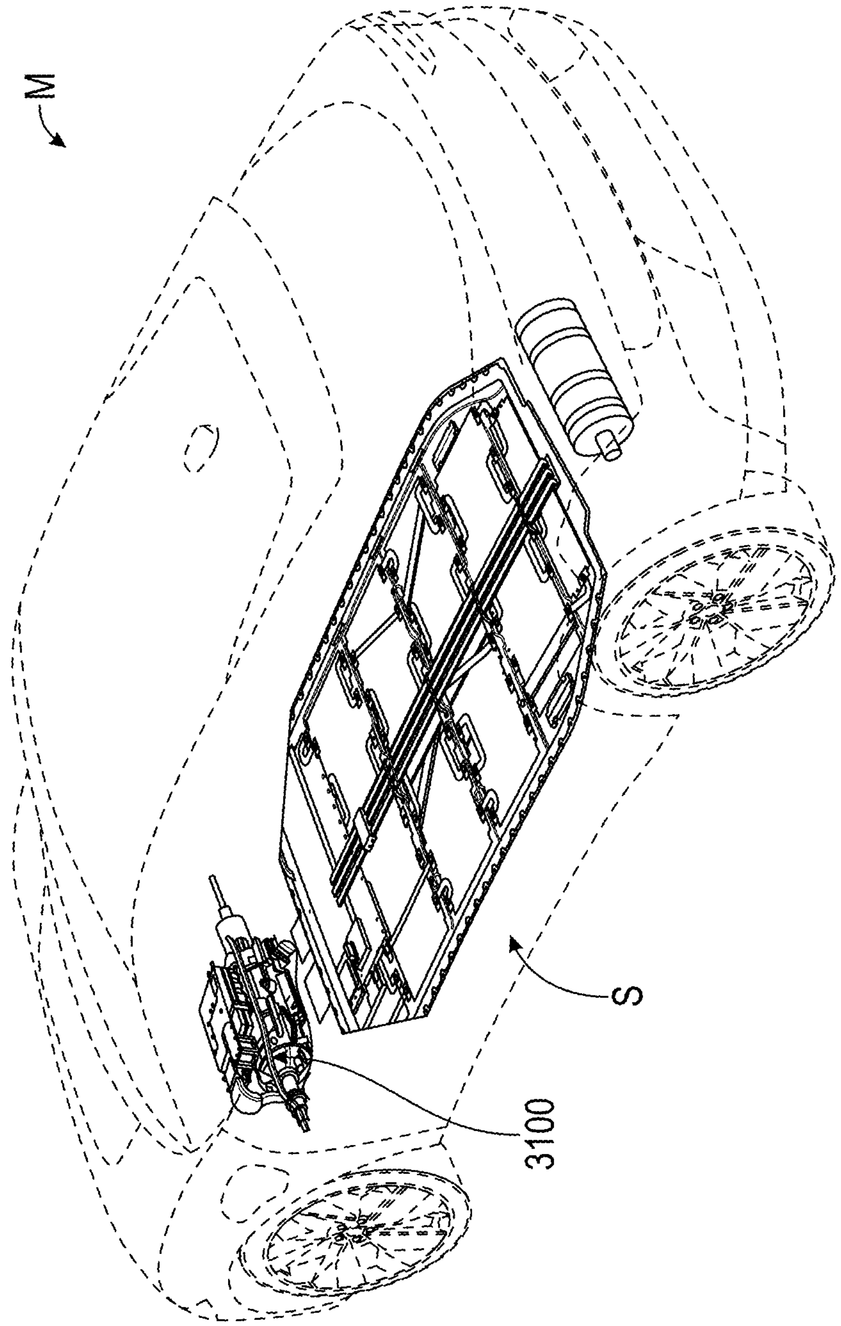
FIG. 78 is a perspective view of a vehicle having a battery pack, wherein the vehicle includes the connector system.
Figure 79:
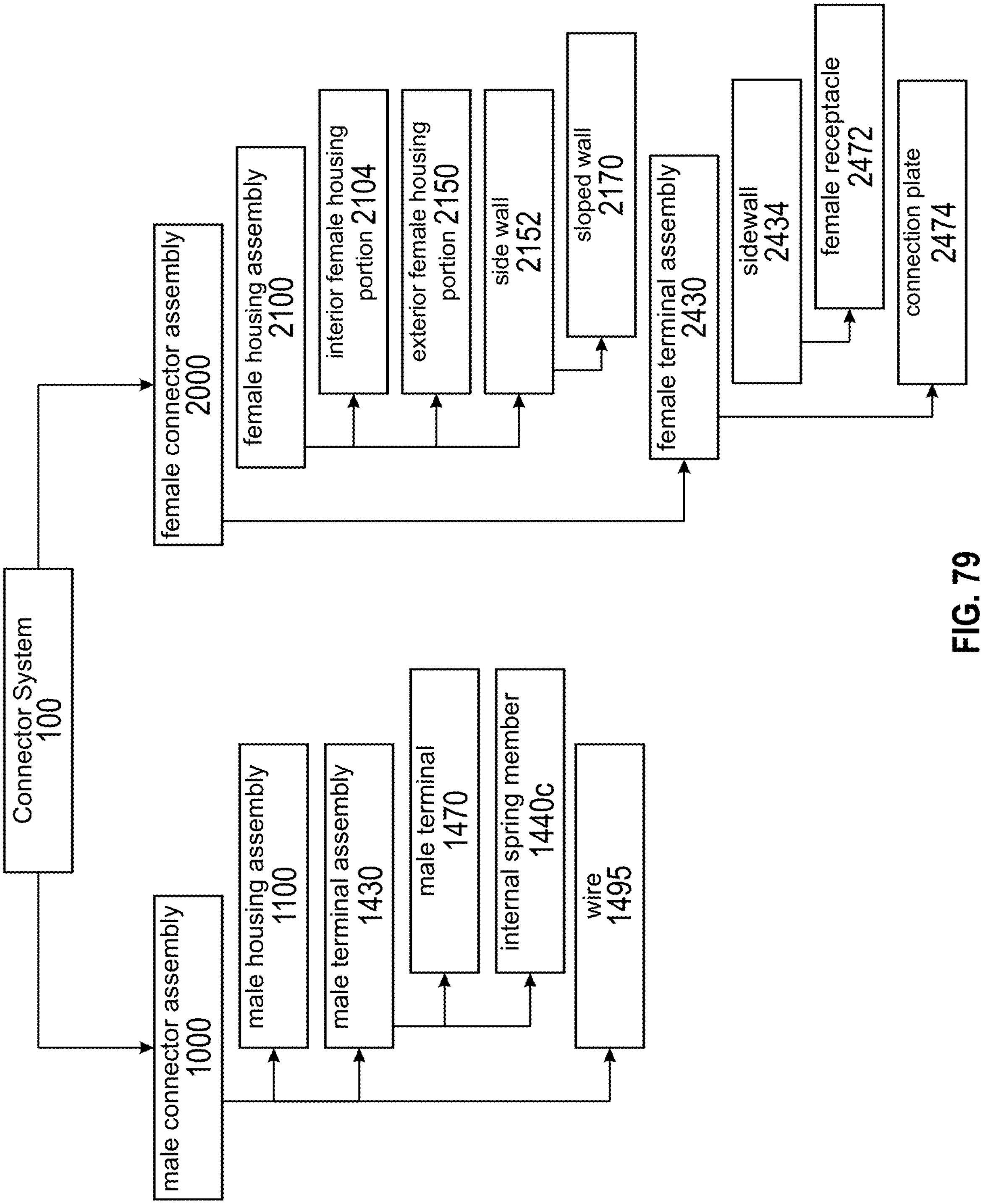
FIG. 79 is a block diagram showing components of the inventive connector system 100, including the male connector assembly 1000 and the female connector assembly 2000.
Figure 80:
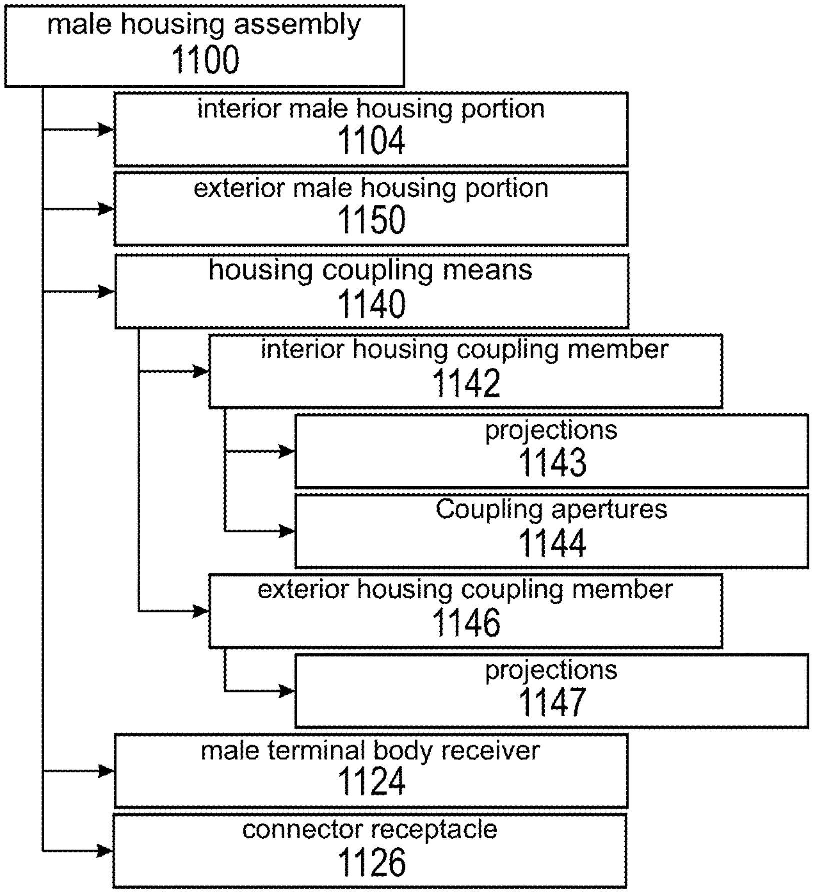
FIG. 80 is a block diagram showing components of the male housing assembly 1100 of the connector system 100.
Figure 81A:
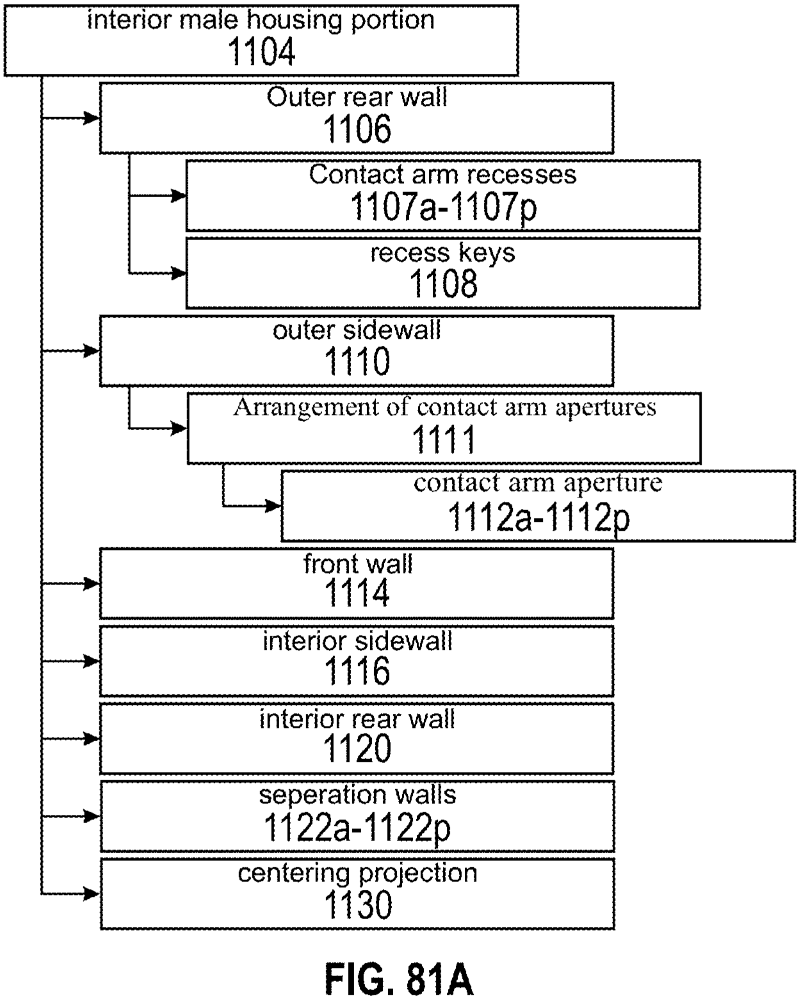
FIG. 81A is a block diagram showing components of the interior male housing portion 1104 of the male housing assembly 1100 of the connector system 100.
Figure 81B:
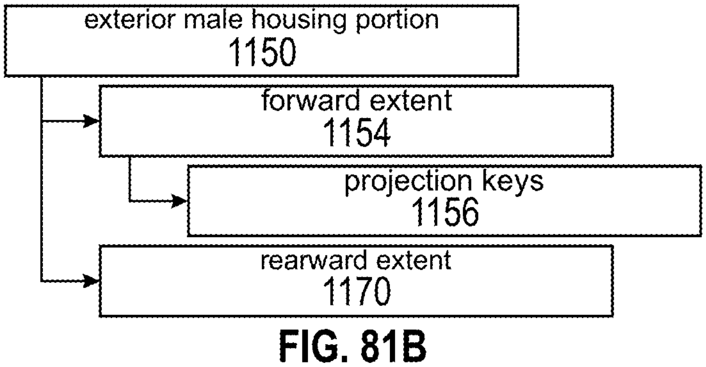
FIG. 81B is a block diagram showing components of the exterior male housing portion 1150 of the male housing assembly 1100 of the connector system 100.
Figure 82:
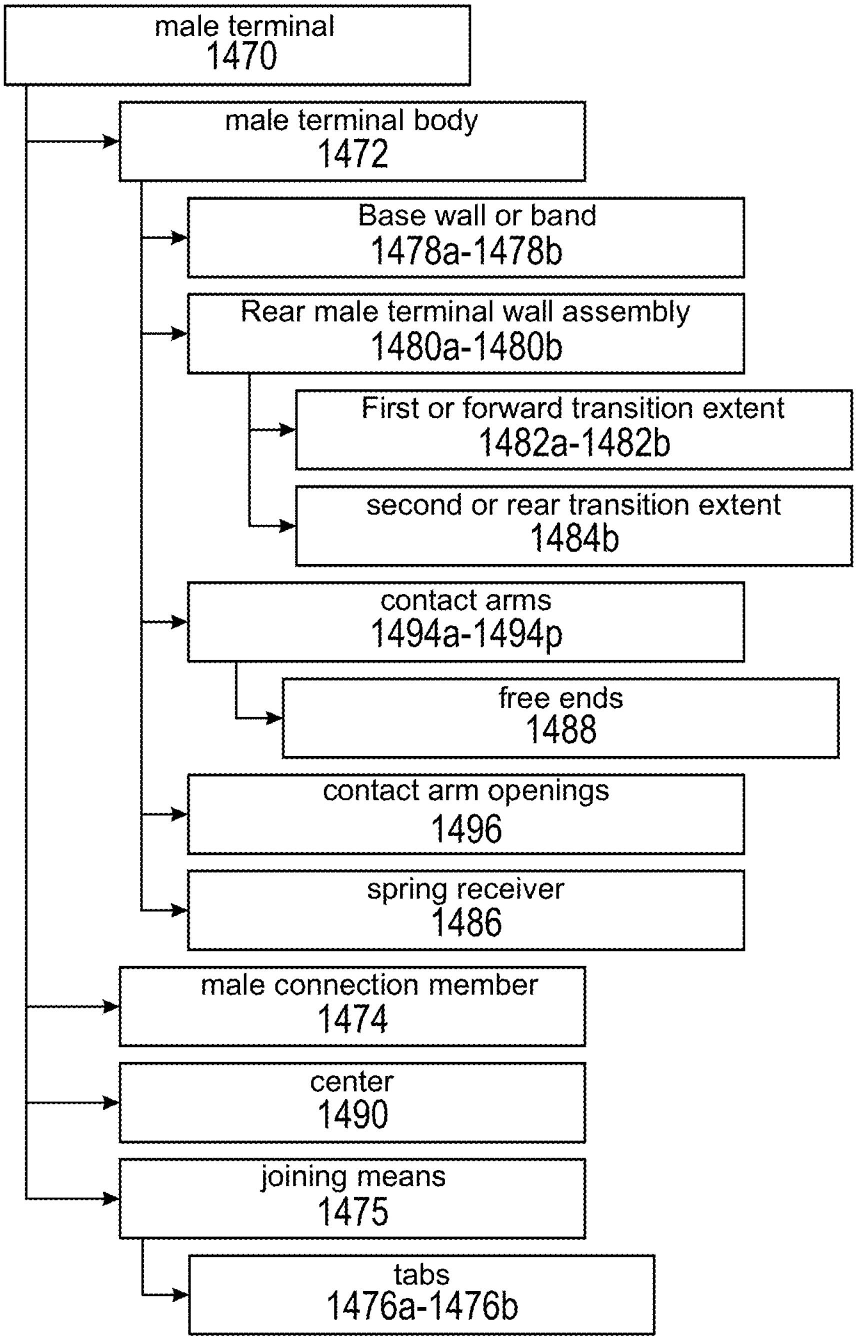
FIG. 82 is a block diagram showing components of the male terminal 1470 of the connector system 100.
Figure 83:
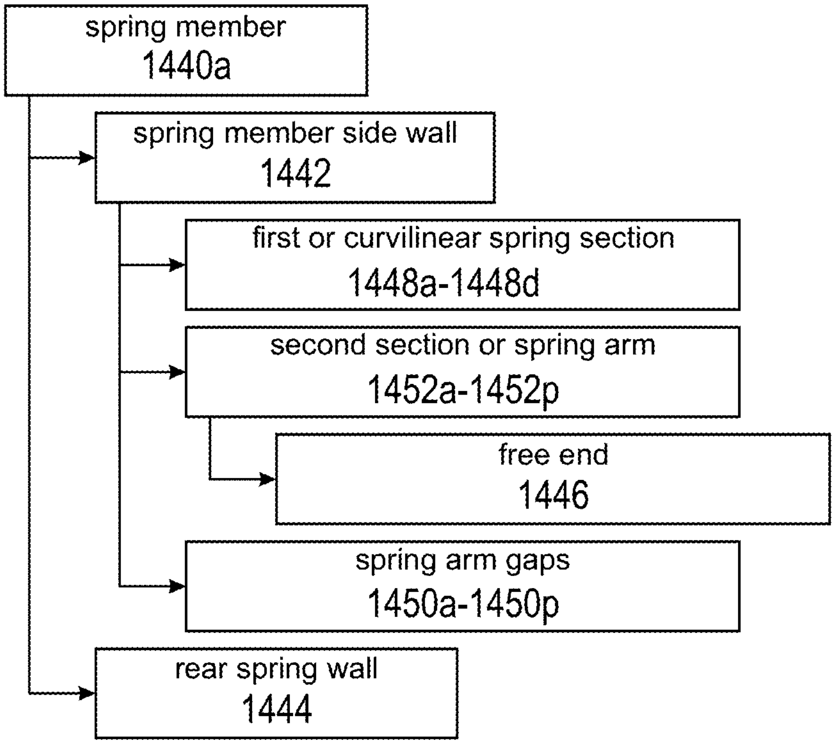
FIG. 83 is a block diagram showing components of the spring member 1440*a* of the connector system 100.
Figure 84:
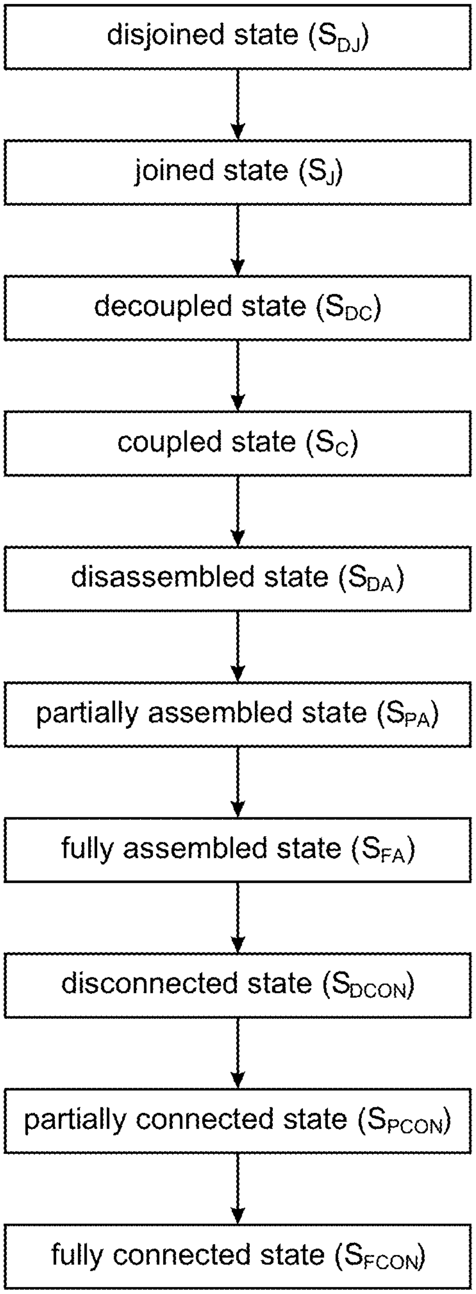
FIG. 84 is a flow chart showing the assembly states of the connector system 100.

It should be understood that the height $H_{CP}$ of the male terminal connection plate 4474 may be reduced while increasing the thickness $T_{CP}$ of the male terminal connection plate 4474 to ensure that a current choke point is not created. However, if a reduction in the height $H_{CP}$ of the male terminal connection plate 4474 reduces the length of the base wall 4478*a*-4478*b* to a point where the base wall length $L_B$ is less than 90% of the contact arm length $L_{CA}$ can lead to appreciable manufacturing difficulties with a male terminal body 1472 that has a diameter that is greater than 12 mm. To avoid such manufacturing difficulties, the base wall length $L_B$ is approximately 130% of the contact arm length $L_{CA}$. In other words, the base wall length $L_B$ is between 11 mm and 13 mm, preferably 12.4 mm, while the contact arm length $L_{CA}$ is between 9 mm and 10 mm, preferably 9.5 mm. Thus, the base wall length $L_B$ is approximately 2.9 mm longer than the contact arm length $L_{CA}$. Other measurements of the male terminal body 4472 are shown in connection with FIG. 54, wherein the diameter of the base wall $O_B$ is between 19 mm and 23 mm, preferably 20.5 mm, and an overall length $L_{CP}$ that is between 22 mm and 44 mm, preferably 34 mm. As shown in FIG. 54, the connection plate 4474 has three different rectangular sections, wherein the first section (designed to be coupled to the wire 4495) has a height $H_{CP1}$ of 24.4 mm and a length $L_{CP1}$ of 20.8 mm, the second section has a height $H_{CP2}$ of 19.4 mm and a length $L_{CP2}$ of 6.2 mm, and the third section has a height $H_{CP3}$ of 12.4 mm and a length $L_{CP3}$ of 6.85 mm.

6) Related Information for the Systems 100, 3100

The systems 100, 3100 are T4/V4/S3/D2/M2, wherein the system 100, 3100 meets and exceeds: (i) T4 is exposure of the system 100 to 150° C., (ii) V4 is severe vibration, (iii) S1 is sealed high-pressure spray, (iv) D2 is 200k mile durability, and (v) M2 is less than 45 Newtons of force is required to connect the male terminal assembly 1430, 4430 to the female terminal assembly 2430, 5430. In addition to being T4/V4/S3/D2/M2 compliant, the system 100, 3100 is push, click, tug, scan (PCTS) compliant, wherein additional information about this standard is disclosed within PCT/US2020/49870.

It should be understood that the male terminal assemblies 1430, 4430 and the female terminal assemblies 2430, 5430 disclosed within this application are rated to carry at least 500 amps with a wire size 120 $mm^2$ at 55° C. rise over ambient (RoA) or at 80° C. with a current derating of 80%. In comparison, conventional 14 mm round connector sold by Amphenol under the PowerLok name, the connector disclosed herein: (i) has similar current carry capacities, (ii) is approximately 25% lighter, (iii) is approximately 50% less expensive to manufacture, and (iv) is more robust because it can meet USCAR 2 T4/V4 rating. These mechanical and electrical benefits over the conventional connectors provide considerable advantages of these conventional connectors, while meeting industry regulations and requirements. As such, it should be understood that theoretical designs that attempt to modify connectors or combine extents of conventional designs are insufficient (and in some instances, woefully insufficient) because they amount to mere design exercises that are not tethered to the complex realities of obtaining these mechanical and electrical benefits over the conventional connectors along with the designing, testing, manufacturing and certifying a connector system 100.

The spring member 1440*a*, 4440*a* disclosed herein may be replaced with the spring members shown in PCT/US2019/36010 or U.S. Provisional 63/058,061. Further, it should be understood that alternative configurations for connector assemble 1000, 2000, 4000, 5000 are possible. For example, any number of male terminal assemblies 1430, 4430 (e.g., between 2-30, preferably between 2-8, and most preferably between 2-4) may be positioned within a housing 1100, 4100. Additionally, alternative configurations for connector systems 100, 3100 are possible. For example, the female connector assembly 2000, 5000 may be reconfigured to accept these multiple male terminal assemblies 1430, 4430 into a single female terminal assembly 2430, 5430. It should also be understood that the male terminal assemblies may have any number of contact arms 1494, 5494 (e.g., between 2-100, preferably between 2-50, and most preferably between 2-8) and any number of spring arms 1452, 5452 (e.g., between 2-100, preferably between 2-50, and most preferably between 2-8). As discussed above, the number of contact arms 1494, 5494 may not equal the number of spring arms. For example, there may be more contact arms 1494, 5494 than spring arms 1452, 5452. Alternatively, there may be fewer contact arms 1494, 5494 than spring arms 1452, 5452.

Materials and Disclosure that are Incorporated by Reference

PCT Application Nos. PCT/US2020/143788, PCT/US2020/143686, PCT/US2020/133446, PCT/US2020/50018, PCT/US2020/49870, PCT/US2020/14484, PCT/US2020/13757, PCT/US2019/36127, PCT/US2019/36070, PCT/US2019/36010, and PCT/US2018/19787, U.S. patent application Ser. No. 16/194,891 and U.S. Provisional Applications 62/897,658 62/897,962, 62/988,972, 63/051,639, 63/058,061, 63/068,622, 63/109,135, 63/159,689, 63/222,859, 63/234,320, each of which is fully incorporated herein by reference and made a part hereof.

SAE Specifications, including: J1742_201003 entitled, “Connections for High Voltage On-Board Vehicle Electrical Wiring Harnesses—Test Methods and General Performance Requirements,” last revised in March 2010, each of which is fully incorporated herein by reference and made a part hereof.

ASTM Specifications, including: (i) D4935-18, entitled “Standard Test Method for Measuring the Electromagnetic Shielding Effectiveness of Planar Materials,” and (ii) ASTM D257, entitled “Standard Test Methods for DC Resistance or Conductance of Insulating Materials,” each of which are fully incorporated herein by reference and made a part hereof.

American National Standards Institute and/or EOS/ESD Association, Inc Specifications, including: ANSI/ESD STM11.11 Surface Resistance Measurements of Static Dissipative Planar Materials, each of which is fully incorporated herein by reference and made a part hereof.

DIN Specification, including Connectors for electronic equipment—Tests and measurements—Part 5-2: Current-carrying capacity tests; Test 5b: Current-temperature derating (IEC 60512-5-2:2002), each of which are fully incorporated herein by reference and made a part hereof.

USCAR Specifications, including: (i) SAE/USCAR-2, Revision 6, which was last revised in February 2013 and has ISBN: 978-0-7680-7998-2, (ii) SAE/USCAR-12, Revision 5, which was last revised in August 2017 and has ISBN: 978-0-7680-8446-7, (iii) SAE/USCAR-21, Revision 3, which was last revised in December 2014, (iv) SAE/USCAR-25, Revision 3, which was revised on March 2016 and has ISBN: 978-0-7680-8319-4, (v) SAE/USCAR-37, which was revised on August 2008 and has ISBN: 978-0-7680-2098-4, (vi) SAE/USCAR-38, Revision 1, which was revised on May 2016 and has ISBN: 978-0-7680-8350-7, each of which are fully incorporated herein by reference and made a part hereof.

Other standards, including Federal Test Standard 101C and 4046, each of which is fully incorporated herein by reference and made a part hereof.

INDUSTRIAL APPLICABILITY

While some implementations have been illustrated and described, numerous modifications come to mind without significantly departing from the spirit of the disclosure; and the scope of protection is only limited by the scope of the accompanying claims. For example, the overall shape of the of the components described above may be changed to: a triangular prism, a pentagonal prism, a hexagonal prism, octagonal prism, sphere, a cone, a tetrahedron, a cuboid, a dodecahedron, a icosahedron, a octahedron, a ellipsoid, or any other similar shape.

Headings and subheadings, if any, are used for convenience only and are not limiting. The word exemplary is used to mean serving as an example or illustration. To the extent that the term includes, have, or the like is used, such term is intended to be inclusive in a manner similar to the term comprise as comprise is interpreted when employed as a transitional word in a claim. Relational terms such as first and second and the like may be used to distinguish one entity or action from another without necessarily requiring or implying any actual such relationship or order between such entities or actions.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

Numerous modifications to the present disclosure will be apparent to those skilled in the art in view of the foregoing description. Preferred embodiments of this disclosure are described herein, including the best mode known to the inventors for carrying out the disclosure. It should be understood that the illustrated embodiments are exemplary only, and should not be taken as limiting the scope of the disclosure.

The invention claimed is:

1. A connector system for use in a power distribution system, the connector system comprising:

a male connector assembly including a male terminal body comprising a plurality of contact arms extending from the male terminal body and arranged along a curvilinear contact arm path, wherein the male terminal body comprises a first portion and a second portion being identical to the first portion, wherein the first and second portions are separate from one another and coupled together via one or more coupling structures extending therefrom, wherein a spring receiver is defined at least in part by the plurality of contact arms.

2. The connector system of claim 1, further comprising a spring member having a plurality of spring arms, the spring member lacking a structure specifically configured to align a spring arm of the plurality of spring arms with a contact arm of the plurality of contact arms.

3. The connector system of claim 2, wherein the male connector assembly further comprises an interior male housing that encircles at least a portion of the male connector assembly, wherein the interior male housing includes a plurality of separation walls that are positioned between each of the contact arms within the plurality of contact arms and between each of the spring arms within the plurality of spring arms.

4. The connector system of claim 1, further comprising a spring member having a plurality of spring arms that are arranged along a curvilinear spring arm path; and wherein the curvilinear spring arm path is cooperatively dimensioned and positioned with the curvilinear contact arm path to create a mechanical interaction between the plurality of contact arms and the plurality of spring arms when the connector system is in a particular state or subjected to certain operating conditions.

5. The connector system of claim 4, wherein the curvilinear contact arm path and the curvilinear spring arm path are substantially circular.

6. The connector system of claim 1, wherein each contact arm in the plurality of contact arms has a width that defines a contact arm width, and wherein a pair of adjoining contact arms defines a contact arm opening that has a contact arm opening width; and wherein the contact arm width is at least 80% of the contact arm opening width.

7. The connector system of claim 1, further comprising a female connector assembly having a female terminal with a female receptacle; and wherein the connector system:

(i) is configured to transfer over 500 amps between the male connector assembly and the female terminal with less than a 55° C. rise over the ambient temperature in which the connector system is operating, and (ii) lacks a lever to assist in positioning an extent of the male connector assembly within the female receptacle.

8. The connector system of claim 1, further comprising a female connector assembly having a female terminal with a female receptacle;

wherein the connector system (i) lacks a lever assist and (ii) requires an insertion force of less than 45 Newtons to position the male terminal body within the female receptacle.

9. The connector system of claim 1, further comprising a female connector assembly having a female terminal with a female receptacle; and wherein the male connector assembly includes a connection member coupled to a rear extent of the male terminal body at a body connection location, wherein the connection member has a cross-sectional area defined at said body connection location;

wherein when an extent of the male connector assembly is positioned within the female receptacle to provide a fully connected state, the plurality of contact arms engage an extent of the female terminal at a terminal connection location, and wherein each contact arm of said plurality of contact arms has a cross-sectional area defined at the terminal connection location, and wherein the total of the cross-sectional area of said plurality of contact arms is less than the cross-sectional area of the connection member at the body connection location.

10. The connector system of claim 1, wherein the male terminal body further comprises:

a base wall having a rearmost extent and a forward most extent, and wherein a base wall length is defined as extending between the rearmost extent and the forward most extent, wherein the plurality of contact arms extends forward from the forward most extent of the base wall, each contact arm in the plurality of contact arms has a contact arm length is defined as extending between the forward most extent of the base wall to a forward most extent of said contact arm, and wherein the base wall length is at least 90% of the contact arm length.

11. The connector system of claim 4, wherein an outwardly directed biasing force is applied by the plurality of spring arms on the plurality of contact arms in a fully connected state.

12. A connector system for use in a power distribution system, the connector system comprising:

a male connector assembly including a male terminal body having:

(i) a plurality of contact arms defining a spring receiver, wherein each of the plurality of contact arms extends from an end of the male terminal body and the contact arms are evenly spaced from one another, wherein each contact arm in the plurality of contact arms has a width that defines a contact arm width, and (ii) a plurality of contact arm openings, wherein each contact arm opening in the plurality of contact arm openings extends between a pair of adjacent contact arms to define a contact arm opening width, wherein the male connector assembly includes a male housing assembly comprising an interior male housing portion with a plurality of separation walls, wherein one separation wall of the plurality of separation walls is positioned between each pair of contact arms from the plurality of contact arms.

13. The connector system of claim 12, wherein the male housing assembly with the interior male housing portion is configured to provide a male terminal body receiver.

14. The connector system of claim 13, wherein the male connector assembly includes a spring member with a plurality of spring arms; and wherein one spring arm in the plurality of spring arms is configured to: (i) underlie one contact arm within the plurality of contact arms, and (ii) overlie an extent of the interior male housing portion.

15. The connector system of claim 12, wherein the male terminal body includes a base wall having a rearmost extent and a forward most extent;

wherein a base wall length is defined between the rearmost extent and the forward most extent;

wherein each contact arm of the plurality of contact arms has a contact arm length defined between the forward most extent of the base wall to a forward most extent of said contact arm; and wherein the base wall length is at least 90% of the contact arm length.

16. The connector system of claim 12, further comprising a female connector assembly having a female terminal with a female receptacle; and wherein the male connector assembly includes a connection member coupled to a rear extent of the male terminal body at a body connection location, wherein the connection member has a cross-sectional area defined at said body connection location;

wherein in a fully connected state, an extent of the male connector assembly is positioned within the female receptacle and the plurality of contact arms engage an extent of the female terminal at a terminal connection location, and wherein each contact arm of said plurality of contact arms has a cross-sectional area defined at the terminal connection location, and wherein the total of the cross-sectional area of said plurality of contact arms is less than the cross-sectional area of the connection member at the body connection location.

17. The connector system of claim 12, further comprising a female connector assembly having a female terminal with a female receptacle; and wherein the connector system:

(i) is configured to transfer over 500 amps between the male connector assembly and the female terminal with less than a 55° C. rise over the ambient temperature in which the connector system is operating, and (ii) lacks a lever to assist in positioning an extent of the male connector assembly within the female receptacle.

18. The connector system of claim 12, further comprising a female connector assembly having a female terminal with a female receptacle;

wherein the connector system requires an insertion force of less than 45 Newtons to position the male terminal body within the female receptacle without a lever assist.

19. The connector system of claim 12, wherein the male terminal body comprises a first portion and a second portion being identical to the first portion, wherein the first and second portions are coupled together via one or more coupling structures extending therefrom.

20. The connector system of claim 12, wherein the contact arm width is at least 80% of the contact arm opening width.

21. The connector system of claim 14, wherein an outwardly directed biasing force is applied by the plurality of spring arms on the plurality of contact arms in a fully connected state.

* * * * *